United States Patent
Kanna

(10) Patent No.: US 10,209,839 B2
(45) Date of Patent: Feb. 19, 2019

(54) METHOD FOR PRODUCING LAMINATED MATERIAL, LAMINATED MATERIAL, METHOD FOR PRODUCING TRANSPARENT LAMINATE, TRANSPARENT LAMINATE, CAPACITANCE-TYPE INPUT DEVICE, AND IMAGE DISPLAY DEVICE

(71) Applicant: FUJIFILM Corporation, Tokyo (JP)

(72) Inventor: Shinichi Kanna, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/401,194

(22) Filed: Jan. 9, 2017

(65) Prior Publication Data

US 2017/0115778 A1    Apr. 27, 2017

Related U.S. Application Data

(63) Continuation of application No. PCT/JP2015/069988, filed on Jul. 13, 2015.

(30) Foreign Application Priority Data

Jul. 15, 2014   (JP) ................................. 2014-144846
Feb. 16, 2015   (JP) ................................. 2015-027170

(51) Int. Cl.
*G06F 3/045*    (2006.01)
*G06F 3/041*    (2006.01)
(Continued)

(52) U.S. Cl.
CPC ................ *G06F 3/044* (2013.01); *B32B 7/00* (2013.01); *B32B 7/02* (2013.01); *B32B 27/08* (2013.01);
(Continued)

(58) Field of Classification Search
CPC ......................... G03G 9/0806; G03G 9/08755
See application file for complete search history.

(56) References Cited

U.S. PATENT DOCUMENTS 5,556,733 A *   9/1996   Kusakata ................. G03C 1/52
                                                      430/151
2008/0076066 A1 * 3/2008 Watanabe ............... G03F 7/031
                                                      430/286.1
(Continued)

FOREIGN PATENT DOCUMENTS

JP   2010-086684 A   4/2010
JP   2010-152809 A   7/2010
(Continued)

OTHER PUBLICATIONS

International Preliminary Report on Patentability and translation of Written Opinion dated Jan. 26, 2017 from the International Bureau in counterpart International Application No. PCT/JP2015/069988.
(Continued)

*Primary Examiner* — Nan-Ying Yang
(74) *Attorney, Agent, or Firm* — Sughrue Mion, PLLC

(57) ABSTRACT

Provided is a method for producing a laminated material, the method including forming a first transparent resin layer on a base material; and forming a second transparent resin layer directly on the first transparent resin layer, in which the forming a first transparent resin layer is applying an organic solvent-based resin composition on the base material, and the forming a second transparent resin layer is applying a water-based resin composition including an ammonium salt of a monomer having an acid group or an ammonium salt of a resin having an acid group. The method for producing a laminated material can provide a laminated material which exhibits satisfactory layer demarcation, and by which a problem caused by moisture absorption of the transparent resin layer formed using a water-based resin composition in
(Continued)

a case in which the laminated material is subjected to a high temperature and high humidity environment for a period of time can be suppressed. Also provided are a laminated material, a transparent laminate, a method for producing a transparent laminate, a capacitance-type input device, and an image display device.

25 Claims, 8 Drawing Sheets

(51) Int. Cl.
*G06F 3/044* (2006.01)
*B32B 7/02* (2006.01)
*B32B 27/30* (2006.01)
*B32B 27/08* (2006.01)
*B32B 37/00* (2006.01)
*B32B 7/00* (2006.01)
*B32B 37/12* (2006.01)

(52) U.S. Cl.
CPC ............ *B32B 27/30* (2013.01); *B32B 27/308* (2013.01); *B32B 37/025* (2013.01); *B32B 2037/1253* (2013.01); *B32B 2307/20* (2013.01); *B32B 2307/202* (2013.01); *B32B 2307/40* (2013.01); *B32B 2307/412* (2013.01); *B32B 2457/00* (2013.01); *B32B 2457/20* (2013.01); *B32B 2457/206* (2013.01); *B32B 2457/208* (2013.01); *G06F 2203/04103* (2013.01)

(56) References Cited

U.S. PATENT DOCUMENTS

| | | | |
|---|---|---|---|
| 2013/0258479 A1* | 10/2013 | Okafuji | ................. C08F 290/06 359/586 |
| 2013/0258570 A1* | 10/2013 | Nashiki | ................... G06F 3/044 361/679.01 |
| 2015/0109252 A1 | 4/2015 | Kanna et al. | |
| 2015/0251393 A1 | 9/2015 | Kanna et al. | |

FOREIGN PATENT DOCUMENTS

| | | |
|---|---|---|
| JP | 2010-257492 A | 11/2010 |
| JP | 2012-078528 A | 4/2012 |
| JP | 2014-010814 A | 1/2014 |
| JP | 2014-108541 A | 6/2014 |

OTHER PUBLICATIONS

International Search Report for PCT/JP2015/069988, dated Sep. 15, 2015. [PCT/ISA/210].
Written Opinion for PCT/JP2015/069988, dated Sep. 15, 2015. [PCT/ISA/237].

* cited by examiner

METHOD FOR PRODUCING LAMINATED MATERIAL, LAMINATED MATERIAL, METHOD FOR PRODUCING TRANSPARENT LAMINATE, TRANSPARENT LAMINATE, CAPACITANCE-TYPE INPUT DEVICE, AND IMAGE DISPLAY DEVICE

CROSS-REFERENCE TO RELATED APPLICATIONS

This application is a Continuation of PCT International Application No. PCT/JP2015/069988, filed on Jul. 13, 2015, which claims priority under 35 U.S.C. Section 119(a) to Japanese Patent Application No. 2014-144846 filed on Jul. 15, 2014, and Japanese Patent Application No, 2015-027170 filed on Feb. 16, 2015. Each of the above applications is hereby expressly incorporated by reference, in its entirety, into the present application.

BACKGROUND OF THE INVENTION

1. Field of the Invention

The present invention relates to a method for producing a laminated material, a laminated material, a method for producing a transparent laminate, a transparent laminate, a capacitance-type input device, and an image display device. More particularly, the invention relates to a capacitance-type input device that is capable of detecting the position of contact of a finger as a change in capacitance, a transparent laminate that can be used for the capacitance-type input device, a laminated material that is used to produce a transparent laminate, a method for producing a laminated material, a method for producing a transparent laminate using this laminated material, and an image display device including this capacitance-type input device as a constituent element.

2. Description of the Related Art

In recent years, in regard to electronic equipment such as mobile telephones, car navigation systems, personal computers, ticket-vending machines, and automatic teller machines, a tablet-type input device has been disposed on the surface of a liquid crystal device or the like, so that when a finger, a touch pen, or the like touches the site at which an instruction image is displayed on an image display region of the liquid crystal device while this instruction image is referred to, input of information corresponding to the instruction image can be performed.

Examples of such an input device (touch panel) include resistive film-type devices and capacitance-type devices. However, since a resistive film-type input device has a two-ply structure composed of a film and a glass plate, in which a short circuit is caused by pressing down the film, such a resistive film-type input device has a disadvantage that the operation temperature range thereof is narrow, and the device is not quite resistant to change over time.

In contrast, a capacitance-type input device is advantageous in that simply a light-transmitting conductive film may be formed on a single sheet of substrate. In regard to such a capacitance-type input device, for example, there is available an input device of a type in which electrode patterns extend in directions that intersect each other, so that when a finger or the like touches the device, any change in capacitance between the electrodes is sensed, and the position of input is detected (see, for example, JP2010-86684A, JP2010-152809A, and JP2010-257492A).

Furthermore, JP2014-010814A discloses a transparent laminate including a region in a plane, in which a transparent substrate, a first transparent film having a refractive index of 1.6 to 1.78 and a film thickness of 55 to 110 nm, a transparent electrode pattern, and a second transparent film having a refractive index of 1.6 to 1.78 and a film thickness of 55 to 110 nm are laminated in this order, in order to make the transparent electrode pattern of the capacitance-type input devices described in JP2010-86684A, JP2010-152809A, and JP2010-257492A invisible.

Regarding the method for forming a transparent film such as that described in JP2014-010814A, various methods are known. JP2014-010814A describes a method of sputtering a metal oxide, and a method of transferring a curable transparent resin layer formed on a temporary support onto a substrate. It is described in JP2014-010814A that by using a transfer film, in a case in which an opening for installing a pressure-sensitive (not a mechanism based on capacitance change hut a pressing type mechanical mechanism) switch in a portion of a front face plate (surface that is directly touched by a finger) is formed, when a transparent resin layer is formed, the production efficiency is increased by preventing leakage or extrusion of the resist component through the opening, and omitting a process for eliminating protruded parts. In JP2014-010814A, a method for laminating two or more transparent resin layers at a time is not considered.

JP2014-108541A discloses a transfer film having a temporary support, a first curable transparent resin layer, and a second curable transparent resin layer disposed adjacently to this first curable transparent resin layer in this order, in which the refractive index of the second curable transparent resin layer is higher than the refractive index of the first curable transparent resin layer, and the refractive index of the second curable transparent resin layer is 1.6 or higher. In JP2014-108541A, a transfer film is formed, which is capable of allowing two or more transparent resin layers to be laminated at a time by forming a first curable transparent resin layer on a temporary support, subsequently curing the first curable transparent resin layer by exposure to light, and then laminating a second transparent resin layer by coating.

On the other hand, JP2012-078528A describes a method for forming a resin pattern having satisfactory developability or the like, using a photosensitive composition which includes a resin having an acid group in a side chain, a polymerizable compound, and a photopolymerization initiator. In JP2012-078528A, a method of laminating two or more transparent resin layers at a time is not considered.

SUMMARY OF THE INVENTION

In a capacitance-type input device that is generally used, a frame part is provided around the image display region. Therefore, in a case in which a refractive index-adjusting layer is formed using a transfer film, it is required that the problem of the transparent electrode pattern being visible is solved by laminating the refractive index-adjusting layer on the image display region, and at the same time, the refractive index-adjusting layer is not laminated on the frame part so that the refractive index-adjusting layer is easily formable into a desired pattern shape. Regarding the method of forming a desired pattern, a method of cutting the shape of the transfer film according to the shape of the frame part of the capacitance-type input device (die-cutting method or half-cutting method) may be considered. However, from the viewpoint of further increasing the productivity, it is preferable that the refractive index-adjusting layer is transferred from the transfer film onto the transparent electrode pattern, and then a transparent laminate having satisfactory patterning properties, which can be developed into a desired pattern by photolithography, is formed. In regard to the transfer film described in JP2014-108541A, since the second curable resin layer is applied only after the first curable resin layer is cured, the transfer film is not suitable for photolithography after transfer. Therefore, a laminated material that is capable of allowing two or more transparent resin layers to be laminated at a time and is suitable for photolithography, is not yet known.

In such circumstances, the inventors of the invention provided a single transparent resin layer by the methods described in JP2014-010814A, JP2014-108541A, and JP2012-078528A, and then formed the second transparent resin layer by coating without curing the first transparent resin layer, and it was found that layer mixing occurred.

Furthermore, the inventors of the invention formed two transparent resin layers using a water-based resin composition and an organic solvent-based resin composition, and a general water-based resin that dissolves in a water-based solvent, or a monomer of the resin was used. Then, it was found that in a case in which the water-based resin or the monomer was subjected to a high temperature and high humidity environment for a period of time, a problem caused by moisture absorption occurred.

It is an object of the invention to provide a laminated material which exhibits satisfactory layer demarcation, and by which the problem caused by moisture absorption of a transparent resin layer formed using a water-based resin composition in a case in which the laminated material has been subjected to a high temperature and high humidity environment for a period of time, can be suppressed.

The inventors of the invention found that a laminated material which exhibits satisfactory layer demarcation, and by which a problem caused by moisture absorption of a transparent resin layer formed using a water-based resin composition in a case in which the laminated material is subjected to a high temperature and high humidity environment for a period of time can be suppressed, can be provided by a method for producing a laminated material by forming a second transparent resin layer on a first transparent resin layer formed using a resin or monomer that is soluble in an organic solvent, by applying an ammonium salt of a monomer having an acid group or an ammonium salt of a resin having an acid group using a water-based solvent.

The invention providing specific means for solving the problems described above is as follows.

[1] A method for producing a laminated material, the method comprising:

forming a first transparent resin layer on a base material; and forming a second transparent resin layer directly on the first transparent resin layer, in which the forming a first transparent resin layer is applying an organic solvent-based resin composition on the base material described above, and the forming a second transparent resin layer is applying a water-based resin composition including an ammonium salt of a monomer having an acid group or an ammonium salt of a resin having an acid group.

[2] It is preferable that the method for producing a laminated material according to [1] further comprises dissolving a monomer having an acid group or a resin having an acid group in an aqueous ammonia solution, and producing a water-based resin composition including a monomer or a resin, in which at least a portion of the acid groups have been converted to an ammonium salt.

[3] It is preferable that the method for producing a laminated material according to [1] or [2] further comprises producing an acid group by volatilizing ammonia from the ammonium salt of the monomer having an acid group or the ammonium salt of the resin having an acid group.

[4] In the method for producing a laminated material according to [3], it is preferable that the producing an acid group by volatilizing ammonia from the ammonium salt of the monomer having an acid group or the ammonium salt of the resin having an acid group, is heating the aforementioned water-based resin composition that has been applied.

[5] In the method for producing a laminated material according to any one of [1] to [4], it is preferable that the base material is a film.

[6] In the method for producing a laminated material according to any one of [1] to [5], it is preferable that the acid group is a carboxyl group.

[7] In the method for producing a laminated material according to any one of [1] to [6], it is preferable that the pH at 25° C. of the water-based resin composition is from 7.0 to 12.0.

[8] In the method for producing a laminated material according to any one of [1] to [7], it is preferable that the first transparent resin layer contains a binder polymer, a photopolymerizable compound, and a photopolymerization initiator.

[9] In the method for producing a laminated material according to any one of [1] to [8], it is preferable that the binder polymer of the first transparent resin layer includes an acrylic resin.

[10] In the method for producing a laminated material according to any one of [1] to [9], it is preferable that the film thickness of the first transparent resin layer is 1 to 15 μm.

[11] In the method for producing a laminated material according to any one of [1] to [10], it is preferable that the ammonium salt of the monomer having an acid group or the ammonium salt of the resin having an acid group of the second transparent resin layer is an ammonium salt of an acrylic monomer or acrylic resin having an acid group.

[12] In the method for producing a laminated material according to any one of [1] to [11], it is preferable that the solvent of the water-based resin composition includes water and an alcohol having 1 to 3 carbon atoms.

[13] In the method for producing a laminated material according to any one of [1] to [12], it is preferable that the second transparent resin layer is at least any one of a thermosetting resin layer or a photocurable resin layer.

[14] A laminated material comprising a base material, a first transparent resin layer, and a second transparent resin layer that is disposed adjacently to the first transparent resin layer, in this order, in which the first transparent resin layer is formed by applying an organic solvent-based resin composition on the base material, and the second transparent resin layer is formed by applying a water-based resin composition including an ammonium salt of a monomer having an acid group or an ammonium salt of a resin having an acid group, on the first transparent resin layer.

[15] A laminated material produced by the method for producing a laminated material according to any one of [1] to [13].

[16] It is preferable that the laminated material according to [14] to [15] is a transfer material.

[17] A method for producing a transparent laminate, the method comprising laminating, on a transparent electrode pattern, the aforementioned second transparent resin layer and the aforementioned first transparent resin layer of the laminated material according to any one of [14] to [16] in this order.

[18] A transparent laminate produced by the method for producing a transparent laminate according to [17].

[19] A capacitance-type input device produced by using the laminated material according to any one of [14] to [16] and laminating the aforementioned second transparent resin layer and the aforementioned first transparent resin layer of the laminated material in this order on a substrate including a transparent electrode pattern.

[20] A capacitance-type input device comprising the transparent laminate according to [18].

[21] An image display device comprising the capacitance-type input device according to [19] or [20] as a constituent element.

According to the invention, a laminated material which exhibits satisfactory layer demarcation, and by which a problem caused by moisture absorption of a transparent resin layer formed using a water-based resin composition in a case in which the laminated material is subjected to a high temperature and high humidity environment for a period of time can be suppressed, can be provided.

BRIEF DESCRIPTION OF THE DRAWINGS

FIG. 14 is a schematic view illustrating an example of a state before the laminated material of the invention having first and second transparent resin layers is laminated on a transparent electrode pattern of a capacitance-type input device by lamination and cured by exposure to light or the like.

DESCRIPTION OF THE PREFERRED EMBODIMENTS

Figure 1A:
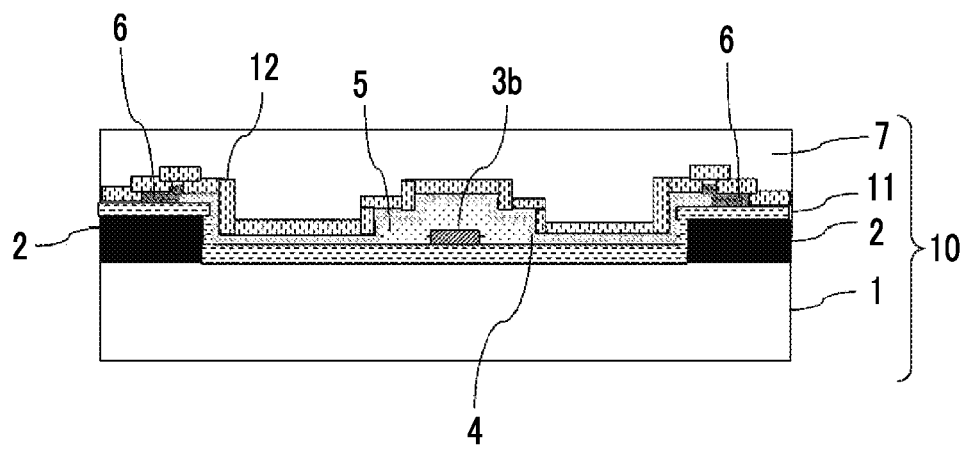
FIG. 1A is a schematic cross-sectional view illustrating an example of the configuration of the capacitance-type input device of the invention.

Hereinafter, the laminated material, the method for producing a laminated material, the transparent laminate, the method for producing a transparent laminate, the capacitance-type input device, and the image display device of the invention will be explained. The explanation of the configuration requirements described below may be based on representative embodiments or specific examples of the invention; however, the invention is not intended to be limited to such embodiments or specific examples. Meanwhile, a value range indicated using "to" in the present specification means a range including the values described before and after "to" as a lower limit value and an upper limit value.

[Method for Producing Laminated Material]

The method for producing a laminated material of the invention includes a step of forming a first transparent resin layer on a base material; and a step of forming a second transparent resin layer directly on the first transparent resin layer, and the step of forming the first transparent resin layer is a step of applying an organic solvent-based resin composition on the base material, and the step of forming the second transparent resin layer is a step of applying a water-based resin composition including an ammonium salt of a monomer having an acid group or an ammonium salt of a resin having an acid group.

When such a configuration is employed, layer demarcation is achieved at a satisfactory level, and a problem caused by moisture absorption of a transparent resin layer formed using a water-based resin composition in a case in which the laminated material is subjected to a high temperature and high humidity environment for a period of time can be suppressed. When a water-based resin composition including an ammonium salt of a monomer having an acid group or an ammonium salt of a resin having an acid group is applied on a first transparent resin layer obtained using an organic solvent-based resin composition, even if the second transparent resin layer is formed without curing the first transparent resin layer, layer mixing does not occur, and layer demarcation is achieved at a satisfactory level. Furthermore, when the coating film using a water-based resin composition including an ammonium salt of a monomer having an acid group or an ammonium salt of a resin having an acid group is dried, ammonia having a boiling point lower than that of water is likely to volatilize from the ammonium salt of a monomer having an acid group or the ammonium salt of a resin having an acid group during the drying step. Therefore, acid groups can be produced (regenerated) and made to exist in the second transparent resin layer as a monomer having an acid group or a resin having an acid group. Accordingly, in a case in which the laminated material is caused to absorb moisture by subjecting the laminated material to a high temperature and high humidity environment for a period of time, since the monomer having an acid group or the resin having an acid group, both of which constitute the second transparent resin layer, have already become insoluble in water, the problem occurring when the laminated material has absorbed moisture can also be suppressed.

<Step of Forming First Transparent Resin Layer on Base Material>

The method for producing a laminated material of the invention has a step of forming a first transparent resin layer on a base material, and the step of forming a first transparent resin layer is a step of applying an organic solvent-based resin composition on the aforementioned base material.

(Base Material)

The base material used for the method for producing a laminated material of the invention is not particularly limited, and examples thereof include a glass plate, a Si wafer, paper, a nonwoven fabric, and a film. Among them, the base material is preferably a film, and more preferably a resin film.

Regarding the film used as the base material, a material which has flexibility and does not undergo significant deformation, shrinkage, or stretching under pressure, or upon heating under pressure, can be used. Examples of such a base material include a polyethylene terephthalate film, a cellulose triacetate film, a polystyrene film, and a polycarbonate film, and among these, a biaxially stretched polyethylene terephthalate film is particularly preferred.

The thickness of the base material is not particularly limited, and the thickness is generally in the range of 5 to 200 μm. From the viewpoints of ease of handling, general-purpose usability, and the like, the thickness is particularly preferably in the range of 10 to 150 μm, and from the viewpoint of weight reduction, the thickness is more preferably in the range of 10 to 20 μm.

Furthermore, conductivity can be imparted to the base material by the method described in JP2005-221726A or the like.

(Organic Solvent-Based Resin Composition)

An organic solvent-based resin composition refers to a resin composition including an organic solvent. It is preferable that the organic solvent-based resin composition dissolves in an organic solvent.

Regarding the organic solvent, a general organic solvent can be used. Examples of the organic solvent include methyl ethyl ketone, propylene glycol monomethyl ether, propylene glycol monomethyl ether acetate, cyclohexanone, methyl isobutyl ketone, ethyl lactate, methyl lactate, and caprolactam.

According to the method for producing a laminated material of the invention, it is preferable that the organic solvent-based resin composition used for forming the first transparent resin layer includes a binder polymer, a photopolymerizable compound, and a photopolymerization initiator.

—Binder Polymer—

Regarding the binder polymer that is included in the organic solvent-based resin composition used for forming the aforementioned first transparent resin layer, any arbitrary polymer component can be used without any particular limitations; however, from the viewpoint of being used as a transparent protective film for a capacitance-type input device, a polymer component having high surface hardness and high heat resistance is preferred, and an alkali-soluble resin is more preferred. Among alkali-soluble resins, a known photosensitive siloxane resin material, a known acrylic resin material, or the like is preferably used. According to the method for producing a laminated material of the invention, it is preferable that the binder polymer included in the organic solvent-based resin composition used for forming the first transparent resin layer includes an acrylic resin, and it is more preferable from the viewpoint of increasing the interlayer adhesiveness before and after transferring the first transparent resin layer and the second transparent resin layer, that the binder polymer included in the organic solvent-based resin composition used for forming the first transparent resin layer, and the resin having an acid group or the binder polymer included in the water-based resin composition used for forming the second transparent resin layer that will be described below both include an acrylic resin. A preferred range of the binder polymer of the first transparent resin layer will be specifically explained.

The acid value of the binder polymer is preferably 50 to 150 mg KOH/g, more preferably 70 to 120 mg KOH/g, and even more preferably 80 to 110 mg KOH/g.

Regarding the resin having solubility in the organic solvent, used for the organic solvent-based resin composition used for forming the first transparent resin layer, there are no particular limitations as long as there is no effect that is contradictory to the purport of the invention, and the resin can be appropriately selected from among known resins. An alkali-soluble resin is preferred, the and regarding the alkali-soluble resin, the polymers described in paragraph 0025 of JP2011-95716A, and paragraphs 0033 to 0052 of JP2010-237589A can be used.

Furthermore, the organic solvent-based resin composition used for forming the first transparent resin layer may include a polymer latex. The polymer latex used herein is a product in which fine particles of a water-insoluble polymer are dispersed in water. Details of the polymer latex are described in, for example, Soichi Muroi, "Kobunshi Lateksu no Kagaku (Chemistry of Polymer Latexes) (published by Kobunshi Kankokai (1973))".

Regarding the polymer particles that can be used, polymer particles formed from acrylic, vinyl acetate-based, rubber-based (for example, styrene-butadiene-based and chloroprene-based), olefin-based, polyester-based, polyurethane-based, and polystyrene-based polymers, and copolymers of these polymers are preferred.

It is preferable to strengthen the mutual binding force between the polymer chains that constitute the polymer particles. Regarding the means for strengthening the mutual binding force between the polymer chains, a method of utilizing an interaction based on hydrogen bonding, and a method of producing covalent bonds may be employed. Regarding the means for providing a hydrogen bonding force, it is preferable to introduce a monomer having a polar group into the polymer chain through copolymerization or graft polymerization. Examples of the polar group include a carboxyl group (present in acrylic acid, methacrylic acid, itaconic acid, fumaric acid, maleic acid, crotonic acid, partially esterified maleic acid, and the like), primary, secondary, and tertiary amino groups, an ammonium salt group, and a sulfonic acid group (styrenesulfonic acid), and a carboxyl group and a sulfonic acid group are particularly preferred.

A preferred range of the copolymerization ratio of these monomers having a polar group is 5% to 35% by mass, more preferably 5% to 20% by mass, and even more preferably in the range of 15% to 20% by mass, with respect to 100% by mass of the polymer. On the other hand, regarding the means for producing covalent bonds, a method of reacting a hydroxyl group, a carboxyl group, a primary or secondary amino group, an acetoacetyl group, a sulfonic acid, or the like, with an epoxy compound, a blocked isocyanate, an isocyanate, a vinylsulfone compound, an aldehyde compound, a methylol compound, a carboxylic acid anhydride, or the like, may be employed.

Among the polymers that utilize these reactions, a polyurethane derivative obtainable by a reaction between a polyol and a polyisocyanate compound is preferred, it is more preferable to use a polyvalent amine in combination as a chain extending agent, and it is particularly preferable to introduce the above-mentioned polar groups into the polymer chain to obtain an ionomer type polymer.

The weight average molecular weight of the polymer is preferably 10,000 or more, and more preferably 20,000 to 100,000. Examples of a polymer suitable for the invention include an ethylene ionomer, which is a copolymer of ethylene and methacrylic acid, and a polyurethane ionomer.

The polymer latex that can be used for the invention may be a polymer latex obtainable by emulsion polymerization, or may be a polymer latex obtainable by emulsification. Methods for producing these polymer latexes are described in, for example, "Emulsion Latex Handbook" (edited by Emulsion Latex Handbook Editorial Committee, published by Taiseisha, Ltd. (1975)).

Examples of the polymer latex that can be used for the invention include aqueous dispersions of polyethylene ionomers (trade name: CHEMIPEARL S120 manufactured by Mitsui Chemicals, Incorporated, solid content 27%, CHEMIPEARL S100 manufactured by Mitsui Chemicals, Incorporated, solid content 27%, CHEMIPEARL S111 manufactured by Mitsui Chemicals, Incorporated, solid content 27%, CHEMIPEARL S200 manufactured by Mitsui Chemicals, Incorporated, solid content 27%. CHEMIPEARL S300 manufactured by Mitsui Chemicals, Incorporated, solid content 35%, CHEMIPEARL S650 manufactured by Mitsui Chemicals, Incorporated, solid content 27%), and CHEMIPEARL S75N manufactured by Mitsui Chemicals, Incorporated, solid content 24%); aqueous dispersions of polyether-based polyurethanes (trade name: HYDRAN WLS-201 manufactured by DIC Corporation, solid content 35%, Tg: −50° C.), (trade name: HYDRAN WLS-202 manufactured by DIC Corporation, solid content 35%, Tg: −50° C.), (trade name: HYDRAN WLS-221 manufactured by DIC Corporation, solid content 35%, Tg: −30° C.), (trade name: HYDRAN WLS-210 manufactured by DIC Corporation, solid content 35%, Tg: −15° C.), (trade name: HYDRAN WLS-213 manufactured by DIC Corporation, solid content 35%, Tg: −15° C.), (trade name: HYDRAN WLI-602 manufactured by DIC Corporation, solid content 39.5%, Tg: −50° C.), and (trade name: HYDRAN WLI-611 manufactured by DIC Corporation, solid content 39.5%, Tg: −15° C.); an alkyl acrylate copolymer ammonium (trade name: JURYMER AT-210, manufactured by Japan Pure Chemical Co., Ltd.), an alkyl acrylate copolymer ammonium (trade name: JURYMER ET-410 manufactured by Japan Pure Chemical Co., Ltd.), an alkyl acrylate copolymer ammonium (trade name: JURYMER AT-510 manufactured by Japan Pure Chemical Co., Ltd.); and a product obtained by neutralizing polyacrylic acid (trade name: JURYMER AC-10L manufactured by Japan Pure Chemical Co., Ltd.) with ammonia and emulsifying the resultant.

—Photopolymerizable Compound—

Regarding the photopolymerizable compound used for the water-based resin composition or the organic solvent-based resin composition, the photopolymerizable compounds described in paragraphs 0023 to 0024 of JP4098550B can be used. Among them, pentaerythritol tetraacrylate, pentaerythritol triacrylate, and tetraacrylate of an ethylene oxide (EO) adduct of pentaerythritol can be preferably used. These polymerizable compounds may be used singly, or may be used as mixtures of plural compounds. In a case in which a mixture of pentaerythritol tetraacrylate and pentaerythritol triacrylate is used, the ratio of pentaerythritol triacrylate is preferably 0% to 80%, and more preferably 10% to 60%, as a mass ratio.

Examples of the photopolymerizable compound used for the organic solvent-based resin composition include polyethylene glycol di(meth)acrylate, polypropylene glycol di(meth)acrylate, trimethylolethane triacrylate, trimethylolpropane triacrylate, trimethylolpropane diacrylate, neopentyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth)acrylate, trimethylolpropane tri(acryloyloxypropyl) ether, tri(acryloyloxyethyl) isocyanurate, tri(acryloyloxyethyl) cyanurate, glycerin tri(meth)acrylate, a product obtained by subjecting a polyfunctional alcohol such as trimethylolpropane, glycerin, or bisphenol to an addition reaction with ethylene oxide or propylene oxide, and then (meth)acrylating the resultant; the urethane acrylates described in JP1973-41708B (JP-S48-41708B), JP1975-6034B (JP-S50-6034B), JP1976-37193A (JP-S51-37193A), and the like; the polyester acrylates described in JP1973-64183A (JP-S48-64183A), JP1974-43191B (JP-S49-43191B), JP1977-30490B (JP-S52-30490B), and the like; and polyfunctional acrylates or methacrylates such as an epoxy acrylate, which is a reaction product of an epoxy resin and (meth)acrylic acid. Among these, trimethylolpropane tri(meth)acrylate, pentaerythritol tetra(meth)acrylate, dipentaerythritol hexa(meth)acrylate, dipentaerythritol penta(meth)acrylate, a mixture of pentaerythritol tetraacrylate (NK ESTER A-TMMT manufactured by Shin-Nakamura Chemical Co., Ltd.), and tetraacrylate of an ethylene oxide (EO) adduct of pentaerythritol (KAYARAD RP-1040 manufactured by Nippon Kayaku Co., Ltd.) can be preferably used. These may be used singly, or two or more kinds thereof may be used in combination.

—Photopolymerization Initiator—

When the organic solvent-based resin composition used for forming the first transparent resin layer includes the photopolymerizable compound and the photopolymerization initiator, pattern formation in the first transparent resin layer and the second transparent resin layer can be easily achieved.

Regarding the photopolymerization initiator used for the organic solvent-based resin composition, the photopolymerization initiators described in paragraphs 0031 to 0042 of JP2011-95716A can be used. Examples thereof that can be preferably used include 1,2-octanedione, 1-[4-(phenylthio)-, 2-(O-benzoyl oxime)] (trade name: IRGACURE OXE-01, manufactured by BASF SE), as well as ethanone, 1-[9-ethyl-6-(2-methylbenzoyl)-9H-carbazol-3-yl]-, 1-(O-acetyloxime) (trade name: IRGACURE OXE-02, manufactured by BASF SE), 2-(dimethylamino)-2-[(4-methylphenyl)methyl]-1-[4-(4-morpholinyl)phenyl]-1-butanone (trade name: IRGACURE 379EG, manufactured by BASF SE), 2-methyl-1-(4-methylthiophenyl)-2-morpholinopropan-1-one (trade name: IRGACURE 907, manufactured by BASF SE), 2-hydroxy-1-{4-[4-(2-hydroxy-2-methyl-propionyl)-benzyl]phenyl}-2-methyl-propan-1-one (trade name: IRGACURE 127, manufactured by BASF SE), 2-benzyl-2-dimethylamino-1-(4-morpholinophenyl)-butanone-1 (trade name: IRGACURE 369, manufactured by BASF SE), 2-hydroxy-2-methyl-1-phenyl-propan-1-one (trade name:

IRGACURE 1173, manufactured by BASF SE), 1-hydroxy-cyclohexyl-phenyl-ketone (trade name: IRGACURE 184, manufactured by BASF SE), 2,2-dimethoxy-1,2-diphenyle-than-1-one (trade name: IRGACURE 651, manufactured by BASF SE), and oxime ester-based agents (trade name: Lunar 6, manufactured by DKSH Japan K.K.).

In the organic solvent-based resin composition used for forming the first transparent resin layer, the photopolymerization initiator is included at a proportion of preferably 1% by mass or more, and more preferably 2% by mass or more, with respect to the solid content of the organic solvent-based resin composition used for forming the first transparent resin layer. In the organic solvent-based resin composition used for forming the first transparent resin layer, the photopolymerization initiator is included at a proportion of preferably 10% by mass or less, and more preferably 5% by mass or less, with respect to the solid content of the organic solvent-based resin composition used for forming the first transparent resin layer, from the viewpoint of improving the patterning properties and adhesiveness to substrate of the transparent laminate of the invention.

—Metal Oxide Particles—

The organic solvent-based resin composition used for forming the first transparent resin layer may or may not include particles (preferably, metal oxide particles), for the purpose of regulating the refractive index or light transmitting properties. In order to control the refractive index of the first transparent resin layer to the range described above, the organic solvent-based resin composition may include metal oxide particles at any arbitrary proportion depending on the type of the polymer or polymerizable compound used. In the organic solvent-based resin composition used for forming the first transparent resin layer, the metal oxide particles are included at a proportion of preferably 0% to 35% by mass, more preferably 0% to 10% by mass, and particularly preferably 0% to 1% by mass, with respect to the solid content of the organic solvent-based resin composition used for forming the first transparent resin layer.

Since metal oxide particles have high transparency and are light transmitting properties, a positive type photosensitive resin composition having a high refractive index and excellent transparency is obtained.

It is preferable that the metal oxide particles have a refractive index that is higher than the refractive index of a composition formed from materials excluding these particles from the first transparent resin layer or the second transparent resin layer. Specifically, it is more preferable for the laminated material of the invention that the second transparent resin layer contains particles having a refractive index of 1.50 or higher for light having a wavelength of 400 to 750 nm; it is even more preferable that the second transparent resin layer contains particles having a refractive index of 1.55 or higher; it is particularly preferable that the second transparent resin layer contains particles having a refractive index of 1.70 or higher; and it is most preferable that the second transparent resin layer contains particles having a refractive index of 1.90 or higher.

Here, when it is said that the refractive index for light having a wavelength of 400 to 750 nm is 1.50 or higher, it is implied that the average refractive index for light having a wavelength in the range described above is 1.50 or higher, and it is not necessary for the refractive index for all the lines of light having a wavelength in the range described above to be 1.50 or higher. Furthermore, the average refractive index is a value obtained by dividing the sum total of the measured values of refractive index for various lines of light having a wavelength in the range described above, by the number of measurement points.

It should be noted that the metals of the metal oxide particles also include semi-metals such as B, Si, Ge, As, Sb, and Te.

Regarding metal oxide particles having light transmitting properties and a high refractive index, oxide particles containing atoms of Be, Mg, Ca, Sr, Ba, Sc, Y, La, Ce, Gd, Tb, Dy, Yb, Lu, Ti, Zr, Hf, Nb, Mo, W, Zn, B, Al, Si, Ge, Sn, Pb, Sb, Bi, Te, and the like are preferred. Titanium oxide, titanium composite oxide, zinc oxide, zirconium oxide, indium/tin oxide, and antimony/tin oxide are more preferred; titanium oxide, titanium composite oxide, and zirconium oxide are even more preferred; titanium oxide and zirconium oxide are particularly preferred; and titanium dioxide is most preferred. Regarding titanium dioxide, rutile type titanium dioxide having a high refractive index is particularly preferred. These metal oxide particles can have the surface treated with an organic material in order to impart dispersion stability to the particles.

From the viewpoint of transparency of the first transparent resin layer and the second transparent resin layer, the average primary particle diameter of the metal oxide particles is preferably 1 to 200 nm, and particularly preferably 3 to 80 nm. Here, the average primary particle diameter of the particles refers to the value obtained by measuring the particle diameters of 200 arbitrary particles using an electron microscope, and determining the arithmetic mean value thereof. Furthermore, in a case in which the shape of the particles is not a spherical shape, the longest edge is considered as the diameter.

Furthermore, the metal oxide particles may be used singly, or two or more kinds thereof may be used in combination.

In regard to the laminated material of the invention, it is preferable that the first transparent resin layer and the second transparent resin layer has at least one of $ZrO_2$ particles, $Nb_2O_5$ particles, or $TiO_2$ particles, from the viewpoint of controlling the refractive index in the range of refractive indices for the first transparent resin layer and the second transparent resin layer, and $ZrO_2$ particles and $Nb_2O_5$ particles are more preferred.

The second curable transparent resin layer may or may not include metal oxide particles; however, it is preferable that the second curable transparent resin layer includes metal oxide particles, from the viewpoint of controlling the refractive index of the second curable transparent resin layer in the range described above. In the second curable transparent resin layer, the metal oxide particles may be included at an arbitrary proportion depending on the type of the polymer or the polymerizable compound used; however, in the second curable transparent resin layer, the metal oxide particles are included preferably at a proportion of 40% to 95% by mass, more preferably at a proportion of 50% to 90% by mass, and particularly preferably at a proportion of 55% to 85% by mass, with respect to the solid content of the second curable transparent resin layer.

<Step of Forming Second Transparent Resin Layer>

The method for producing a laminated material of the invention has a step of forming a second transparent resin layer directly on the first transparent resin layer, and the step of forming the second transparent resin layer is a step of applying a water-based resin composition including an ammonium salt of a monomer having an acid group or an ammonium salt of a resin having an acid group.

(Water-Based Resin Composition)

A water-based resin composition refers to a resin composition including water. It is preferable that the water-based resin composition is soluble in a water-based solvent.

The water-based solvent is preferably water, or a mixed solvent of a lower alcohol having 1 to 3 carbon atoms and water. According to a preferred embodiment of the method for producing a laminated material of the invention, it is preferable that the solvent of the water-based resin composition used for forming the second transparent resin layer includes water and an alcohol having 1 to 3 carbon atoms, and it is more preferable that the solvent includes water or a mixed solvent such that the content ratio of water/alcohol having 1 to 3 carbon atoms is 58/42 to 100/0 as a mass ratio. The content ratio of water/alcohol having 1 to 3 carbon atoms is particularly preferably in the range of 59/41 to 100/0 as a mass ratio, and from the viewpoint of improving coloration of the transparent laminate of the invention, a content ratio of 60/40 to 97/3 is more particularly preferred. From the viewpoint of improving the adhesiveness to substrate of the transparent laminate of the invention, a content ratio of 62/38 to 95/5 is even more particularly preferred, and a content ratio of 62/38 to 85/15 is most preferred.

Water, a mixed solvent of water and methanol, and a mixed solvent of water and ethanol are preferred, and from the viewpoints of drying and coatability, a mixed solvent of water and methanol is preferred.

Particularly, in a case in which a mixed solvent of water and methanol is used when the second transparent resin layer is formed, the mass ratio (mass % ratio) of water/methanol is preferably 58/42 to 100/0, more preferably in the range of 59/41 to 100/0, particularly preferably 60/40 to 97/3, more particularly preferably 62/38 to 95/5, and even more particularly 62/38 to 85/15. In regard to this content ratio of water/alcohol having 1 to 3 carbon atoms, if the amount of methanol included becomes larger than the mass ratio in the range of 58/42, the first transparent resin layer dissolves or becomes cloudy, which is not preferable.

By controlling the mixing ratio of the solvent in the range described above, application and rapid drying can be realized without layer mixing with the second transparent resin layer.

The pH of the water-based resin composition at 25° C. is preferably from 7.0 to 12.0, more preferably 7.0 to 10.0, and particularly preferably 7.0 to 8.5. For example, the pH of the water-based resin composition can be adjusted to the preferred range described above, by using an excess amount of ammonia with respect to the acid groups and adding a monomer having an acid group or a resin having an acid group.

Furthermore, in regard to the method for producing a laminated material of the invention, it is preferable that the water-based resin composition used for forming the second transparent resin layer is at least one of a thermosetting resin composition or a photocurable resin composition. In a case in which the first transparent resin layer and the second transparent resin layer are such curable transparent resin layers, according to the method for producing a laminated material of the invention, even if the second transparent resin layer is laminated without curing the first transparent resin layer after lamination, layer demarcation is achieved at a satisfactory level, and the visibility of the transparent electrode pattern can be improved. Also, the refractive index-adjusting layers (that is, first and second transparent resin layers) may be transferred from the laminated material (transfer material, and preferably a transfer film) thus obtained onto a transparent electrode pattern, and then the refractive index-adjusting layers can be developed into a desired pattern by photolithography.

In regard to the method for producing a laminated material of the invention, it is preferable that the water-based resin composition used for forming the second transparent resin layer includes an ammonium salt of a monomer having an acid group or an ammonium salt of a resin having an acid group, and includes a binder polymer, a photopolymerizable or thermopolymerizable compound, and a photopolymerization or thermal polymerization initiator. It is acceptable that only the ammonium salt of a resin having an acid group is a binder polymer, and another binder polymer may also be used together in addition to the ammonium salt of a resin having an acid group. The ammonium salt of a monomer having an acid group may be a photopolymerizable or thermopolymerizable compound, and another photopolymerizable or thermopolymerizable compound may also be used together in addition to the ammonium salt of a monomer having an acid group.

—Ammonium Salt of Monomer Having Acid Group or Ammonium Salt of Resin Having Acid Group—

The water-based resin composition includes an ammonium salt of a monomer having an acid group or an ammonium salt of a resin having an acid group.

The ammonium salt of a monomer having an acid group or the ammonium salt of a resin having an acid group is not particularly limited.

In regard to the method for producing a laminated material of the invention, it is preferable that the ammonium salt of a monomer having an acid group or the ammonium salt of a resin having an acid group of the second transparent resin layer is an ammonium salt of an acrylic monomer or acrylic resin having an acid group.

It is preferable that the method for producing a laminated material of the invention includes a step of dissolving a monomer having an acid group or a resin having an acid group in an aqueous ammonia solution, and producing a water-based resin composition including a monomer or resin in which at least a portion of the acid groups have been converted to ammonium salt.

The concentration of the aqueous ammonia solution that can be used for the invention is not particularly limited; however, an aqueous ammonia solution having an ammonia concentration of 0.1% to 25% by mass is preferred, an aqueous ammonia solution having an ammonia concentration of 0.5% to 10% by mass is more preferred, and an aqueous ammonia solution having an ammonia concentration of 1% to 5% by mass is particularly preferred.

—Resin Having Acid Group—

The monomer having an acid group or the resin having an acid group is preferably a resin having an acid group, and more preferably a resin having a monovalent acid group (carboxyl group or the like).

There are no particular limitations on the resin that is used for the water-based resin composition used for forming the second transparent resin layer and has solubility in a water-based solvent (preferably water or a mixed solvent of a lower alcohol having 1 to 3 carbon atoms and water), as long as there is no effect that is contradictory to the purport of the invention, and the resin can be appropriately selected from known resins.

The resin having an acid group that is used for the water-based resin composition is preferably an alkali-soluble resin. The alkali-soluble resin can be appropriately selected from among alkali-soluble resins, which are linear organic high molecular weight polymers, each of the alkali-soluble resins having at least one group that promotes solubilization in alkali (that is, an acid group; for example, a carboxyl group, a phosphoric acid group, or a sulfonic acid group) in the molecule (preferably, a molecule having an acrylic copolymer or a styrene-based copolymer as the main chain). Among these, a more preferred alkali-soluble resin is a resin that is soluble in an organic solvent and can be developed using an aqueous solution of a weak alkali. The acid group is preferably a carboxyl group.

For the production of the alkali-soluble resin, for example, a method following a known radical polymerization method can be applied. The polymerization conditions such as temperature, pressure, the type and amount of the radical initiator, and the type of the solvent, which are employed when the alkali-soluble resin is produced by a radical polymerization method, can be easily set by a person having ordinary skill in the art, and the conditions may also be determined experimentally.

The linear organic high molecular weight polymer is preferably a polymer having a carboxylic acid in a side chain. Examples thereof include poly(meth)acrylic acid, a methacrylic acid copolymer, an acrylic acid copolymer, an itaconic acid copolymer, a crotonic acid copolymer, a maleic acid copolymer such as styrene/maleic acid, a partially esterified maleic acid copolymer, an acidic cellulose derivative having a carboxylic acid in a side chain, such as carboxyalkyl cellulose or carboxyalkyl starch, and a product obtained by adding an acid anhydride to a polymer having hydroxyl groups, which are described in JP1984-44615A (JP-S59-44615A), JP1979-34327B (JP-S54-34327B), JP1983-12577B (JP-S58-12577B), JP1979-25957B (JP-S54-25957B), JP1984-53836A (JP-S59-53836A), JP1984-71048A (JP-S59-71048A), JP1971-2121A (JP-S46-2121A), and JP1981-40824B (JP-S56-40824B). A high molecular weight polymer having a reactive functional group such as a (meth)acryloyl group in a side chain may also be preferably used.

Among these, particularly, a benzyl (meth)acrylate/(meth)acrylic acid copolymer or a multi-component copolymer formed from benzyl (meth)acrylate/(meth)acrylic acid/another monomer is suitable.

In addition to these, a product obtained by copolymerizing 2-hydroxyethyl methacrylate or the like may also be mentioned as a useful polymer. This polymer can be mixed in an arbitrary amount and used.

In addition to those described above, a 2-hydroxypropyl (meth)acrylate/polystyrene macromonomer/benzyl methacrylate/methacrylic acid copolymer, a 2-hydroxy-3-phenoxypropyl acrylate/polymethyl methacrylate macromonomer/benzyl methacrylate/methacrylic acid copolymer, a 2-hydroxyethyl methacrylate/polystyrene macromonomer/methyl methacrylate/methacrylic acid copolymer, and a 2-hydroxyethyl methacrylate/polystyrene macromonomer/benzyl methacrylate/methacrylic acid copolymer described in JP1995-140654A (JP-H07-140654A) may be employed.

In regard to specific constitutional units of the alkali-soluble resin, particularly, a copolymer of (meth)acrylic acid and another monomer copolymerizable with this (meth)acrylic acid is suitable.

Examples of the other monomer copolymerizable with (meth)acrylic acid include an alkyl (meth)acrylate, an aryl (meth)acrylate, and a vinyl compound. Here, the hydrogen atoms of the alkyl group and the aryl group may be substituted with substituents.

Specific examples of the alkyl (meth)acrylate and aryl (meth)acrylate include methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, phenyl (meth)acrylate, benzyl acrylate, tolyl acrylate, naphthyl acrylate, and cyclohexyl acrylate.

Furthermore, examples of the vinyl compound include styrene, α-methylstyrene, vinyltoluene, glycidyl methacrylate, acrylonitrile, vinyl acetate, N-vinylpyrrolidone, tetrahydrofurfuryl methacrylate, a polystyrene macromonomer, a polymethyl methacrylate macromonomer, $CH_2\!=\!CR^1R^2$, and $CH_2\!=\!C(R^1)(COOR^3)$ [wherein $R^1$ represents a hydrogen atom or an alkyl group having 1 to 5 carbon atoms; $R^2$ represents an aromatic hydrocarbon ring having 6 to 10 carbon atoms; and $R^3$ represents an alkyl group having 1 to 8 carbon atoms or an aralkyl group having 6 to 12 carbon atoms].

These other copolymerizable monomers can be used singly or in combination of two or more kinds thereof. A preferred other copolymerizable monomer is at least one selected from $CH_2\!=\!CR^1R^2$, $CH_2\!=\!C(R^1)(COOR^3)$, phenyl (meth)acrylate, benzyl (meth)acrylate, and styrene, and particularly preferred is $CH_2\!=\!CR^1R^2$ and/or $CH_2\!=\!C(R^1)(COOR^3)$.

In addition to these, a resin obtained by reacting a (meth)acrylic compound, cinnamic acid, or the like, all of which have a reactive functional group, with a linear polymer having a substituent that can react with this reactive functional group, and introducing an ethylenically unsaturated double bond into this linear polymer, may be employed. Examples of the reactive functional group include a hydroxyl group, a carboxyl group, and an amino group, and examples of the substituent that can react with this reactive functional group include an isocyanate group, an aldehyde group, and an epoxy group.

Among these, the resin having an acid group is preferably an acrylic resin having an acid group. In the present specification, acrylic resins include both methacrylic resins and acrylic resins, and similarly, (meth)acryl includes methacryl and acryl.

—Monomer Having Acid Group—

Regarding the monomer having an acid group, an acrylic monomer such as (meth)acrylic acid or a derivative thereof, or the following monomer can be preferably used.

For example, a trifunctional or tetrafunctional radical polymerizable monomer (a product obtained by introducing a carboxylic acid group into a pentaerythritol tri- and tetra-acrylate [PETA] skeleton (acid value=80 to 120 mg KOH/g)), and a pentafunctional or hexafunctional radical polymerizable monomer (a product obtained by introducing a carboxylic acid group into a dipentaerythritol penta- and hexa-acrylate [DPHA] skeleton (acid value=25 to 70 mg KOH/g)) may be used. Specific names thereof are not described herein; however, bifunctional alkali-soluble radical polymerizable monomers may also be used, if necessary.

In addition to that, the monomers having acid groups described in paragraphs [0025] to [0030] of JP2004-239942A can also be preferably used, the disclosure of which is incorporated herein.

Among these, an acrylic monomer such as (meth)acrylic acid or a derivative thereof can be more preferably used. In the present specification, acrylic monomers include both methacrylic monomers and acrylic monomers.

—Other Binder Polymer—

There are no particular limitations on the other binder polymer that does not have an acid group, which is used for the water-based resin composition, and the binder polymer used for the organic solvent-based resin composition that is used for forming the first transparent resin layer can be used.

—Polymerizable Compound—

It is preferable that the water-based resin composition used for forming the second transparent resin layer includes a polymerizable compound such as the photopolymerizable compound or the thermopolymerizable compound, from the viewpoint of curing the resin composition and thereby increasing the hardness of the film or the like. It is more preferable that the water-based resin composition includes a photopolymerizable compound other than the monomer having an acid group.

Regarding the polymerizable compound used for the water-based resin composition, the polymerizable compounds described in paragraphs 0023 and 0024 of JP4098550B can be used. Among them, pentaerythritol tetraacrylate, pentaerythritol triacrylate, and tetraacrylate of an ethylene oxide (EO) adduct of pentaerythritol can be preferably used. These polymerizable compounds may be used singly, or plural compounds may be used together. In a case in which a mixture of pentaerythritol tetraacrylate and pentaerythritol triacrylate is used, the ratio of pentaerythritol triacrylate is preferably 0% to 80% as a mass ratio, and more preferably 10% to 60%.

Specific examples of the photopolymerizable compound used for the water-based resin composition include a water-soluble polymerizable compound represented by the following structural formula 1, a pentaerythritol tetraacrylate mixture (NK ESTER A-TMMT manufactured by Shin-Nakamura Chemical Co., Ltd., containing about 10% of triacrylates as impurities), a mixture of pentaerythritol tetraacrylate and triacrylate (NK ESTER A-TMM3LM-N manufactured by Shin-Nakamura Chemical Co., Ltd., triacrylate 37%), a mixture of pentaerythritol tetraacrylate and triacrylate (NK ESTER A-TMM-3L manufactured by Shin-Nakamura Chemical Co., Ltd., triacrylate 55%), a mixture of pentaerythritol tetraacrylate and triacrylate (NK ESTER A-TMM3 manufactured by Shin-Nakamura Chemical Co., Ltd., triacrylate 57%), tetraacrylate of an ethylene oxide (EO) adduct of pentaerythritol (KAYARAD RP-1040 manufactured by Nippon Kayaku Co., Ltd.), and ARONIX TO-2349 (manufactured by Toagosei Co., Ltd.).

Regarding the photopolymerizable compound used for the water-based resin composition, among these, from the viewpoint of improving reticulation of the laminated material of the invention, a water-soluble polymerizable compound represented by the following structural formula 1, a pentaerythritol tetraacrylate mixture (NK ESTER A-TMMT manufactured by Shin-Nakamura Chemical Co., Ltd.), a mixture of pentaerythritol tetraacrylate and triacrylate (NK ESTER A-TMM3LM-N manufactured by Shin-Nakamura Chemical Co., Ltd., triacrylate 37%), and a mixture of pentaerythritol tetraacrylate and triacrylate (NK ESTER A-TMM-3L manufactured by Shin-Nakamura Chemical Co., Ltd., triacrylate 55%) can be preferably used.

Structural Formula 1

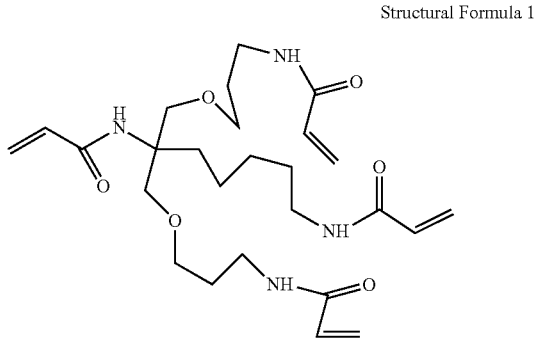

Regarding the other photopolymerizable compound used for the water-based resin composition, a photopolymerizable compound having solubility even in a mixed solvent of a lower alcohol having 1 to 3 carbon atoms such as methanol and water is preferred in a case in which an alcohol dispersion liquid of the metal oxide particles that will be described below is used in combination in the water-based resin composition. As a polymerizable compound having solubility in water or a mixed solvent of a lower alcohol having 1 to 3 carbon atoms and water, a monomer having a hydroxyl group, or a monomer having ethylene oxide or polypropylene oxide, and a phosphoric acid group in the molecule can be used. Regarding the polymerizable compound having solubility even in a mixed solvent of a lower alcohol having 1 to 3 carbon atoms and water, KAYARAD RP-1040 (manufactured by Nippon Kayaku Co., Ltd.), ARONIX TO-2349 (manufactured by Toagosei Co., Ltd.), polymerizable monomer A-9300 (manufactured by Shin-Nakamura Chemical Co., Ltd.), A-GLY-20E (manufactured by Shin-Nakamura Chemical Co., Ltd.), and the like are preferred. When it is said that a polymerizable compound has solubility even in a mixed solvent of a lower alcohol having 1 to 3 carbon atoms and water, it is implied that the polymerizable compound dissolves in an amount of 0.1% by mass or more in the mixed solvent of the alcohol and water.

Furthermore, the content of the polymerizable compound is preferably 0% to 20% by mass, more preferably 0% to 10% by mass, and even more preferably 0% to 5% by mass, with respect to the total mass of the solid content of the resin composition.

—Photopolymerization Initiator—

Regarding the photopolymerization initiator that is used for the water-based resin composition and has solubility in water or a mixed solvent of a lower alcohol having 1 to 3 carbon atoms and water, IRGACURE 2959 or an initiator of the following structural formula 2 can be used.

Furthermore, the content of the polymerization initiator is preferably 0% to 5% by mass, more preferably 0% to 1% by mass, and even more preferably 0% to 0.5% by mass, with respect to the total mass of the solid content of the resin composition.

Structural Formula 2

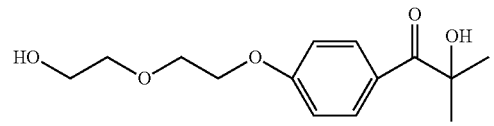

—Metal Oxide Particles—

The water-based resin composition used for forming the second transparent resin layer may or may not include particles (preferably, metal oxide particles) for the purpose of regulating the refractive index or light transmitting properties. However, it is preferable that the water-based resin composition includes metal oxide particles, from the viewpoint of controlling the refractive index of the second transparent resin layer in the range described above. The water-based resin composition used for forming the second transparent resin layer may include metal oxide particles at an arbitrary proportion depending on the type of the polymer or polymerizable compound used; however, in the water-based resin composition used for forming the second transparent resin layer, the metal oxide particles are included preferably at a proportion of 40% to 95% by mass, and more preferably at a proportion of 55% to 95% by mass, with respect to the solid content of the water-based resin composition used for forming the second transparent resin layer. It is particularly preferable from the viewpoint of ameliorating cracking of the laminated material of the invention that the metal oxide particles are included at a proportion of 62% to 90% by mass, it is more particularly preferable from the viewpoint of further ameliorating cracking of the laminated material of the invention and improving the adhesiveness to substrate of the transparent laminate of the invention that the metal oxide particles are included at a proportion of 62% to 75% by mass, and it is even more particularly preferable that the metal oxide particles are included at a proportion of 62% to 70% by mass.

—Metal Oxidation Inhibitor—

It is preferable that the water-based resin composition used for forming the second transparent resin layer includes a metal oxidation inhibitor. If the second transparent resin layer contains a metal oxidation inhibitor, when the second transparent resin layer is laminated on a base material (a substrate, a transparent electrode, a metal wiring portion, or the like), the metal wiring portion that is brought into direct contact with the second transparent resin layer can be surface-treated. It is believed that protection of the metal wiring portion by the surface treatment will be effective even after the second transparent resin layer (and the first transparent resin layer) is removed.

It is preferable that the metal oxidation inhibitor used for the invention is a compound having an aromatic ring containing a nitrogen atom in the molecule.

Furthermore, in regard to the metal oxidation inhibitor used for the invention, it is preferable that the aromatic ring containing a nitrogen atom is at least one ring selected from the group consisting of an imidazole ring, a triazole ring, a tetrazole ring, a thiadiazole ring, and fused rings of those rings with other aromatic rings, and it is more preferable that the aromatic ring containing a nitrogen atom is an imidazole ring, or a fused ring of an imidazole ring and another aromatic ring.

The other aromatic ring may be a homocyclic ring or a heterocyclic ring; however, the other aromatic ring is preferably a homocyclic ring, more preferably a benzene ring or a naphthalene ring, and even more preferably a benzene ring.

Preferred examples of the metal oxidation inhibitor include imidazole, benzimidazole, tetrazole, mercaptothiadiazole, and benzotriazole, and more preferred examples thereof include imidazole, benzimidazole, and benzotriazole.

Furthermore, the content of the metal oxidation inhibitor is preferably 0.1% to 20% by mass, more preferably 0.5% to 10% by mass, and even more preferably 1% to 5% by mass, with respect to the total mass of the second transparent resin layer.

<Volatilization of Ammonia>

Furthermore, it is preferable that the method for producing a laminated material of the invention includes a step of producing an acid group by volatilizing ammonia from the ammonium salt of a monomer having an acid group or the ammonium salt of a resin having an acid group. It is preferable that the step of producing an acid group by volatilizing ammonia from the ammonium salt of a monomer having an acid group or the ammonium salt of a resin having an acid group is a step of heating the water-based resin composition that has been applied.

Preferred ranges for the detailed conditions of the step of heating the water-based resin composition that has been applied will be described below.

The heating and drying method can be carried out by a method of passing the system through the inside of a furnace equipped with a heating apparatus, or by air blowing. The conditions for heating and drying may be appropriately set depending on the organic solvent used or the like, and a method of heating to a temperature of 40° C. to 150° C. may be employed. Among these conditions, it is particularly preferable to heat the system to a temperature of 50° to 120° C., and it is more preferable to heat the system to a temperature of 60° C. to 100° C. Regarding the composition obtainable after heating and drying, the moisture content is adjusted to preferably 5% by mass or less, more preferably 3% by mass or less, and even more preferably 1% by mass or less.

<Other Steps>

Before the first transparent resin layer is formed on the base material, a step of forming a thermoplastic resin layer may be further included.

After the step of forming the thermoplastic resin layer, a step of forming an intermediate layer between the thermoplastic resin layer and the first transparent resin layer may also be included. Specifically, in a case in which a photosensitive material having an intermediate layer is formed, the photosensitive material having an intermediate layer can be suitably produced by applying a solution obtained by dissolving a thermoplastic organic polymer together with additives (coating liquid for a thermoplastic resin layer) on a base material and drying the solution to provide a thermoplastic resin layer; subsequently applying a liquid preparation produced by adding a resin and additives to a solvent that does not dissolve the thermoplastic resin layer (coating liquid for an intermediate layer) on this thermoplastic resin layer and drying the liquid preparation to laminate an intermediate layer thereon; and further applying a coating liquid for a photosensitive resin layer produced using a solvent that does not dissolve the intermediate layer on this intermediate layer and drying the coating liquid to laminate a photosensitive resin layer thereon.

Regarding other method for producing a transparent resin layer, the method for producing a photosensitive transfer material described in paragraphs 0094 to 0098 of JP2006-259138A can be employed.

[Laminated Material]

The laminated material of the invention has a base material, a first transparent resin layer, and a second transparent resin layer disposed adjacently to the first transparent resin layer, in this order, the first transparent resin layer is formed by applying an organic solvent-based resin composition on the base material, and the second transparent resin layer is formed by applying a water-based resin composition containing an ammonium salt of a monomer having an acid group or an ammonium salt of a resin having an acid group, on the first transparent resin layer.

It is preferable that the laminated material of the invention is a transfer material, and it is more preferable that the laminated material is a transfer film.

When the difference between the refractive indices of the transparent electrode pattern (preferably ITO) and the second transparent resin layer, and the difference between the refractive indices of the second transparent resin layer and the first transparent resin layer are made smaller, light reflection is reduced, and the transparent electrode pattern becomes invisible. Thus, visibility of the transparent electrode pattern can be ameliorated. Furthermore, even if the second transparent resin layer is laminated without curing the first transparent resin layer after the first transparent resin layer is laminated, layer demarcation is achieved at a satisfactory level, and visibility of the transparent electrode pattern can be ameliorated by the mechanism described above. Also, after the refractive index-adjusting layers (that is, first and second transparent resin layers) are transferred from the laminated materials onto the transparent electrode pattern, the refractive index-adjusting layers can be developed into a desired pattern by photolithography. If the layer demarcation of the first and second transparent resin layers is poor, the effect of adjusting the refractive index by the mechanism described above is likely to become insufficient, and amelioration of the visibility of the transparent electrode pattern is likely to become insufficient.

In the following description, a preferred embodiment of the laminated material of the invention will be explained.

It is preferable that the laminated material of the invention is a material for a transparent insulating layer or a transparent protective layer of a capacitance-type input device. More particularly, the laminated material of the invention can be preferably used as a transfer material intended for forming a laminated pattern of refractive index-adjusting layers and an overcoat layer (transparent protective layer) on a transparent electrode pattern by a photolithographic method.

<First Transparent Resin Layer and Second Transparent Resin Layer>

The first transparent resin layer and the second transparent resin layer may be thermally curable, may be photocurable, or may be thermally curable and photocurable. Above all, it is preferable that the first transparent resin layer and the second transparent resin layer are at least thermally curable, from the viewpoint that when the transparent resin layers are thermally cured after transfer, reliability can be imparted to the films. It is more preferable that the transparent resin layers are thermally curable and photocurable, from the viewpoint that when the transparent resin layers are photocured after transfer, it is easy to form films, and when the transparent resin layers are thermally cured after film forming, reliability can be imparted to the films.

For the convenience of explanation in the present specification, in a case in which after the first transparent resin layer and the second transparent resin layer of the laminated material of the invention are transferred onto the transparent electrode pattern and photocured, these layers have lost photocurability, then these layers will be consistently referred to as the first transparent resin layer and the second transparent resin layer, respectively, irrespective of whether these layers have heat-curability. Furthermore, there are occasions in which after these layers are photocured, heat-curing is performed. In that case as well, these layers will be consistently referred to as the first transparent resin layer and the second transparent resin layer, respectively, irrespective of whether these layers have curability. Similarly, in a case in which after the first transparent resin layer and the second transparent resin layer of the laminated material of the invention are transferred onto a transparent electrode pattern and thermally cured, these layers have lost heat-curability, these layers will be consistently referred to as the first transparent resin layer and the second transparent resin layer, respectively, irrespective of whether these layers have photocurability.

The laminated material of the invention may be a negative type material or may be a positive type material.

In a case in which the laminated material of the invention is a negative type material, it is preferable that the first transparent resin layer and the second transparent resin layer contain metal oxide particles, a binder resin (preferably, an alkali-soluble resin), a photopolymerizable compound, and a polymerization initiator. Furthermore, additives and the like are used; however, the component materials are not limited to these.

In regard to the laminated material of the invention, it is preferable that the first transparent resin layer and the second transparent resin layer each independently include a binder, a polymerizable compound, and a photopolymerization initiator.

In the laminated material of the invention, the first transparent resin layer and the second transparent resin layer are transparent resin layers.

The method for controlling the refractive indices of the first transparent resin layer and the second transparent resin layer is not particularly limited; however, a transparent resin layer having a desired refractive index may be used alone, a transparent resin layer having particles such as metal particles or metal oxide particles incorporated therein may be used, or a composite of a metal salt and a polymer may also be used.

Furthermore, additives may also be used in the first transparent resin layer and the second transparent resin layer. Examples of the additives include the surfactants described in paragraph 0017 of JP4502784B and paragraphs 0060 to 0071 of JP2009-237362A; the thermal polymerization inhibitors described in paragraph 0018 of JP4502784B; and other additives described in paragraphs 0058 to 0071 of JP2000-310706A.

Thus, the case in which the laminated material of the invention is a negative type material has been primarily described; however, the laminated material of the invention may also be a positive type material. In a case in which the laminated material of the invention is a positive type material, the materials described in, for example, JP2005-221726A and the like are used for the first transparent resin layer and the second transparent resin layer; however, the materials are not limited to these.

<Configuration of First Transparent Resin Layer>

In regard to the laminated material of the invention, it is preferable that the double bond consumption rate of the first transparent resin layer is 10% or less, from the viewpoint that photolithography suitability can be imparted to the first transparent resin layer after transfer. By applying an organic solvent-based resin composition used for the first transparent resin layer, drying the resin composition, and subsequently applying a water-based resin composition used for the second transparent resin layer without exposing the organic solvent-based resin composition, the double bond consumption rate of the first transparent resin layer can be controlled to this range. In the transfer material of JP2014-108541A, the double bond consumption rate of the first transparent resin layer is more than 10%.

In regard to the laminated material of the invention, the refractive index of the first transparent resin layer is preferably 1.5 to 1.53, more preferably 1.5 to 1.52, and particularly preferably 1.51 to 1.52.

In regard to the laminated material of the invention, the layer thickness of the first transparent resin layer is preferably 1 μm or more, more preferably 1 to 15 μm, particularly preferably 2 to 12 μm, and more particularly preferably 3 to 10 μm, from the viewpoint of exhibiting a sufficient surface protection ability in a case in which a transparent protective layer of the capacitance-type input device is formed using the first transparent resin layer.

<Configuration of Second Transparent Resin Layer>

The laminated material of the invention has a second transparent resin layer that is disposed adjacently to the first transparent resin layer.

In regard to the laminated material of the invention, it is more preferable that the refractive index of the second transparent resin layer is greater than the refractive index of the first transparent resin layer. It is preferable that the refractive index of the second transparent resin layer is 1.60 or higher.

On the other hand, the refractive index of the second transparent resin layer needs to be adjusted by the refractive index of the transparent electrode. The upper limit of the value is not particularly limited; however, the refractive index of the second transparent resin layer is preferably 2.1 or less, and more preferably 1.78 or less, and may be 1.74 or less.

Particularly, in a case in which the refractive index of the transparent electrode is higher than 2.0 as in the case of oxide of In and Zn (IZO), the refractive index of the second transparent resin layer is preferably from 1.7 to 1.85.

In regard to the laminated material of the invention, the film thickness of the second transparent resin layer is preferably 500 nm or less, and more preferably 110 nm or less. It is preferable that the film thickness of the second transparent resin layer is 20 nm or more. The film thickness of the second transparent resin layer is particularly preferably 55 to 100 nm, more particularly preferably 60 to 100 nm, and even more particularly preferably 70 to 100 nm.

[Thermoplastic Resin Layer]

In regard to the laminated material of the invention, a thermoplastic resin layer can be provided between the base material and the first transparent resin layer. When a transparent laminate is formed by using a transfer material having the thermoplastic resin layer, and transferring the first transparent resin layer and the second transparent resin layer, air bubbles are not easily formed in the various elements formed by transferring, image unevenness does not easily occur in the image display device, and excellent display characteristics can be obtained.

It is preferable that the thermoplastic resin layer is alkali-soluble. The thermoplastic resin layer plays the role as a cushion material that can absorb the surface unevenness of the undercoat surface (also including the surface unevenness caused by the image that has been already formed or the like), and it is preferable that the thermoplastic resin layer has a property of being capable of changing shape in conformity with the surface unevenness of the object surface.

In regard to the thermoplastic resin layer, an embodiment including the organic polymer materials described in JP1993-72724A (JP-H05-72724A) as components is preferred, and an embodiment including at least one selected from organic polymer materials having a softening point of about 80° C. or lower as measured by the Vicat method [specifically, the polymer softening point measuring method according to ASTM D1235 of the American Materials Testing Methods] is particularly preferred.

Specific examples thereof include organic polymers, such as polyolefins such as polyethylene and polypropylene; an ethylene copolymer of ethylene and vinyl acetate or a saponification product thereof, a copolymer of ethylene and an acrylic acid ester or a saponification product thereof, polyvinyl chloride or a vinyl chloride copolymer of vinyl chloride and vinyl acetate or a saponification product thereof; polyvinylidene chloride, a vinylidene chloride copolymer, polystyrene, a styrene copolymer of styrene and a (meth)acrylic acid ester or a saponification product thereof; polyvinyltoluene, a vinyltoluene copolymer of vinyltoluene and a (meth)acrylic acid ester or a saponification product thereof; poly(meth)acrylic acid ester, a (meth)acrylic acid ester copolymer of butyl (meth)acrylate and vinyl acetate or the like; a vinyl acetate copolymer; and polyamide resins such as nylon, copolymerized nylon, N-alkoxymethylated nylon, and N-dimethylaminated nylon.

The layer thickness of the thermoplastic resin layer is preferably 3 to 30 μm. In a case in which the layer thickness of the thermoplastic resin layer is less than 3 μm, the shape conformity at the time of laminating is insufficient, and the thermoplastic resin layer may not perfectly absorb the surface unevenness of the undercoat surface. Furthermore, in a case in which the layer thickness is more than 30 μm, drying (solvent removal) may be performed under load at the time of forming the thermoplastic resin layer on the base material, or time may be required for developing of the thermoplastic resin layer, which deteriorates the process suitability. The layer thickness of the thermoplastic resin layer is more preferably 4 to 25 μm, and particularly preferably 5 to 20 μm.

The thermoplastic resin layer can be formed by applying a liquid preparation containing a thermoplastic organic polymer or the like, and the liquid preparation used at the time of application or the like can be produced using a solvent. The solvent is not particularly limited as long as the solvent can dissolve the polymer component that constitutes the thermoplastic resin layer, and examples thereof include methyl ethyl ketone, cyclohexanone, propylene glycol monomethyl ether acetate (MMPGAc), n-propanol, and 2-propanol.

(Viscosity of Thermoplastic Resin Layer and Photocurable Resin Layer)

It is preferable that the viscosity of the thermoplastic resin layer measured at 100° C. is in the range of 1,000 to 10,000 Pa·sec, the viscosity of the photocurable resin layer measured at 100° C. is in the range of 2,000 to 50,000 Pa·sec, and the following expression (A) is satisfied.

[Intermediate Layer]

In regard to the laminated material of the invention, an intermediate layer may be provided between the thermoplastic resin layer and the first transparent resin layer. The intermediate layer is described as a "separating layer" in JP993-72724A (JP-H05-72724A).

[Protective Film]

It is preferable that the laminated material of the invention is further provided with a protective film (hereinafter, also referred to as "protective release layer") on the surface of the second transparent resin layer.

Regarding the protective film, the protective films described in paragraphs 0083 to 0087 and 0093 of JP2006-259138A can be used as appropriate.

Figure 12:
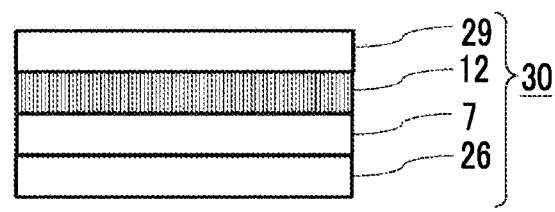
FIG. 12 is a schematic cross-sectional view illustrating an example of the configuration of the laminated material of the invention.

FIG. 12 illustrates an example of a preferred configuration of the laminated material of the invention. FIG. 12 is a schematic view of a laminated material 30 of the invention in which a base material 26, a first transparent resin layer 7, a second transparent resin layer 12, and a protective release layer (protective film) 29 are laminated in this order adjacently to one another.

[Transparent Laminate]

The transparent laminate of the invention is a transparent laminate produced by the method for producing a transparent laminate of the invention. The laminate of the invention has a transparent electrode pattern, a second transparent resin layer disposed adjacently to this transparent electrode pattern, and a first transparent resin layer disposed adjacently to this second transparent resin layer, and it is preferable that the refractive index of the second transparent resin layer is higher than the refractive index of the first transparent resin layer, while the refractive index of the second transparent resin layer is 1.6 or higher.

When such a configuration is adopted, the problem that the transparent electrode pattern becomes visible can be solved, and satisfactory patterning properties are obtained.

Furthermore, it is preferable that the transparent laminate of the invention has satisfactory adhesiveness to substrate.

<Configuration of Transparent Laminate>

It is preferable that the transparent laminate of the invention further has a transparent film having a refractive index of 1.6 to 1.78 and a film thickness of 55 to 110 nm, on the transparent electrode pattern on the side opposite to the side where the second transparent resin layer is formed, from the viewpoint of further ameliorating the visibility of the transparent electrode pattern. In the present specification, unless particularly stated otherwise, in a case in which the term "transparent film" is described, this refers to the "transparent film having a refractive index of 1.6 to 1.78 and a film thickness of 55 to 110 nm".

It is preferable that the transparent laminate of the invention further has a transparent substrate on the transparent film having a refractive index of 1.6 to 1.78 and a film thickness of 55 to 110 nm, on the side opposite to the side where the transparent electrode pattern is formed.

Figure 11:
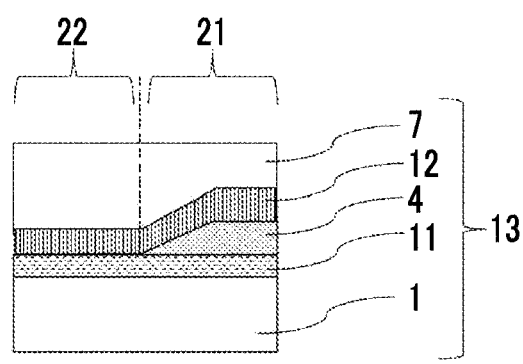
FIG. 11 is a schematic cross-sectional view illustrating an example of the configuration of the transparent laminate of the invention.

FIG. 11 illustrates an example of the configuration of the transparent laminate of the invention.

In FIG. 11, the transparent laminate has a transparent substrate 1 and a transparent film 11 having a refractive index of 1.6 to 1.78 and a film thickness of 55 to 110 nm, and further has a region 21 in plane, in which a transparent electrode pattern 4, a second transparent resin layer 12 and a first transparent resin layer 7 are laminated in this order. Furthermore, it is illustrated in FIG. 11 that the transparent laminate includes, in addition to the region, a region in which the transparent substrate 1 and a multilayer film 11 including at least two kinds of transparent thin films having mutually different refractive indices are laminated in this order (in the configuration of FIG. 11, a region 22 in which the second transparent resin layer 12 and the first transparent resin layer 7 are laminated in this order (that is, a non-patterned region 22 in which the transparent electrode pattern is not formed)).

In other words, the transparent electrode pattern-attached substrate includes, in an in-plane direction, a region 21 in which a transparent substrate 1, a multilayer film 11 including at least two kinds of transparent thin films having mutually different refractive indices, a transparent electrode pattern 4, a second transparent resin layer 12, and a first transparent resin layer 7 are laminated in this order.

The in-plane direction means a direction that is approximately parallel to the plane that is parallel to the transparent substrate of the transparent laminate. Therefore, when it is said that a region in which the transparent electrode pattern 4, the second transparent resin layer 12, and the first transparent resin layer 7 are laminated in this order is included in plane, it is implied that orthographic projection for a region in which the transparent electrode pattern 4, the second transparent resin layer 12, and the first transparent resin layer 7 are laminated in this order, onto a plane that is parallel to the transparent substrate of the transparent laminate, exists in the plane that is parallel to the transparent substrate of the transparent laminate.

Figure 3:
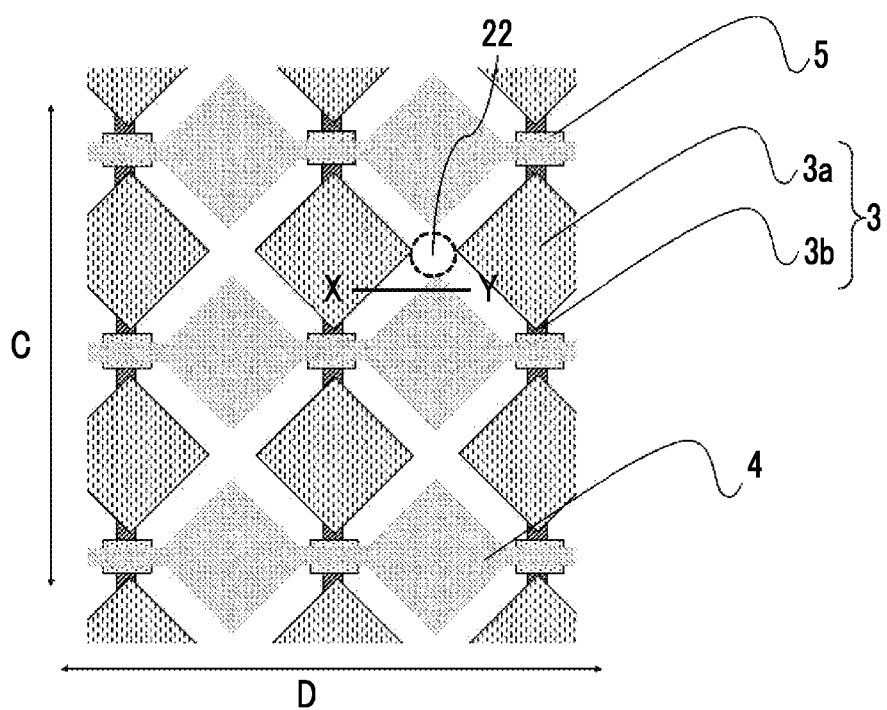
FIG. 3 is an explanatory diagram illustrating an example of the relationship between a transparent electrode pattern and a non-patterned region according to the invention.

Here, in a case in which the transparent laminate of the invention is used in a capacitance-type input device that will be described below, the transparent electrode pattern may be provided as a first transparent electrode pattern and a second transparent electrode pattern respectively in two directions that are approximately perpendicular to each other, namely, a transverse direction and a longitudinal direction (see, for example, FIG. 3). For example, in the configuration of FIG. 3, the transparent electrode pattern in the transparent laminate of the invention may be a second transparent electrode pattern 4, or may be a pad portion 3a of the first transparent electrode pattern 3. In other words, in the following explanation for the transparent laminate of the invention, the reference numeral for the transparent electrode pattern may be representatively indicated by "4"; however, the transparent electrode pattern in the transparent laminate of the invention is not intended to be limited to the use in the second transparent electrode pattern 4 in the capacitance-type input device of the invention, and may also be used as, for example, a pad portion 3a of the first transparent electrode pattern 3.

It is preferable that the transparent laminate of the invention includes a non-patterned region in which the aforementioned transparent electrode pattern is not formed. In the present specification, a non-patterned region means a region in which the transparent electrode pattern 4 is not formed.

FIG. 11 illustrates an embodiment in which the transparent laminate of the invention includes the non-patterned region 22.

In regard to the transparent laminate of the invention, it is preferable that a region in which the transparent substrate, the transparent film, and the second transparent resin layer are laminated in this order, is included in plane in at least a portion of the non-patterned region 22 in which the transparent electrode pattern is not formed.

In regard to the transparent laminate of the invention, it is preferable that in the region in which the transparent substrate, the transparent film, and the second transparent resin layer are laminated in this order, the transparent film and the second transparent resin layer are adjacent to each other.

However, in regions other than the non-patterned region 22, as long as there is no effect that is contradictory to the purport of the invention, other members may be disposed at arbitrary positions, and for example, in a case in which the transparent laminate of the invention is used in the capacitance-type input device that will be described below, a mask layer 2, an insulating layer 5, a conductive element 6, and the like as shown in FIG. 1A can be laminated thereon.

In regard to the transparent laminate of the invention, it is preferable that the transparent substrate and the transparent film are adjacent to each other.

FIG. 11 illustrates an embodiment in which the transparent film 11 is laminated on the transparent substrate 1 adjacently thereto.

However, as long as there is no effect that is contradictory to the purport of the invention, a third transparent film may be laminated between the transparent substrate and the transparent film. For example, it is preferable that a third transparent film having a refractive index of 1.5 to 1.52 (not shown in FIG. 11) is included between the transparent substrate and the transparent film.

In regard to the transparent laminate of the invention, the thickness of the transparent film is preferably 55 to 110 nm, more preferably 60 to 110 nm, and particularly preferably 70 to 90 nm.

Here, the transparent film may have a single-layer structure, or may have a laminated structure of two or more layers. In a case in which the transparent film has a laminated structure of two or more layers, the film thickness of the transparent film means the total film thickness of all the layers.

In regard to the transparent laminate of the invention, it is preferable that the transparent film and the transparent electrode pattern are adjacent to each other.

FIG. 11 illustrates an embodiment in which the transparent electrode pattern 4 is laminated on a partial region of the transparent film 11 adjacently thereto.

As illustrated in FIG. 11, the shape of the edge of the transparent electrode pattern 4 is not particularly limited; however, the edge may have a tapered shape, and for example, the edge may have a tapered shape in which the plane on the transparent substrate side is larger than the plane on the side opposite to the transparent substrate.

Here, when the edge of the transparent electrode pattern has a tapered shape, the angle of the edge of the transparent electrode pattern (hereinafter, also referred to as taper angle) is preferably 30° or less, more preferably 0.1° to 15°, and particularly preferably 0.5° to 5°.

In regard to the method for measuring the taper angle according to the present specification, the taper angle can be determined by taking a microscopic photograph of an edge of the transparent electrode pattern, approximating the taper part in the microscopic photograph to a triangle, and directly measuring the taper angle.

Figure 10:
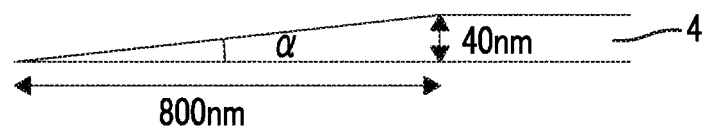
FIG. 10 is an explanatory diagram illustrating an example of a tapered shape of an edge of a transparent electrode pattern.

FIG. 10 illustrates an example of the case in which an edge of the transparent electrode pattern has a tapered shape. The triangle approximating the taper part in FIG. 10 has an underside of 800 nm and a height (film thickness at the upper base part that is approximately parallel to the underside) of 40 nm, and the taper angle α at this time is about 3°. The underside of the triangle approximating the taper part is preferably 10 to 3,000 nm, more preferably 100 to 1,500 nm, and particularly preferably 300 to 1,000 nm.

A preferred range of the height of the triangle approximating the taper part is similar to the preferred range of the film thickness of the transparent electrode pattern.

It is preferable that the transparent laminate of the invention includes a region in which the transparent electrode pattern and the second transparent resin layer are adjacent to each other.

FIG. 11 illustrates an embodiment in which in the region 21 in which the transparent electrode pattern, the second transparent resin layer, and the first transparent resin layer are laminated in this order, the transparent electrode pattern, the second transparent resin layer, and the first transparent resin layer are adjacent to each other.

Furthermore, in regard to the transparent laminate of the invention, it is preferable that both the transparent electrode pattern and the non-patterned region 22 in which the transparent electrode pattern is not formed are continuously covered, directly or with another layer interposed therebetween, by the transparent film and the second transparent resin layer.

Here, the term "continuously" means that the transparent film and the second transparent resin layer are not patterned films but are continuous films. That is, it is preferable that the transparent film and the second transparent resin layer do not have openings, from the viewpoint of making the transparent electrode pattern not easily visually recognized.

Furthermore, it is preferable that the transparent electrode pattern and the non-patterned region 22 are directly covered by the transparent film and the second transparent resin layer, rather than being covered with another layer interposed therebetween. The "other layer" in the case in which the transparent electrode pattern and the non-patterned region are covered with another layer interposed therebetween, may be an insulating layer 5 that is included in the capacitance-type input device of the invention that will be described below, and in a case in which two or more layers of transparent electrode patterns are included as in the case of the capacitance-type input device of the invention that will be described below, the "other layer" may be the transparent electrode pattern of the second layer.

FIG. 11 illustrates an embodiment in which the second transparent resin layer 12 is laminated. The second transparent resin layer 12 is laminated over the region in which the transparent electrode pattern 4 is not laminated on the transparent film 11, and the region in which the transparent electrode pattern 4 is laminated on the transparent film 11. That is, the second transparent resin layer 12 is adjacent to the transparent film 11, and the second transparent resin layer 12 is adjacent to the transparent electrode pattern 4.

Furthermore, in a case in which the edge of the transparent electrode pattern 4 has a tapered shape, it is preferable that the second transparent resin layer 12 is laminated along the tapered shape (at the same gradient as the taper angle).

FIG. 11 illustrates an embodiment in which the first transparent resin layer 7 is laminated on the surface on the side opposite to the surface on which the transparent electrode pattern of the second transparent resin layer 12 is formed.

<Material for Transparent Laminate>
(Transparent Substrate)

In regard to the transparent laminate of the invention, the transparent substrate is preferably a glass substrate having a refractive index of 1.5 to 1.55. The refractive index of the transparent substrate is particularly preferably 1.5 to 1.52.

The transparent substrate described above is constructed from a light-transmitting substrate such as a glass substrate, and reinforced glass, which is represented by GORILLA GLASS of Corning, Inc., or the like can be used. Also, regarding the transparent substrate, the materials used in JP2010-86684A, JP2010-152809A, and JP2010-257492A can be preferably used.

(Transparent Electrode Pattern)

The refractive index of the transparent electrode pattern is preferably 1.75 to 2.1.

The material for the transparent electrode pattern is not particularly limited, and any known material can be used. For example, the transparent electrode pattern can be produced from a light-transmitting conductive metal oxide film such as indium tin oxide (ITO) or indium zinc oxide (IZO). Examples of such a metal film include an ITO film; metal films of Al, Zn, Cu, Fe, Ni, Cr, and Mo; and metal oxide films of $SiO_2$. At this time, the film thicknesses of the various elements can be adjusted to 10 to 200 nm. Furthermore, in order to convert an amorphous ITO film into a polycrystalline ITO film through calcination, the electrical resistance can be reduced. Furthermore, the first transparent electrode pattern 3, the second transparent electrode pattern 4, and the conductive element 6 that will be described below can also be produced using the photosensitive film having a photocurable resin layer and using conductive fibers. In addition to that, in a case in which a first conductive pattern or the like is formed using ITO or the like, paragraphs 0014 to 0016 of JP4506785B and the like can be referred to. Above all, the transparent electrode pattern is preferably an ITO film.

In regard to the transparent laminate of the invention, the transparent electrode pattern is preferably an ITO film having a refractive index of 1.75 to 2.1.

(First Transparent Resin Layer and Second Transparent Resin Layer)

Preferred ranges for the first transparent resin layer and the second transparent resin layer included in the transparent laminate of the invention are similar to the preferred ranges for the first transparent resin layer and the second transparent resin layer in the laminated material of the invention.

(Transparent Film)

In regard to the transparent laminate of the invention, the refractive index of the transparent film is 1.6 to 1.78, and preferably 1.65 to 1.74. Here, the transparent film may have a single-layer structure, or may have a laminated structure of two or more layers. In a case in which the transparent film has a laminated structure of two or more layers, the refractive index of the transparent film means the refractive index of the layers as a whole.

As long as the refractive index satisfies such a range, the material for the transparent film is not particularly limited.

A preferred range of the material for the transparent film and preferred ranges of the physical properties such as the refractive index are similar to the preferred ranges of the material and the properties of the second transparent resin layer.

In regard to the transparent laminate of the invention, it is preferable that the transparent film and the second transparent resin layer are constructed from the same material, from the viewpoint of optical homogeneity.

In regard to the transparent laminate of the invention, it is preferable that the transparent film is a transparent resin film.

The metal oxide particles, resin (binder), and other additives that are used for the transparent resin film are not particularly limited as long as they do not have any effects that are contradictory to the purport of the invention, and the resins and other additives that are used for the second transparent resin layer in the laminated material of the invention can be preferably used.

In regard to the transparent laminate of the invention, the transparent film may be an inorganic film. Regarding the material used for the inorganic film, the materials used for the second transparent resin layer in the laminated material of the invention can be preferably used.

(Third Transparent Film)

It is preferable that the refractive index of the third transparent film is 1.5 to 1.55 from the viewpoint of adjusting the refractive index to be closer to the refractive index of the transparent substrate and ameliorating the visibility of the transparent electrode pattern, and it is more preferable that the refractive index is 1.5 to 1.52.

[Method for Producing Transparent Laminate]

The method for producing the transparent laminate of the invention includes a step of laminating, on the transparent electrode pattern, the second transparent resin layer and the first transparent resin layer of the laminated material of the invention in this order.

Based on such a configuration, the second transparent resin layer and the first transparent resin layer of the transparent laminate can be transferred all at once, and a transparent laminate free of the problem that the transparent electrode pattern is visually recognized can be produced easily with satisfactory productivity.

Meanwhile, in the method for producing a transparent laminate of the invention, the second transparent resin layer is produced on the transparent electrode pattern, and on the transparent film in the non-patterned region, directly or with another layer interposed therebetween.

(Surface Treatment of Transparent Substrate)

Furthermore, in order to increase the adhesiveness of the various layers by lamination in the subsequent transfer step, a surface treatment can be applied in advance to the non-contact surface of the transparent substrate (front face plate). Regarding the surface treatment, it is preferable to perform a surface treatment using a silane compound (silane coupling treatment). Regarding the silane coupling agent, it is preferable for the silane coupling agent to have a functional group that interacts with a photosensitive resin. For example, a silane coupling liquid (0.3 mass % aqueous solution of N-β-(aminoethyl)-γ-aminopropyltrimethoxysilane, trade name: KBM603, manufactured by Shin-Etsu Chemical Co., Ltd.) is sprayed for 20 seconds by showering, and the surface is washed by showering with pure water. Subsequently, the surface is caused to react by heating. A heating chamber may be used, or the reaction can be accelerated by preliminary heating of a substrate of a laminator.

(Film Formation of Transparent Electrode Pattern)

The transparent electrode pattern can be formed on a transparent substrate or a transparent film having a refractive index of 1.6 to 1.78 and a film thickness of 55 to 110 nm, using the method for forming the first transparent electrode pattern 3, the second transparent electrode pattern 4, and another conductive element 6 described in connection with the capacitance-type input device of the invention that will be described below. A method of using a photosensitive film is preferred.

(Film Formation of First Transparent Resin Layer and Second Transparent Resin Layer)

The method for forming the first transparent resin layer and the second transparent resin layer may be a method including a protective film removal step of removing the protective film from the laminated material of the invention; a transfer step of transferring the first transparent resin layer and the second transparent resin layer of the laminated material of the invention, from which the protective film has been removed, onto a transparent electrode pattern; an exposure step of exposing the first transparent resin layer and the second transparent resin layer that have been transferred onto the transparent electrode pattern; and a developing step of developing the first transparent resin layer and the second transparent resin layer, both of which have been exposed to light.

—Transfer Step—

The transfer step is a step of transferring the first transparent resin layer and the second transparent resin layer of the laminated material of the invention, from which the protective film has been removed, onto a transparent electrode pattern.

At this time, a method including a step of laminating the first transparent resin layer and the second transparent resin layer of the laminated material of the invention onto the transparent electrode pattern and then removing the base material (temporary support), is preferable.

The transfer (bonding) of the first transparent resin layer and the second transparent resin layer onto the base material surface is carried out by superposing the first transparent resin layer and the second transparent resin layer on the transparent electrode pattern surface, and pressing and heating the assembly. For the bonding, known laminators such as a laminator, a vacuum laminator, and an autocut laminator, which can further improve productivity, can be used.

—Exposure Step, Developing Step, and Other Steps—

Regarding the examples of the exposure step, developing step, and other steps, the methods described in paragraphs 0035 to 0051 of JP2006-23696A can also be suitably used for the invention.

The exposure step is a step of exposing the first transparent resin layer and the second transparent resin layer that have been transferred onto the transparent electrode pattern.

Specifically, a method of disposing a predetermined mask above the first transparent resin layer and the second transparent resin layer formed on the transparent electrode pattern, and then exposing, through this mask and the base material, the first transparent resin layer and the second transparent resin layer from above the mask, may be employed.

Here, regarding the light source for the exposure, any light source that can emit light having a wavelength in the range capable of curing the first transparent resin layer and the second transparent resin layer (for example, 365 nm or 405 nm), can be appropriately selected and used. Specific examples thereof include an ultrahigh pressure mercury lamp, a high pressure mercury lamp, and a metal halide lamp. The amount of exposure is usually about 5 to 200 mJ/cm$^2$, and preferably about 10 to 100 mJ/cm$^2$.

The developing step is a step of developing the exposed photocurable resin layers.

According to the invention, the developing step is a developing step in a narrow sense, in which the first transparent resin layer and the second transparent resin layer that has been exposed patternwise are developed patternwise using a developer.

The developing can be carried out using a developer. The developer is not particularly limited, and any known developers such as the developers described in JP1993-72724A (JP-H05-72724A), can be used. Furthermore, the developer is preferably a developer with which a photocurable resin layer exhibits dissolution type developing behavior, and for example, a developer including a compound having a pKa of 7 to 13 at a concentration of 0.05 to 5 mol/L is preferred. On the other hand, the developer used in a case in which the first transparent resin layer and the second transparent resin layer themselves do not form patterns, is preferably a developer which exhibits developing behavior of the type that does not dissolve the aforementioned non-alkali developing type colored composition layer, and for example, a developer including a compound having a pKa of 7 to 13 at a concentration of 0.05 to 5 mol/L is preferred. The developer may also include a small amount of an organic solvent that is miscible with water. Examples of the organic solvent that is miscible with water include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethyl phosphoramide, ethyl lactate, methyl lactate, ε-caprolactam, and N-methylpyrrolidone. The concentration of the organic solvent is preferably 0.1% by mass to 30% by mass.

Also, known surfactants can be further added to the developer. The concentration of the surfactants is preferably 0.01% by mass to 10% by mass.

The method for developing may be any of paddle developing, shower developing, shower and spinning developing, dip developing, or the like. Here, to explain the shower developing, an uncured part can be removed by spraying a developer by showering to the first transparent resin layer and the second transparent resin layer after exposure. Furthermore, in a case in which a thermoplastic resin layer or an intermediate layer is provided, it is preferable to have the thermoplastic resin layer, the intermediate layer, or the like removed in advance by spraying an alkaline liquid having low solubility for the photocurable resin layer before developing, by showering or the like. Furthermore, it is preferable to remove, after developing, a developing residue by spraying a detergent or the like by showering and scrubbing with a brush or the like. The liquid temperature of the developer is preferably 20° C. to 40° C., and the pH of the developer is preferably 8 to 13.

The method for producing a capacitance-type input device described above may include other steps such as a post-exposure step and a post-bake step. In a case in which the first transparent resin layer and the second transparent resin layer are thermally curable, it is preferable to carry out a post-bake step.

Furthermore, patterned exposure or full-surface exposure may be carried out after peeling off the base material (temporary support), or exposure may be performed before the base material is peeled off, and then the base material may be peeled off. The exposure may be exposure through a mask, or may be digital exposure using a laser or the like.

(Film Formation of Transparent Film)

In a case in which the transparent laminate of the invention further has a transparent film having a refractive index of 1.6 to 1.78 and a film thickness of 55 to 110 nm on the transparent electrode pattern on the side opposite to the side where the second transparent resin layer has been formed, the transparent film is formed on the transparent electrode pattern, directly thereon or with another layer such as the third transparent film interposed therebetween.

The method for forming the transparent film is not particularly limited; however, it is preferable to form the transparent film by transfer or sputtering.

Above all, in regard to the transparent laminate of the invention, it is preferable that the transparent film is formed by transferring a transparent curable resin film formed on a base material onto the transparent substrate, and it is more preferable that the transparent film is formed by being cured after transfer. The method for performing transfer and curing may be a method of performing transfer, exposure, developing, and other processes similarly to the method of transferring the first transparent resin layer and the second transparent resin layer in the method for producing a transparent laminate of the invention using a photosensitive film in connection with the explanation for the capacitance-type input device of the invention that will be described below. In that case, it is preferable to adjust the refractive index of the transparent film to the range described above, by dispersing metal oxide particles in the photocurable resin layer in the photosensitive film.

On the other hand, in a case in which the transparent film is an inorganic film, it is preferable that the transparent film is formed by sputtering. That is, in regard to the transparent laminate of the invention, it is also preferable that the transparent film is formed by sputtering.

Regarding the sputtering method, the methods used in JP2010-86684A, JP2010-152809A, and JP2010-257492A can be preferably used.

(Film Formation of Third Transparent Film)

The method for forming the third transparent film is similar to the method for forming a transparent film having a refractive index of 1.6 to 1.78 and a film thickness of 55 to 110 nm, on a transparent substrate.

It is preferable that the method for producing a transparent laminate of the invention includes a step of simultaneously curing the first transparent resin layer and the second transparent resin layer, and it is more preferable that the method includes a step of simultaneously curing the transparent resin layers patternwise. In regard to the laminated material of the invention, it is preferable that after the first transparent resin layer is laminated, the second transparent resin layer is laminated without curing the first transparent resin layer. The first transparent resin layer and the second transparent resin layer transferred from the laminated material of the invention thus obtained can be simultaneously cured. As a result, the first and second transparent resin layers can be transferred from the laminated material of the invention onto the transparent electrode pattern, and then the resin layers can be developed into a desired pattern by photolithography.

It is more preferable that the method for producing a transparent laminate of the invention includes, after the step of simultaneously curing the first transparent resin layer and the second transparent resin layer, a step of developing and thereby removing uncured portions (in the case of photocuring, unexposed portions only, or exposed portions only) of the first transparent resin layer and the second transparent resin layer.

[Capacitance-Type Input Device]

The capacitance-type input device of the invention is produced using the laminated material of the invention, by laminating the second transparent resin layer and the first transparent resin layer of the laminated material on a substrate including a transparent electrode pattern, in this order, or the capacitance-type input device has the transparent laminate of the invention.

It is preferable that the capacitance-type input device of the invention is produced by transferring the second transparent resin layer and the first transparent resin layer disposed adjacently to the second transparent resin layer, from the laminated material of the invention onto the transparent electrode pattern of the capacitance-type input device.

It is preferable that the capacitance-type input device of the invention is formed by simultaneously curing the first transparent resin layer and the second transparent resin layer that have been transferred from the laminated material of the invention, and it is more preferable that the capacitance-type input device is formed by simultaneously patternwise curing the first transparent resin layer and the second transparent resin layer. When the first transparent resin layer and the second transparent resin layer that have been transferred from the laminated material of the invention are simultaneously cured, it is preferable not to peel off the protective film from the laminated material of the invention.

It is more preferable that the capacitance-type input device of the invention is formed by developing and eliminating uncured portions of the first transparent resin layer and the second transparent resin layer that are formed by being transferred from the laminated material of the invention and simultaneously patternwise cured. It is preferable that after the first transparent resin layer and the second transparent resin layer that have been transferred from the laminated material of the invention are simultaneously cured, the protective film is peeled off from the laminated material of the invention before performing developing. Since the capacitance-type input device of the invention needs to be connected to a flexible wiring formed on a polyimide film at the terminal of the lead wiring, it is preferable that the terminal is not covered by the first transparent resin layer (and the second transparent resin layer).

Figure 13:
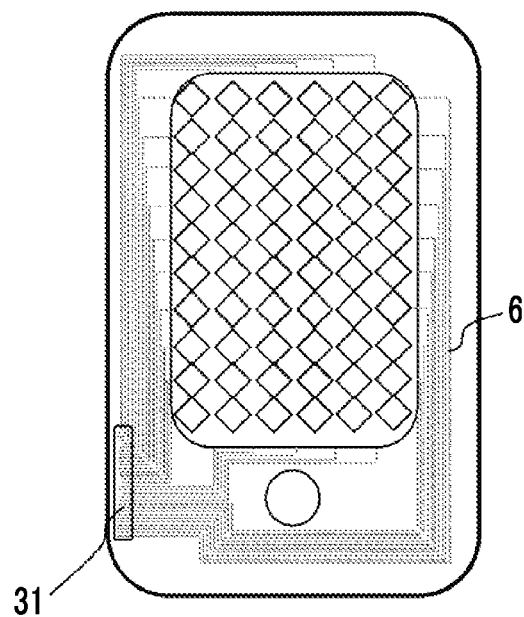
FIG. 13 is a top view illustrating another example of the configuration of the capacitance-type input device of the invention, the view illustrating an embodiment including a terminal (end portion) of a lead wiring, which has been exposed patternwise and is not covered by the first transparent resin layer.

The embodiment is illustrated in FIG. 13. FIG. 13 illustrates a capacitance-type input device having the following configuration, which includes the lead wiring (another conductive element 6) and the terminal 31 of the lead wiring of the transparent electrode pattern.

Since the first transparent resin layer (and second transparent resin layer) on the terminal 31 of the lead wiring becomes an uncured portion (unexposed portion), the transparent resin layer is removed by developing, and the terminal 31 of the lead wiring is exposed.

Figure 14:
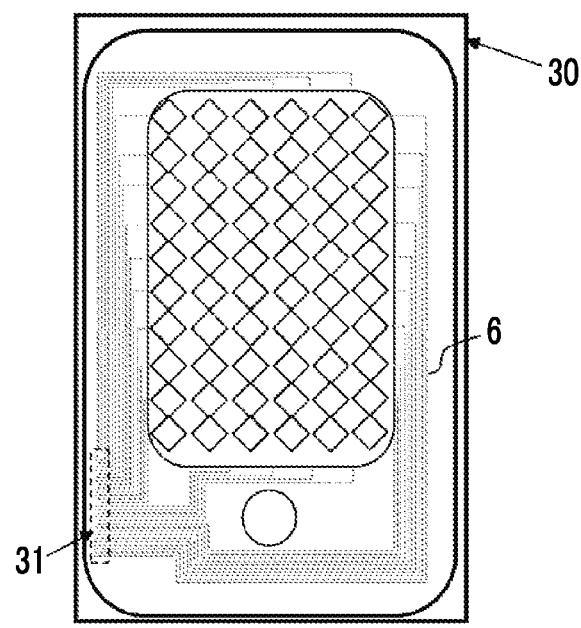
Figure 15:
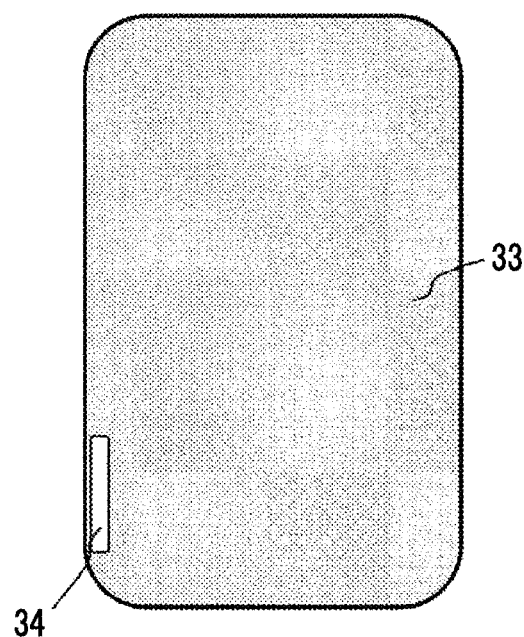
FIG. 15 a schematic view illustrating an example of a desired pattern obtained by curing the first transparent resin layer and the second transparent resin layer.

Specific embodiments of exposure and developing are illustrated in FIG. 14 and FIG. 15. FIG. 14 illustrates a state after the laminated material 30 of the invention having first and second transparent resin layers has been laminated on a transparent electrode pattern of a capacitance-type input device by laminating, and before the laminated material is cured by exposure to light or the like. In the case of utilizing photolithography, that is, in the case of performing curing by exposure to light, the cured portion (exposed portion) 33 of the first transparent resin layer and the second transparent resin layer having the shape illustrated in FIG. 15 can be obtained by performing patternwise exposure using a mask and developing of unexposed portions. Specifically, in FIG. 15, an opening 34 that corresponds to the terminal of the lead wiring as an uncured portion of the first transparent resin layer and the second transparent resin layer, and a cured portion (desired pattern) of the first and second transparent resin layers that is intended not to cover the terminal (wiring lead-out portion) of the lead wiring, from which edges of the laminated material of the invention having the first and second transparent resin layers protruded outward from the contour of the frame part of the capacitance-type input device have been eliminated, can be obtained.

As a result, a flexible wiring produced on a polyimide film can be directly connected to the terminal 31 of the lead wiring, and thereby, signals of a sensor can be transmitted to an electrical circuit.

It is preferable that the capacitance-type input device of the invention includes a transparent laminate which has a transparent electrode pattern, a second transparent resin layer disposed adjacently to this transparent electrode pattern, and a first transparent resin layer disposed adjacently to this second transparent resin layer, in which the second transparent resin layer has a refractive index that is higher than the refractive index of the first transparent resin layer, while the refractive index of the second transparent resin layer is 1.6 or higher.

In the following description, the details of a preferred embodiment of the capacitance-type input device of the invention will be explained.

It is preferable that the capacitance-type input device of the invention has a front face plate (corresponding to the transparent substrate in the transparent laminate of the invention); at least the following elements of (3) to (5), (7), and (8) on the non-contact face side of the front face plate; and the transparent laminate of the invention:

(3) plural first transparent electrode patterns formed by plural pad portions extending in a first direction through connection parts;

(4) plural second electrode patterns that are electrically insulated from the first transparent electrode patterns, and consist of plural pad portions formed by extending in a direction intersecting the first direction;

(5) an insulating layer that electrically insulates the first transparent electrode patterns and the second electrode patterns;

(7) a second transparent resin layer formed so as to cover the entirety or a portion of the elements (3) to (5); and (8) a first transparent resin layer formed adjacently to the element (7) so as to over the element (7).

Here, the (7) second transparent resin layer corresponds to the second transparent resin layer in the transparent laminate of the invention. Furthermore, the (8) first transparent resin layer corresponds to the first transparent resin layer in the transparent laminate of the invention. It is preferable that the first transparent resin layer is a so-called transparent protective layer used in a conventionally known capacitance-type input device.

In regard to the capacitance-type input device of the invention, the (4) second electrode patterns may be transparent electrode patterns, or may not be transparent electrode patterns; however, it is preferable that the second electrode patterns are transparent electrode patterns.

The capacitance-type input device of the invention may further have (6) another conductive element that is electrically connected to at least one of the first transparent electrode patterns and the second electrode patterns, and is different from the first transparent electrode patterns and the second electrode patterns.

Here, in a case in which the (4) second electrode patterns are not transparent electrode patterns, and the (6) other conductive element is not included, the (3) first transparent electrode patterns correspond to the transparent electrode pattern for the transparent laminate of the invention.

In a case in which the (4) second electrode patterns are transparent electrode patterns, and the (6) other conductive element is not included, at least one of the (3) first transparent electrode patterns and the (4) second electrode patterns corresponds to the transparent electrode pattern for the transparent laminate of the invention.

In a case in which the (4) second electrode patterns are not transparent electrode patterns, and the (6) other conductive element is included, at least one of the (3) first transparent electrode patterns and the (6) other conductive element corresponds to the transparent electrode pattern for the transparent laminate of the invention.

In a case in which the (4) second electrode patterns are transparent electrode patterns, and the (6) other conductive element is included, at least one of the (3) first transparent electrode patterns, the (4) second electrode patterns, and the (6) other conductive element corresponds to the transparent electrode pattern for the transparent laminate of the invention.

It is preferable that the capacitance-type input device of the invention further has (2) a transparent film between the (3) first transparent electrode patterns and the front face plate, between the (4) second electrode patterns and the front face plate, or between the (6) other conductive element and the front face plate. Here, it is preferable that the (2) transparent film corresponds to the transparent film having a refractive index of 1.6 to 1.78 and a film thickness of 55 to 110 nm in the transparent laminate of the invention, from the viewpoint of further ameliorating visibility of the transparent electrode patterns.

It is preferable that the capacitance-type input device of the invention further has (1) a mask layer and/or a decorative layer, if necessary. The mask layer is provided as a black frame around the region that is touched by a finger, a touch pen, or the like, in order to make the lead wiring of the transparent electrode pattern invisible from the contact side, or to provide decoration. The decorative layer is provided for the purpose of decoration as a frame around the region that is touched by a finger, a touch pen, or the like, and it is preferable to provide, for example, a white decorative layer.

It is preferable that the capacitance-type input device has the (1) mask layer and/or decorative layer between the (2) transparent film and the front face plate, between the (3) first transparent electrode patterns and the front face plate, between the (4) second transparent electrode patterns and the front face plate, or between the (6) other conductive element and the front face plate. It is more preferable that the (1) mask layer and/or decorative layer is provided adjacently to the front face plate.

In regard to the capacitance-type input device of the invention, even in a case in which such various members are included, the transparent electrode patterns can be made unnoticeable by including the second transparent resin layer disposed adjacently to the transparent electrode patterns, and the first transparent resin layer disposed adjacently to the second transparent resin layer, and thus the problem of visibility of the transparent electrode patterns can be ameliorated. Furthermore, as described above, by adopting a configuration which sandwiches the transparent electrode patterns by using the transparent film having a refractive index of 1.6 to 1.78 and a film thickness of 55 to 110 nm, and the second transparent resin layer, the problem of visibility of the transparent electrode patterns can be further ameliorated.

<Configuration of Capacitance-Type Input Device>

First, a preferred configuration of the capacitance-type input device of the invention will be explained together with the method for producing the various members that constitute the device. FIG. 1A is a cross-sectional view illustrating a preferred configuration of the capacitance-type input device of the invention. FIG. 1A illustrates an embodiment in which the capacitance-type input device 10 is configured to include a transparent substrate (front face plate) 1; a mask layer 2; a transparent film 11 having a refractive index of 1.6 to 1.78 and a film thickness of 55 to 110 nm; a first transparent electrode pattern 3; a second transparent electrode pattern 4; an insulating layer 5; a conductive element 6; a second transparent resin layer 12; and a first transparent resin layer 7.

Figure 1B:
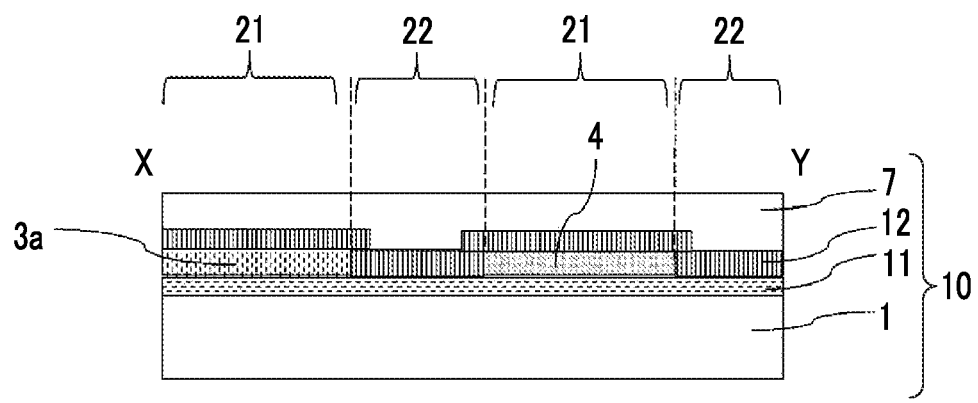
FIG. 1B is a schematic cross-sectional view illustrating another example of the configuration of the capacitance-type input device of the invention.

Furthermore, FIG. 1B, which illustrates a X-Y cross-section shown in FIG. 3 that will be described below, is also a cross-sectional view similarly illustrating a preferred configuration of the capacitance-type input device of the invention. FIG. 1B illustrates an embodiment in which the capacitance-type input device 10 is configured to include a transparent substrate (front face plate) 1; a transparent film 11 having a refractive index of 1.6 to 1.78 and a film thickness of 55 to 110 nm; a first transparent electrode pattern 3; a second transparent electrode pattern 4; a second transparent resin layer 12; and a first transparent resin layer 7.

Regarding the transparent substrate (front face plate) 1, the materials mentioned as the material for the transparent electrode pattern for the transparent laminate of the invention can be used. In FIG. 1A, the side where the various elements of the front face plate 1 are provided is referred to as a non-contact surface side. In the capacitance-type input device 10 of the invention, data is inputted by touching the contact surface (surface opposite to the non-contact surface) of the front face plate 1 with a finger or the like.

Furthermore, a mask layer 2 is provided on the non-contact surface of the front face plate 1. The mask layer 2 is a frame-shaped pattern around the display region formed on the non-contact surface side of the touch panel front face plate, and this is formed in order to make the lead wiring or the like invisible.

Figure 2:
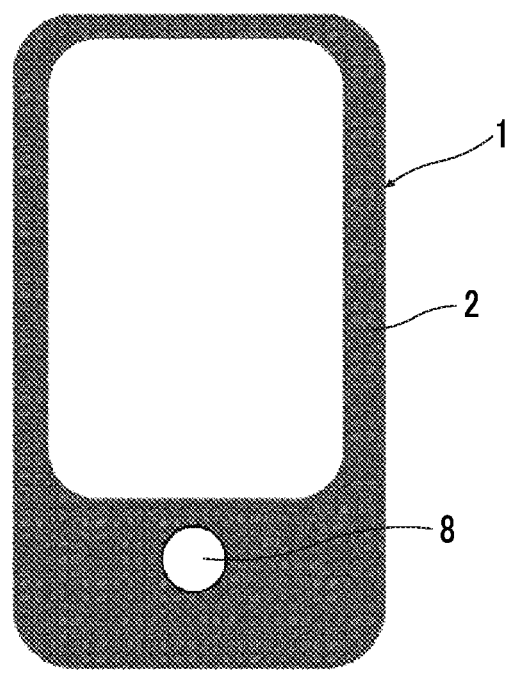
FIG. 2 is an explanatory diagram illustrating an example of a front face plate according to the invention.

In the capacitance-type input device 10 of the invention, as illustrated in FIG. 2, the mask layer 2 is provided so as to cover a partial region of the front face plate 1 (in FIG. 2, the region other than the input surface). Furthermore, in the front face plate 1, an opening 8 may be provided in a section as illustrated in FIG. 2. A pressing type mechanical switch can be provided at the opening 8.

On the contact surface of the front face plate 1, plural first transparent electrode patterns 3 that are formed by plural pad portions extending in a first direction through connection parts; plural second transparent electrode patterns 4 that are electrically insulated from the first transparent electrode patterns 3 and consist of plural pad portions formed by extending in a direction intersecting the first direction; and an insulating layer 5 that electrically insulates the first transparent electrode patterns 3 and the second transparent electrode patterns 4, are formed. Regarding the first transparent electrode patterns 3, the second transparent electrode patterns 4, and the conductive element 6 that will be described below, those mentioned as the materials for the transparent electrode pattern in the transparent laminate of the invention can be used, and it is preferable that ITO films are employed as the elements.

Furthermore, at least one of the first transparent electrode patterns 3 or the second transparent electrode patterns 4 can be installed in both the region on the non-contact surface of the front face plate 1 and the region on the surface of the mask layer 2 on the reverse side of the front face plate 1. In FIG. 1A, the second transparent electrode patterns are installed in both the region on the non-contact surface of the front face plate 1 and the region on the surface of the mask layer 2 on the reverse side of the front face plate 1.

As such, even in a case in which a photosensitive film is laminated over the mask layer, which needs a certain thickness, and the back surface of the front face plate, when a photosensitive film having the particular layer configuration that will be described below is used, lamination can be achieved through a simple process in a state free of air bubbles at the boundaries of the masked area, even without using highly expensive facilities such as a vacuum laminator.

The first transparent electrode patterns 3 and the second transparent electrode patterns 4 will be explained using FIG. 3. FIG. 3 is an explanatory diagram illustrating an example of the first transparent electrode patterns and the second transparent electrode patterns according to the invention. As illustrated in FIG. 3, the first transparent electrode patterns 3 are formed by pad portions 3*a* extending in a first direction through connection parts 3*b*. Furthermore, the second transparent electrode patterns 4 are electrically insulated from the first transparent electrode pattern 3 by means of the insulating layer 5, and are composed of plural pad portions that are formed by extending in a direction that intersects the first direction (second direction in FIG. 3). Here, in the case of forming the first transparent electrode patterns 3, the pad portions 3*a* and the connection parts 3*b* may be produced as integrated bodies, or only the connection parts 3*b* may be produced, and the pad portions 3*a* and the second transparent electrode patterns 4 may be produced (patterned) as integrated bodies. In a case in which the pad portions 3*a* and the second transparent electrode patterns 4 are produced (patterned) as integrated bodies, as illustrated in FIG. 3, various layers are formed such that portions of the connection parts 3*b* and portions of the pad portions 3*a* are connected, and the first transparent electrode patterns 3 and the second transparent electrode patterns 4 are electrically insulated by the insulating layer 5.

Furthermore, the region in FIG. 3 in which the first transparent electrode patterns 3, the second transparent electrode patterns 4, or the conductive element 6 that will be described below are not formed, corresponds to the non-patterned region 22 in the transparent laminate of the invention.

In FIG. 1A, the conductive element 6 is installed on the surface of the mask layer 2 on the reverse side of the front face plate 1. The conductive element 6 is an element which is electrically connected to at least one of the first transparent electrode patterns 3 or the second transparent electrode patterns 4, and is different from the first transparent electrode patterns 3 and the second transparent electrode patterns 4.

FIG. 1A illustrates that the conductive element 6 is connected to the second transparent electrode patterns 4.

Furthermore, in FIG. 1A, the first transparent resin layer 7 is installed so as to cover the entirety of the various constituent elements. The first transparent resin layer 7 may be configured to cover only a portion of the various constituent elements. The insulating layer 5 and the first transparent resin layer 7 may be formed from the same material, or may be formed from different materials. Regarding the material that constitutes the insulating layer 5, those mentioned as the material for the first or second transparent resin layers in the transparent laminate of the invention can be preferably used.

<Method for Producing Capacitance-Type Input Device>

Figure 4:
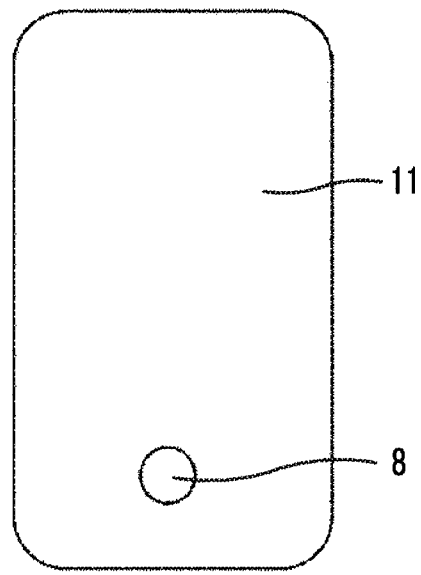
FIG. 4 is a top view illustrating an example of a reinforced glass plate having an opening formed therein.
Figure 5:
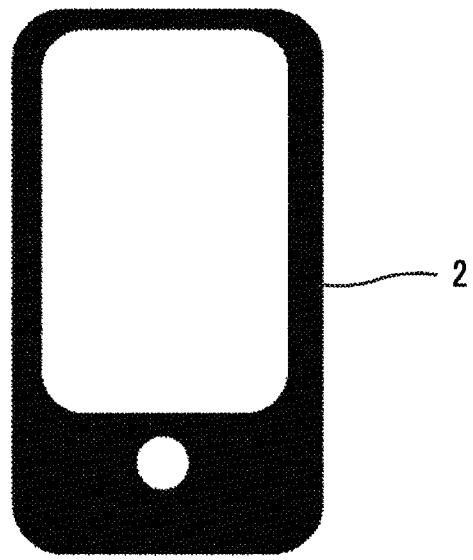
FIG. 5 is a top view illustrating an example of a front face plate having a mask layer formed thereon.
Figure 6:
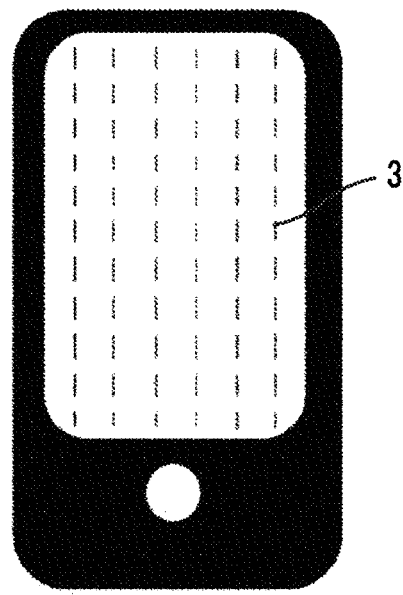
FIG. 6 is a top view illustrating an example of a front face plate having a first transparent electrode pattern formed thereon.
Figure 7:
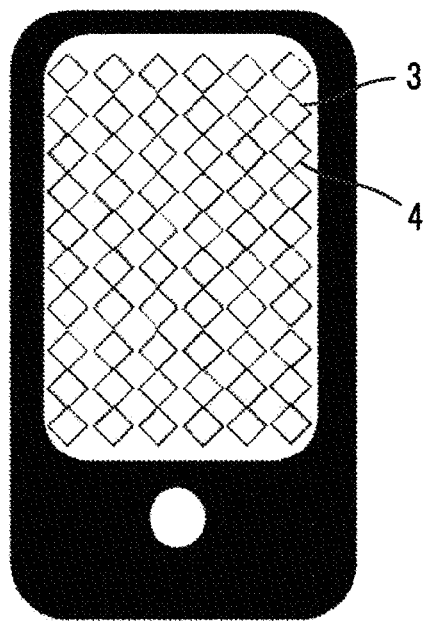
FIG. 7 is a top view illustrating an example of a front face plate having first and second transparent electrode patterns formed thereon.
Figure 8:
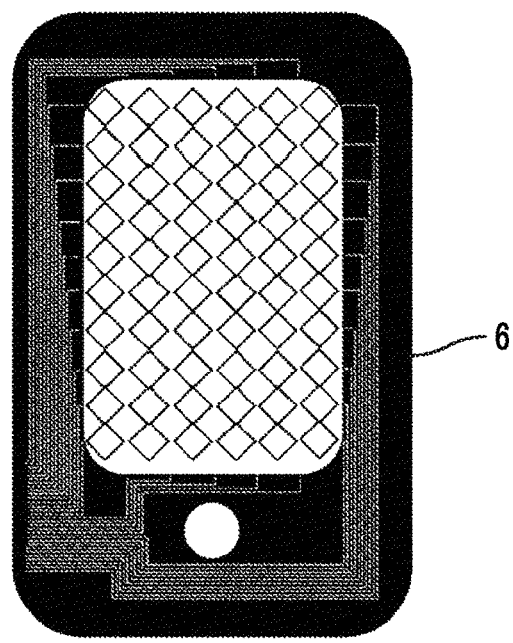
FIG. 8 is a top view illustrating an example of a front face plate on which a conductive element different from the first and second transparent electrode patterns is formed.

As embodiment examples that are formed during the process for producing the capacitance-type input device of the invention, the embodiments illustrated in FIG. 4 to FIG. 8 may be mentioned. FIG. 4 is a top view illustrating an example of a reinforced glass plate 11 having an opening 8 formed thereon. FIG. 5 is a top view illustrating an example of a front face plate having a mask layer 2 formed thereon. FIG. 6 is a top view illustrating an example of a front face plate having a first transparent electrode pattern 3 formed thereon. FIG. 7 is a top view illustrating an example of a front face plate having a first transparent electrode pattern 3 and a second transparent electrode pattern 4 formed thereon. FIG. 8 is a top view illustrating an example of a front face plate on which a conductive element 6 different from the first and second transparent electrode patterns is formed. These illustrate examples that specifically embody the following descriptions, and the scope of the invention is not intended to be limitedly interpreted due to these drawings.

In regard to the method for producing a capacitance-type input device, in a case in which the second transparent resin layer 12 and the first transparent resin layer 7 are formed, the second transparent resin layer 12 and the first transparent resin layer 7 can be formed by transferring the second transparent resin layer and the first transparent resin layer onto the surface of the front face plate 1 on which various elements have been arbitrarily formed, using the laminated material of the invention.

In regard to the method for producing a capacitance-type input device, it is preferable that at least one element of the mask layer 2, the first transparent electrode pattern 3, the second transparent electrode pattern 4, the insulating layer 5, or the conductive element 6 is formed using the above-mentioned photosensitive film having a base material and a photocurable resin layer in this order.

When the above-mentioned various elements are formed using the laminated material of the invention or the photosensitive film, even in the substrate (front face plate) having an opening, leakage of resist components through the opening part does not occur, and extrusion (leakage) of resist components through the glass edges does not occur at the mask layer, for which it is necessary to form a light shielding pattern up to the border limit of the front face plate. Therefore, a touch panel with a further reduced thickness and a further reduced weight can be produced by a simple process, without contaminating the backside of the front face plate.

On the occasion of using the mask layer, insulating layer, and conductive photocurable resin layer described above, in a case in which permanent materials such as the first transparent electrode pattern, the second transparent electrode pattern, and the conductive element are formed using the above-mentioned photosensitive film, the photosensitive film is laminated on a base material, and then is exposed to light patternwise as necessary. Then, a pattern can be obtained by eliminating the unexposed parts in the case of a negative type material, and eliminating the exposed parts in the case of a positive type material, through a developing treatment. Regarding the developing, the thermoplastic resin layer and the photocurable resin layer may be developed and removed with different liquids, or may be removed with the same liquid. If necessary, a known developing facility such as a brush or a high-pressure jet may be used in combination. After the developing, if necessary, post-exposure and post-bake treatments may be implemented.

(Photosensitive Film)

The photosensitive film other than the laminated material of the invention, which is preferably used in the case of producing the capacitance-type input device of the invention, will be explained. The photosensitive film has a base material and a photocurable resin layer, and it is preferable that the photosensitive film has a thermoplastic resin layer between the base material and the photocurable resin layer. When a mask layer and the like are formed using a photosensitive film having the aforementioned thermoplastic resin layer, air bubbles are not easily generated in the element formed by transferring the photocurable resin layer, image unevenness or the like does not easily occur in the image display device, and excellent display characteristics can be obtained.

The photosensitive film may be formed from a negative type material, or may be formed from a positive type material.

—Layers Other than Photocurable Resin Layer, and Production Method—

Regarding the base material and the thermoplastic resin layer for the photosensitive film, a base material and a thermoplastic resin layer similar to those used for the laminated material of the invention can be used. Also, regarding the method for producing the photosensitive film, a method similar to the method for producing a laminated material of the invention can be used.

—Photocurable Resin Layer—

In the photosensitive film, additives are added to the photocurable resin layer according to the use applications. That is, in the case of using the photosensitive film for the formation of a mask layer, a colorant is incorporated into the photocurable resin layer. Furthermore, in a case in which the photosensitive film has a conductive photocurable resin layer, conductive fibers and the like are incorporated into the photocurable resin layer.

In a case in which the photosensitive film is formed from a negative type material, it is preferable that the photocurable resin layer includes an alkali-soluble resin, a polymerizable compound, and a polymerization initiator or a polymerization initiator system. Furthermore, conductive fibers, a colorant, other additives, and the like are used; however, the invention is not intended to be limited to these.

—Alkali-Soluble Resin, Polymerizable Compound, and Polymerization Initiator or Polymerization Initiator System—

Regarding the alkali-soluble resin, the polymerizable compound, and the polymerization initiator or polymerization initiator system included in the photosensitive film, an alkali-soluble resin, a polymerizable compound, and a polymerization initiator or a polymerization initiator system that are similar to those used for the laminated material of the invention can be used.

—Conductive Fibers (in Case of being Used as Conductive Photocurable Resin Layer)—

In a case in which the photosensitive film having the conductive photocurable resin layer laminated thereon is used for forming a transparent electrode pattern or another conductive element, the following conductive fibers and the like can be used for the photocurable resin layer.

The structure of the conductive fibers is not particularly limited, and can be appropriately selected according to the purpose. However, any one of a solid structure and a hollow structure is preferred.

Here, a fiber having a solid structure may be referred to as "wire", and a fiber having a hollow structure may be referred to as "tube". Furthermore, a conductive fiber having an average minor axis length of 1 nm to 1,000 nm and an average major axis length of 1 µm to 100 µm may be referred to as "nanowire".

Furthermore, a conductive fiber having an average minor axis length of 1 nm to 1,000 nm and an average major axis length of 0.1 nm to 1,000 nm and having a hollow structure, may be referred to as "nanotube".

The material for the conductive fiber is not particularly limited as long as the material is electrically conductive, and the material can be appropriately selected according to the purpose. However, at least any one of metal or carbon is preferred, and among these, the conductive fiber is particularly preferably at least any one of a metal nanowire, a metal nanotube, or a carbon nanotube.

The material for the metal nanowire is not particularly limited, and for example, at least one metal selected from the group consisting of the elements of Period 4, Period 5 or Period 6 of the long-form Periodic Table (IUPAC 1991) is preferred; at least one metal selected from Group 2 to Group 14 is more preferred; and at least one metal selected from Group 2, Group 8, Group 9, Group 10, Group 11, Group 12, Group 13, or Group 14 is even more preferred. It is particularly preferable that the metal nanowire includes the metal as a main component.

Examples of the metal include copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, and alloys thereof. Among these, from the viewpoint of having excellent conductivity, it is preferable that the metal nanowire mainly contains silver, or contains an alloy of silver and a metal other than silver.

When it is said that the metal nanowire mainly contains silver, it means that silver is included at a proportion of 50% by mass or more, and preferably 90% by mass or more, in the metal nanowire.

Examples of the metal used in the alloy with silver include platinum, osmium, palladium, and iridium. These may be used singly or in combination of two or more kinds thereof.

The shape of the metal nanowire is not particularly limited, and can be appropriately selected according to the purpose. For example, an arbitrary shape such as a cylindrical shape, a rectangular parallelopiped shape, or a pillar shape having a polygonal cross-section, can be adopted; however, for the applications in which high transparency is needed, a cylindrical shape or a cross-sectional shape in which the corners of the polygon of the cross-section are rounded is preferred.

The cross-sectional shape of the metal nanowire can be examined by applying an aqueous dispersion liquid of metal nanowires on a base material, and observing a cross-section with a transmission electron microscope (TEM).

Figure 9:
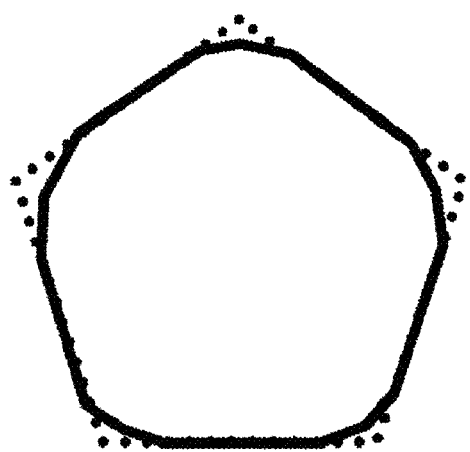
FIG. 9 is an explanatory diagram illustrating a cross-section of a metal nanowire.

A corner of a cross-section of the metal nanowire means the periphery of a point obtained by extending each side of the cross-section, and causing the side to intersect with a perpendicular line dropped from an adjoining side. Furthermore, "each side of the cross-section" is designated as a straight line connecting a corner with an adjoining corner. In this case, the proportion of the "outer circumferential length of the cross-section" with respect to the total length of the "each side of the cross-section" is designated as the degree of sharpness. Regarding the degree of sharpness, for example, in a metal nanowire cross-section such as shown in FIG. 9, the degree of sharpness can be represented by the proportion between the outer circumferential length of the cross-section indicated with solid lines and the outer circumferential length of the pentagon indicated with dotted lines. A cross-sectional shape having this degree of sharpness of 75% or less is defined as a cross-sectional shape with round corners. A degree of sharpness of 60% or less is preferred, and a degree of sharpness of 50% or less is more preferred. If the degree of sharpness exceeds 75%, electrons are localized at the corners, and plasmon absorption is increased, or a yellowish tinge remains, which may cause deterioration of transparency. Furthermore, linearity of the edges of the pattern is decreased, and rattling may occur. The lower limit of the degree of sharpness is preferably 30%, and more preferably 40%.

The average minor axis length (also referred to as "average minor axis diameter" or "average diameter") of the metal nanowire is preferably 150 nm or less, more preferably 1 nm to 40 nm, even more preferably 10 nm to 40 nm, and particularly preferably 15 nm to 35 nm.

If the average minor axis length is less than 1 nm, oxidation resistance is deteriorated, and durability may be deteriorated. If the average minor axis length is more than 150 nm, scattering attributable to the metal nanowire occurs, and sufficient transparency may not be obtained.

Regarding the average minor axis length of the metal nanowire, an observation of 300 metal nanowires is made using a transmission electron microscope (TEM; manufactured by JEOL, Ltd., JEM-2000FX), and the average minor axis length of the metal nanowires is determined from the average value thereof.

Regarding the minor axis length in the case in which the minor axis of the metal nanowire is not circular, the longest length is designated as the minor axis length.

The average major axis length (may be referred to as "average length") of the metal nanowire is preferably 1 μm to 40 μm, more preferably 3 μm to 35 μm, and even more preferably 5 μm to 30 μm.

If the average major axis length is less than 1 μm, it is difficult for the metal nanowires to form a compact network, and sufficient conductivity may not be obtained. If the average major axis length is more than 40 μm, the metal nanowires become too long and get entangled during production, and aggregates may be produced during the production process.

Regarding the average major axis length of the metal nanowire, an observation of 300 metal nanowires was made using a transmission electron microscope (TEM; manufactured by JEOL, Ltd., JEM-2000FX), and the average major axis length of the metal nanowire was determined from the average value thereof. Meanwhile, in a case in which a metal nanowire was bent, a circle including the bent nanowire as an arc was considered, and the value calculated from the radius of the circle and the curvature was designated as the major axis length.

The layer thickness of the conductive photocurable resin layer is preferably 0.1 to 20 μm, more preferably 0.5 to 18 μm, and particularly preferably 1 to 15 μm, from the viewpoint of process suitability, such as the stability of the coating liquid, drying at the time of coating, and the developing time at the time of patterning.

The content of the conductive fibers with respect to the total solid content of the conductive photocurable resin layer is preferably 0.01% to 50% by mass, more preferably 0.05% to 30% by mass, and particularly preferably 0.1% to 20% by mass, from the viewpoints of conductivity and the stability of the coating liquid.

—Colorant (in Case of being Used as Mask Layer)—

Furthermore, in a case in which the photosensitive film is used as a mask layer, a colorant can be used for the photocurable resin layer. Regarding the colorant that is used for the invention, known colorants (organic pigments, inorganic pigments, dyes, and the like) can be suitably used. Furthermore, according to the invention, in addition to a black colorant, a mixture of pigments of red, blue, green, and the like can be used.

In a case in which the photocurable resin layer is used as a black mask layer, from the viewpoint of the optical density, it is preferable that the photocurable resin layer includes a black colorant. Examples of the black colorant include carbon black, titanium carbon, iron oxide, titanium oxide, and graphite, and among them, carbon black is preferred.

In a case in which the photocurable resin layer is used as a white mask layer, the white pigments described in paragraph 0015 or 0114 of JP2005-7765A can be used. In order to use the photocurable resin layer as a mask layer having another color, mixtures of the pigments described in paragraphs 0183 to 0185 of JP4546276B, or mixtures of dyes may be used. Specifically, the pigments and dyes described in paragraphs 0038 to 0054 of JP2005-17716A; the pigments described in paragraphs 0068 to 0072 of JP2004-361447A; the colorants described in paragraphs 0080 to 0088 of JP2005-17521A; and the like can be suitably used.

It is desirable that the colorant (preferably a pigment, and more preferably carbon black) is used in the form of a dispersion liquid. This dispersion liquid can be prepared by adding a composition that is obtainable by mixing in advance a colorant and a pigment dispersant, to the organic solvent (or vehicle) that will be described below, and dispersing the composition therein. The term vehicle means the portion of a medium in which a pigment is dispersed, when a coating material is in a liquid state. The vehicle includes a component (binder) that is liquid and binds with the pigment to form a coating film, and a component (organic solvent) that dissolves and dilutes the aforementioned component.

The dispersing machine that is used at the time of dispersing the pigment is not particularly limited, and examples thereof include known dispersing machines such as the kneader, roll mill, attritor, SUPERMILL, DISSOLVER, HOMOMIXER, SANDMILL, and beads mill that are described in Asakura, Kunizo, "Ganryo no Jiten (Dictionary of Pigments)", 1st Edition, Asakura Publishing Co., Ltd., 2000, p. 438.

Furthermore, the pigment may also be finely pulverized by utilizing frictional force, by means of the mechanical attrition described in page 310 of this document.

Regarding the colorant, from the viewpoint of dispersion stability, a colorant having a number average particle size of 0.001 µm to 0.1 µm is preferred, and a colorant having a number average particle size of 0.01 µm to 0.08 µm is more preferred. The "particle size" as used herein refers to the diameter obtainable when an electron microscopic photograph image of a particle is considered as a circle having the same area, and regarding the "number average particle size", the particle sizes of a large number of particles are determined, and the average value of the particle sizes of any 100 particles arbitrarily selected therefrom is designated as the number average particle size.

The layer thickness of the photocurable resin layer including a colorant is preferably 0.5 to 10 µm, more preferably 0.8 to 5 µm, and particularly preferably 1 to 3 µm, from the viewpoint of the thickness difference between the resin layer and other layers. The percentage content of the colorant in the solid content of the colored photosensitive resin composition is not particularly limited; however, from the viewpoint of sufficiently shortening the developing time, the percentage content is preferably 15% to 70% by mass, more preferably 20% to 60% by mass, and even more preferably 25% to 50% by mass.

The total solid content as used in the present specification means the total mass of nonvolatile components excluding solvents and the like from the colored photosensitive resin composition.

Furthermore, in a case in which an insulating layer is formed using the above-mentioned photosensitive film, the layer thickness of the photocurable resin layer is preferably 0.1 to 5 µm, more preferably 0.3 to 3 µm, and particularly preferably 0.5 to 2 µm, form the viewpoint of maintaining insulation properties.

—Other Additives—

Furthermore, the photocurable resin layer may also use other additives. Regarding the additives, additives similar to those used for the laminated material of the invention can be used.

Regarding the solvent used for producing the photosensitive film by application, a solvent similar to that used for the laminated material of the invention can be used.

Thus, a case in which the photosensitive film is formed from a negative type material has been mainly described; however, the photosensitive film may be formed from a positive type material. In a case in which the photosensitive film is a positive type material, for example, the materials described in JP2005-221726A and the like are used for the photocurable resin layer; however, the invention is not intended to be limited thereto.

(Formation of Mask Layer and Insulating Layer Using Photosensitive Film)

The mask layer 2 and the insulating layer 5 can be formed by transferring the photocurable resin layer onto the front face plate 1 or the like using the photosensitive film. For example, in the case of forming a black mask layer 2, the mask layer can be formed by using the above-mentioned photosensitive film, which has a black photocurable resin layer as the photocurable resin layer, and transferring the black photocurable resin layer onto the surface of the front face plate 1. In the case of forming the insulating layer 5, the insulating layer can be formed by using a photosensitive film such as described above, which has an insulating photocurable resin layer as the photocurable resin layer, and transferring the photocurable resin layer onto the surface of the front face plate 1 having a first transparent electrode pattern formed thereon.

Furthermore, when a photosensitive film such as described above, which has a particular layer configuration including a thermoplastic resin layer between a photocurable resin layer and a base material, is used for the formation of a mask layer 2 that needs light shielding properties, air bubble generation at the time of photosensitive film lamination is prevented, and thus a high-quality mask layer 2 having no light leakage or the like can be formed.

(Formation of First and Second Transparent Electrode Patterns and Other Conductive Element Using Photosensitive Film)

The first transparent electrode pattern 3, the second transparent electrode pattern 4, and the other conductive element 6 can be formed using an etching treatment or the photosensitive film such as described above, which has a conductive photocurable resin layer, or by using the photosensitive film as a lift-off material.

—Etching Treatment—

In a case in which the first transparent electrode pattern 3, the second transparent electrode pattern 4, and the other conductive element 6 are formed by an etching treatment, first, a transparent electrode layer such as an ITO layer is formed by sputtering on the non-contact surface of a front face plate 1 having a mask layer 2 and the like formed thereon. Subsequently, an etching pattern is formed by exposure and developing, using a photosensitive film such as described above, which has a photocurable resin layer for etching as the photocurable resin layer on the transparent electrode layer. Thereafter, the transparent electrode layer is etched, thus the transparent electrode is patterned, and by eliminating the etching pattern, a first transparent electrode pattern 3 or the like can be formed.

Even in a case in which the photosensitive film is used as an etching resist (etching pattern), a resist pattern can be obtained in the same manner as the above-described method. Regarding the etching, etching and resist removal can be applied by the known method described in paragraphs 0048 to 0054 of JP2010-152155A.

For example, regarding the method for etching, a wet etching method of immersing in an etching liquid, which is generally practiced, may be used. Regarding the etching liquid used for wet etching, an etching liquid of an acidic type or an alkaline type may be appropriately selected in accordance with the object of etching. Examples of the acidic type etching liquid include aqueous solutions of an acidic component alone, such as hydrochloric acid, sulfuric acid, hydrofluoric acid, or phosphoric acid; and mixed aqueous solutions of acidic components and salts such as ferric chloride, ammonium fluoride, and potassium permanganate. Regarding the acidic component, a combination of plural acidic components may also be used. Furthermore, examples of the alkaline type etching liquid include aqueous solutions of alkali components alone, such as sodium hydroxide, potassium hydroxide, ammonia, organic amines, and salts of organic amines, such as tetramethylammonium hydroxide; and mixed aqueous solutions of alkali components and salts such as potassium permanganate. Regarding the alkali component, a combination of plural alkali components may also be used.

The temperature of the etching liquid is not particularly limited; however, the temperature is preferably 45° C. or lower. The resin pattern used as the etching mask (etching pattern) in the invention is a resin pattern formed using the photocurable resin layer described above, and exhibits especially excellent resistance to acidic and alkaline etching liquids in such a temperature range. Therefore, the resin pattern is prevented from being peeled during the etching step, and the parts where the resin pattern does not exist are selectively etched.

After the etching, in order to prevent line contamination, a washing step and a drying step may be carried out as necessary. The washing step may be carried out by, for example, washing a base material using pure water at normal temperature for 10 to 300 seconds. The drying step may be carried out using air blowing, and by appropriately adjusting the air blow pressure (about 0.1 to 5 kg/cm$^2$).

Subsequently, the method for peeling the resin pattern is not particularly limited; however, for example, a method of immersing a base material for 5 to 30 minutes in a peeling solution that is being stirred at 30° C. to 80° C., and preferably 50° C. to 80° C., may be used. The resin pattern used as an etching mask in the invention exhibits excellent chemical resistance at 45° C. or lower as explained above. However, when the chemical agent temperature rises to 50° C. or higher, the resin pattern exhibits a property of being swollen by an alkaline peeling solution. Due to such a property, when a peeling step is carried out using a peeling solution at 50° C. to 80° C., there is obtained an advantage that the duration of the process is shortened, and the amount of the peeling residue of the resin pattern produced is reduced. That is, by providing a difference in the chemical agent temperature between the etching process and the peeling step, the resin pattern used as the etching mask in the invention exhibits satisfactory chemical resistance during the etching process, and exhibits satisfactory peelability during the peeling step. Thus, contrasting characteristics such as chemical resistance and peelability can be both satisfied.

Examples of the peeling solution include peeling solutions obtained by dissolving an inorganic alkali component such as sodium hydroxide or potassium hydroxide, or an organic alkali component such as a tertiary amine or a quaternary ammonium salt, in water, dimethyl sulfoxide, N-methylpyrrolidone, or a mixed solution thereof. Peeling may be carried out using the peeling solution, by means of spraying, showering, paddling, or the like.

—Photosensitive Film Having Conductive Photocurable Resin Layer—

In a case in which the first transparent electrode pattern 3, the second transparent electrode pattern 4, and the other conductive element 6 are formed using the photosensitive film having a conductive photocurable resin layer, these elements can be formed by transferring the conductive photocurable resin layer onto the surface of the front face plate 1.

When the first transparent electrode pattern 3 or the like is formed using the photosensitive film having a conductive photocurable resin layer, even on a substrate (front face plate) having an opening, leakage of resist components through the opening part does not occur, and a touch panel having advantages of being a thin layer and being lightweight can be produced by a simple process, without contaminating the backside of the substrate.

Furthermore, when a photosensitive film such as described above, which has a particular layer configuration having a thermoplastic resin layer between the conductive photocurable resin layer and the base material, is used for the formation of the first transparent electrode pattern 3 or the like, air bubble generation at the time of lamination of the photosensitive film is prevented, and a first transparent electrode pattern 3, a second transparent electrode pattern 4, or another conductive element 6, all of which have excellent conductivity and low resistance, can be formed.

—Use of Photosensitive Film as Lift-Off Material—

A first transparent electrode layer, a second transparent electrode layer, and another conductive member can also be formed using the photosensitive film as a lift-off material.

In this case, patterning is performed using the photosensitive film, subsequently a transparent conductive layer is formed over the entire surface of a base material, and then dissolution and removal of the photocurable resin layer together with the deposited transparent conductive layer is carried out. Thus, a desired transparent conductive layer pattern can be obtained (lift-off method).

[Image Display Device]

The image display device of the invention includes the capacitance-type input device of the invention.

In regard to the capacitance-type input device of the invention and an image display device including this capacitance-type input device as a constituent element, the configurations disclosed in "Saishin Tatchipaneru Gijutsu (Latest Touch Panel Technologies)" (published by Techno Times Co., Ltd., on Jul. 6, 2009); Mitani, Yuji, reviewed, "Tatchipaneru no Gijutsui to Kaihatsu (Technology and Development of Touch Panels)", published by CMC Publishing Co., Ltd. (December, 2004); FPD International 2009 Forum T-11, Lecture textbook; and Cypress Semiconductor Corporation Application Note AN2292; and the like can be applied.

EXAMPLES

Hereinafter, the invention will be more specifically described by way of Examples. The materials, the use amounts, proportions, details of treatments, treatment procedures, and the like described in the following Examples can be appropriately altered, unless the gist of the invention is maintained. Therefore, the scope of the invention is not intended to be limited to the specific examples described below. Meanwhile, unless particularly stated otherwise, the units "parts" and "percent (%)" are on a mass basis.

Example 1

Production of Laminated Material Including First Transparent Resin Layer and Second Transparent Resin Layer <Formation of First Transparent Resin>

On a glass base material, Material-1 (formulation described in the following Table 1), which was an organic solvent-based resin composition for a first transparent resin layer, was spin-coated at 300 rpm using a spin coater (MS-A150, manufactured by Mikasa Co., Ltd.). Subsequently, the resin composition was heated and dried for 120 seconds at 100° C. on a hot plate, and thus a first transparent resin layer was formed.

The details of Material-1, and the details of Material-2 to Material-11 used in other Examples and Comparative Examples are presented in the following Table 1.

TABLE 1

| | Material | | | | | | | | | | |
|---|---|---|---|---|---|---|---|---|---|---|---|
| | Material-1 | Material-2 | Material-3 | Material-4 | Material-5 | Material-6 | Material-7 | Material-8 | Material-9 | Material-10 | Material-11 |
| $ZrO_2$: ZR-010 manufactured by Solar Co., Ltd. | 0.00 | 0.00 | 0.00 | 0.00 | 0.00 | 0.00 | 0.00 | 0.00 | 0.00 | 4.46 | 4.91 |
| DPHA liquid (dipentaerythritol hexaacrylate: 38%, dipentaerythritol pentaacrylate: 38%, 1-methoxy-2-propyl acetate: 24%) | 7.60 | 7.60 | 5.47 | 0.00 | 0.00 | 0.00 | 10.35 | 0.00 | 12.55 | 0.7 | 0.14 |
| Urethane-based monomer: UK OLIGO UA-32P manufactured by Shin-Nakamura Chemical Co., Ltd.; non-volatile fraction 75%, 1-methoxy-2-propyl acetate: 25% | 3.60 | 3.60 | 0.00 | 4.31 | 0.00 | 0.00 | 0.00 | 0.00 | 0.00 | 0.22 | 0.06 |
| Monomer mixture (polymerizable compound (b2-1) described in paragraph [0111] of JP2012-78528A, n = 1: tripentaerythritol octaacrylate percentage content 85%, sum of n = 2 and n = 3 as impurities is 15%) | 9.60 | 9.60 | 0.00 | 0.00 | 0.00 | 0.00 | 0.00 | 5.56 | 0.00 | 0.4 | 0.17 |
| Surface-modified silica (MIBK-SD manufactured by Nissan Chemical Industries, Ltd,; non-volatile fraction 30%, MIBK 70%) | 0.00 | 0.00 | 0.00 | 0.00 | 0.00 | 0.00 | 14.50 | 0.00 | 0.00 | 0.00 | 0.00 |
| Pentaerythritol tetraacrylate (NK ESTER A-TMMT manufactured by Shin-Nakamura Chemical Co., Ltd.) | 0.00 | 0.00 | 0.00 | 0.00 | 5.51 | 0.00 | 0.00 | 0.00 | 0.00 | 0.00 | 0.00 |
| Tetraacrylate of ethylene oxide adduct of pentaerythritol (KAYARAD RP-1040 manufactured by Nippon Kayaku Co., Ltd.) | 0.00 | 0.00 | 4.13 | 3.21 | 0.00 | 0.00 | 9.35 | 0.00 | 0.00 | 0.00 | 0.00 |
| Tricyclodecane dimethanol diacrylate (A-DCP manufactured by Shin-Nakamura Chemical Co., Ltd.) | 0.00 | 0.00 | 0.00 | 2.28 | 8.31 | 0.00 | 0.00 | 0.00 | 0.00 | 0.00 | 0.00 |
| Ethoxylated bisphenol A diacrylate (A-BPE-10 manufactured by Shin-Nakamura Chemical Co., Ltd.) | 0.00 | 0.00 | 0.00 | 0.00 | 0.00 | 5.51 | 0.00 | 0.00 | 0.00 | 0.00 | 0.00 |
| Polyethylene glycol #200 diacrylate (A-200 manufactured by Shin-Nakamura Chemical Co., Ltd.) | 0.00 | 0.00 | 0.00 | 0.00 | 0.00 | 0.00 | 0.00 | 7.80 | 0.00 | 0.00 | 0.00 |
| Ethoxylated isocyanuric acid triacrylate (A-9300 manufactured by Shin-Nakamura Chemical Co., Ltd.) | 0.00 | 0.00 | 0.00 | 0.00 | 0.00 | 0.00 | 0.00 | 0.00 | 6.35 | 0.00 | 0.00 |
| Urethane acrylate U-15HA (manufactured by Shin-Nakamura Chemical Co., Ltd.) | 0.00 | 0.00 | 0.00 | 0.00 | 2.52 | 0.00 | 0.00 | 0.00 | 0.00 | 0.00 | 0.00 |
| Binder polymer: Polymer solution 1 (structural formula P-25 described in paragraph [0058] of JP2008-146018A; weight average molecular weight: 35,000, solid content 45%, 1-methoxy-2-propyl acetate 15%, 1-methoxy-2-propanol 40%) | 11.80 | 11.90 | 6.70 | 6.73 | 9.60 | 8.90 | 16.5 | 0.00 | 16.52 | 1.05 | 0.89 |
| Binder polymer: Polymer solution 2 (copolymer of methacrylic acid/methyl methacrylate/butyl methacrylate; molecular weight 60,000, composition ratio = 30/30/40, non-volatile fraction 45%, 1-methoxy-2-propyl acetate 55%) | 0.00 | 0.00 | 0.00 | 0.00 | 0.00 | 0.00 | 0.00 | 9.16 | 0.00 | 0.00 | 0.00 |
| Photoradical polymerization initiator: 2-benzyl-2-dimethylamino-1-(4-morpholinophenyl)butanone (Irgacure 379, manufactured by BASF SE) | 0.09 | 0.18 | 0.00 | 0.00 | 0.00 | 0.00 | 0.61 | 0.61 | 0.61 | 0.02 | 0.02 |

TABLE 1-continued

| | Material | | | | | | | | | | |
|---|---|---|---|---|---|---|---|---|---|---|---|
| | Material-1 | Material-2 | Material-3 | Material-4 | Material-5 | Material-6 | Material-7 | Material-8 | Material-9 | Material-10 | Material-11 |
| Photoradical polymerization initiator: 1,2-octanedione, 1-[4-(phenylthio)-, 2-(O-benzoyl oxime) (Irgacure OXE-01, manufactured by BASF SE) | 0.00 | 0.00 | 0.61 | 0.61 | 0.61 | 0.21 | 0.00 | 0.00 | 0.00 | 0.00 | 0.00 |
| Photopolymerization initiator: KAYACURE-DETX-S (Alkylthio-xanthone manufactured by Nippon Kayaku Co., Ltd.) | 0.09 | 0.18 | 0.00 | 0.00 | 0.00 | 0.00 | 0.00 | 0.00 | 0.00 | 0.02 | 0.02 |
| Phenothiazine (Wako Pure Chemical Industries, Ltd.) | 0.00 | 0.00 | 0.00 | 0.00 | 0.00 | 0.00 | 0.00 | 0.00 | 0.00 | 0.00 | 0.00 |
| Phenoxazine (Wako Pure Chemical Industries, Ltd.) | 0.00 | 0.00 | 0.00 | 0.00 | 0.00 | 0.00 | 0.00 | 0.00 | 0.00 | 0.00 | 0.00 |
| Polymer solution 3 (solution of polymer having structural formula represented by following formula (3): weight average molecular weight 15,000, non-volatile fraction 30 wt %, methyl ethyl ketone 70 wt %) | 0.03 | 0.03 | 0.03 | 0.03 | 0.03 | 0.03 | 0.03 | 0.03 | 0.03 | 0.01 | 0.01 |
| 1-Methoxy-2-propyl acetate | 29.15 | 28.87 | 45.19 | 44.96 | 41.06 | 53.33 | 13.04 | 41.22 | 26.07 | 37.99 | 38.96 |
| Methyl ethyl ketone | 38.04 | 38.04 | 37.87 | 37.87 | 37.87 | 26.51 | 35.62 | 35.62 | 37.87 | 55.13 | 54.82 |
| Total (parts by mass) | 100 | 100 | 100 | 100 | 100 | 100 | 100 | 100 | 100 | 100 | 100 |

The unit "wt %" in the specification has the same meaning as "mass %".

Formula (3)

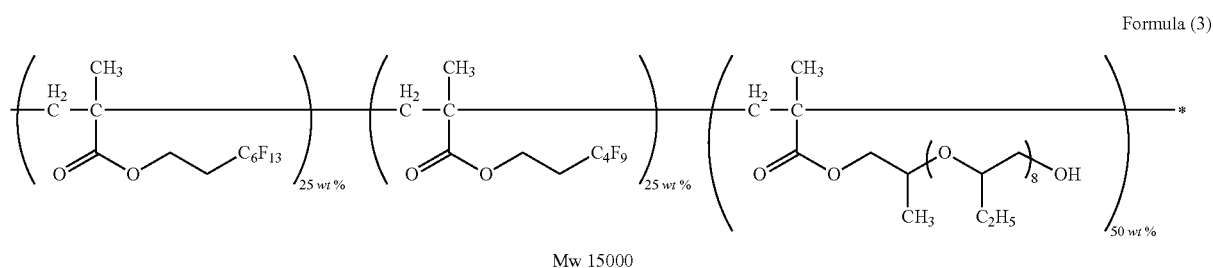

Mw 15000

<Formation of Second Transparent Resin Layer>

Subsequently, on the first transparent resin layer, Material-21 (formulation described in the following Table 2), which was a water-based resin composition for second transparent resin layer including an ammonium salt of a monomer having an acid group or an ammonium salt of a resin having an acid group, was similarly spin-coated at 300 rpm using a spin coater. Here, Material-21 was produced using a monomer having an acid group or a resin having an acid group and an aqueous ammonia solution, the monomer having an acid group or the resin having an acid group was neutralized by an aqueous ammonia solution, and thus a water-based resin composition including an ammonium salt of the monomer having an acid group or an ammonium salt of the resin having an acid group was produced. Subsequently, the resin composition was heated and dried for 120 seconds at 100° C. on a hot plate, and thus a second transparent resin layer was obtained. In a process of heating and drying this applied water-based resin composition for a second transparent resin layer, ammonia was volatilized from the ammonium salt of a monomer having an acid group or the ammonium salt of a resin having an acid group, and thus acid groups can be produced. A laminated material thus obtained was designated as the laminated material of Example 1.

The details of Material-21, and the details of Material-22 to Material-43 used in other Examples and Comparative Examples are presented in the following Table 2 and Table 3.

TABLE 2

|  | Material | | | | | | | | | | | |
|---|---|---|---|---|---|---|---|---|---|---|---|---|
|  | Material-21 | Material-22 | Material-23 | Material-24 | Material-25 | Material-26 | Material-27 | Material-28 | Material-29 | Material-30 | Material-31 | Material-32 |
| NANOUSE OZ-S30M: $ZrO_2$ particles methanol dispersion liquid (non-volatile fraction 30.5%) manufactured by Nissan Chemical Industries, Ltd. | 0.00 | 0.00 | 0.00 | 0.00 | 0.00 | 0.00 | 4.33 | 4.33 | 4.02 | 4.33 | 4.20 | 0.00 |
| NANOUSE ZR-30BFN: $ZrO_2$ particles methanol dispersion liquid (non-volatile fraction 30.5%) manufactured by Nissan Chemical Industries, Ltd. | 0.00 | 0.00 | 0.00 | 0.00 | 0.00 | 0.00 | 0.00 | 0.00 | 0.00 | 0.00 | 0.00 | 4.33 |
| Polymerizable compound of structural formula 1 | 0.00 | 0.00 | 0.00 | 0.00 | 0.00 | 0.00 | 0.00 | 0.00 | 0.00 | 0.00 | 0.31 | 0.00 |
| Aqueous ammonia (2.5%) | 7.84 | 7.84 | 7.84 | 0.00 | 7.84 | 0.00 | 7.84 | 7.84 | 7.84 | 7.84 | 7.84 | 7.84 |
| Copolymerized resin of methacrylic acid/methyl methacrylate (Mw: 15,000, composition ratio = 40/60, non-volatile fraction 99.8%) | 0.66 | 0.00 | 0.00 | 0.00 | 0.00 | 0.00 | 0.66 | 0.00 | 0.00 | 0.00 | 0.00 | 0.00 |
| Copolymerized resin of methacrylic acid/allyl methacrylate (Mw: 25,000, composition ratio = 40/60, non-volatile fraction 99.8%) | 0.00 | 0.66 | 0.00 | 0.00 | 0.00 | 0.00 | 0.00 | 0.66 | 0.66 | 0.00 | 0.00 | 0.00 |
| Copolymerized resin of methacrylic acid/benzyl methacrylate (Mw: 30,000, composition ratio = 30/70, non-volatile fraction 99.8%) | 0.00 | 0.00 | 0.66 | 0.00 | 0.00 | 0.00 | 0.00 | 0.00 | 0.00 | 0.66 | 0.66 | 0.00 |
| Polyvinyl alcohol resin 10% aqueous solution (prepared from PVA205C, degree of saponification 88 mol %, degree of polymerization 1750, manufactured by Kuraray Co., Ltd., into 10% aqueous solution) | 0.00 | 0.00 | 0.00 | 0.66 | 0.00 | 0.00 | 0.00 | 0.00 | 0.00 | 0.00 | 0.00 | 0.00 |
| Hydroxyalkylamide-curable carboxyl group-containing polyester resin, FINEDIC (manufactured by DIC Corporation) | 0.00 | 0.00 | 0.00 | 0.00 | 0.66 | 0.00 | 0.00 | 0.00 | 0.00 | 0.00 | 0.00 | 0.66 |
| Cellulose resin (HPC-L, manufactured by Nippon Soda Co., Ltd.) | 0.00 | 0.00 | 0.00 | 0.00 | 0.00 | 0.66 | 0.00 | 0.00 | 0.00 | 0.00 | 0.00 | 0.00 |
| Phosphoric acid monomer (JPA-514, manufactured by Johoku Chemical Co., Ltd.) | 0.00 | 0.00 | 0.00 | 0.00 | 0.00 | 0.00 | 0.00 | 0.00 | 0.29 | 0.00 | 0.00 | 0.00 |
| Phosphoric acid polymer (POLYPHOSMER-MHB-10, manufactured by DAP Co., Ltd., non-volatile fraction 30.4%, water 69.6%) | 0.00 | 0.00 | 0.00 | 0.00 | 0.00 | 0.00 | 0.00 | 0.00 | 0.29 | 0.00 | 0.00 | 0.00 |
| Benzimidazole (manufactured by Wako Pure Chemical Industries, Ltd.) | 0.00 | 0.00 | 0.00 | 0.00 | 0.00 | 0.00 | 0.00 | 0.00 | 0.00 | 0.05 | 0.00 | 0.00 |

TABLE 2-continued

|  | Material | | | | | | | | | | | |
|---|---|---|---|---|---|---|---|---|---|---|---|---|
|  | Material-21 | Material-22 | Material-23 | Material-24 | Material-25 | Material-26 | Material-27 | Material-28 | Material-29 | Material-30 | Material-31 | Material-32 |
| Water-soluble photo-polymerization initiator IRGACURE 2959 (manufactured by BASF SE) | 0.00 | 0.00 | 0.00 | 0.00 | 0.00 | 0.00 | 0.00 | 0.00 | 0.00 | 0.00 | 0.04 | 0.00 |
| Ion exchange water | 74.91 | 74.91 | 74.91 | 82.75 | 74.91 | 82.75 | 70.58 | 70.29 | 70.60 | 70.53 | 70.35 | 70.58 |
| Methanol | 16.59 | 16.59 | 16.59 | 16.59 | 16.59 | 16.59 | 16.59 | 16.59 | 16.59 | 16.59 | 16.59 | 16.59 |
| Total (parts by mass) | 100 | 100 | 100 | 100 | 100 | 100 | 100 | 100 | 100 | 100 | 100 | 100 |
| pH at 25° C. | 8.2 | 8.3 | 8.2 | 7.2 | 8 | 7.2 | 8.2 | 7.9 | 7.8 | 8.2 | 7.8 | 7.9 |

TABLE 3

|  | Material | | | | | | | | | | |
|---|---|---|---|---|---|---|---|---|---|---|---|
|  | Material-33 | Material-34 | Material-35 | Material-36 | Material-37 | Material-38 | Material-39 | Material-40 | Material-41 | Material-42 | Material-43 |
| NANOUSE OZ-S30M: $ZrO_2$ particles methanol dispersion liquid (non-volatile fraction 30.5%) manufactured by Nissan Chemical Industries, Ltd. | 4.33 | 4.33 | 4.33 | 4.52 | 4.71 | 4.89 | 4.33 | 4.33 | 4.33 | 4.33 | 5.15 |
| NANOUSE ZR-30BFN: $ZrO_2$ particles methanol dispersion liquid (non-volatile fraction 30.5%) manufactured by Nissan Chemical Industries, Ltd. | 0.00 | 0.00 | 0.00 | 0.00 | 0.00 | 0.00 | 0.00 | 0.00 | 0.00 | 0.00 | 0.00 |
| Polymerizable compound of structural formula 1 | 0.00 | 0.00 | 0.00 | 0.00 | 0.00 | 0.00 | 0.00 | 0.00 | 0.00 | 0.00 | 0.00 |
| Aqueous ammonia (2.5%) | 0.00 | 0.00 | 7.84 | 7.84 | 7.84 | 7.84 | 9.3 | 11.6 | 12.8 | 7.84 | 7.84 |
| Copolymerized resin of methacrylic acid/methyl methacrylate (Mw: 15,000, composition ratio = 40/60, non-volatile fraction 99.8%) | 0.00 | 0.00 | 0.00 | 0.00 | 0.00 | 0.00 | 0.00 | 0.00 | 0.00 | 0.00 | 0.00 |
| Copolymerized resin of methacrylic acid/allyl methacrylate (Mw: 25,000, composition ratio = 40/60, non-volatile fraction 99.8%) | 0.00 | 0.00 | 0.66 | 0.66 | 0.66 | 0.66 | 0.66 | 0.66 | 0.66 | 0.00 | 0.66 |
| Copolymerized resin of methacrylic acid/benzyl methacrylate (Mw: 30,000, composition ratio = 30/70, non-volatile fraction 99.8%) | 0.00 | 0.00 | 0.00 | 0.00 | 0.00 | 0.00 | 0.00 | 0.00 | 0.00 | 0.00 | 0.00 |
| Polyvinyl alcohol resin 10% aqueous solution (prepared from PVA205C, degree of saponification 88 mol %, degree of polymerization 1750, manufactured by Kuraray Co., Ltd., into 10% aqueous solution) | 0.66 | 0.00 | 0.00 | 0.00 | 0.00 | 0.00 | 0.00 | 0.00 | 0.00 | 0.66 | 0.00 |
| Hydroxyalkylamide-curable carboxyl group-containing polyester resin, FINEDIC (manufactured by DIC Corporation) | 0.00 | 0.00 | 0.00 | 0.00 | 0.00 | 0.00 | 0.00 | 0.00 | 0.00 | 0.00 | 0.00 |

TABLE 3-continued

|  | Material | | | | | | | | | | |
|---|---|---|---|---|---|---|---|---|---|---|---|
|  | Material-33 | Material-34 | Material-35 | Material-36 | Material-37 | Material-38 | Material-39 | Material-40 | Material-41 | Material-42 | Material-43 |
| Cellulose resin (HPC-L, manufactured by Nippon Soda Co., Ltd.) | 0.00 | 0.66 | 0.00 | 0.00 | 0.00 | 0.00 | 0.00 | 0.00 | 0.00 | 0.00 | 0.00 |
| Phosphoric acid monomer (JPA-514, manufactured by Johoku Chemical Co., Ltd.) | 0.00 | 0.00 | 0.00 | 0.00 | 0.00 | 0.00 | 0.00 | 0.00 | 0.00 | 0.00 | 0.00 |
| Phosphoric acid polymer (POLYPHOSMER-MHB-10, manufactured by DAP Co., Ltd., non-volatile fraction 30.4%, water 69.6%) | 0.00 | 0.00 | 0.00 | 0.00 | 0.00 | 0.29 | 0.29 | 0.29 | 0.29 | 0.00 | 0.29 |
| Benzimidazole (manufactured by Wako Pure Chemical Industries, Ltd.) | 0.00 | 0.00 | 0.00 | 0.00 | 0.00 | 0.00 | 0.00 | 0.00 | 0.00 | 0.00 | 0.00 |
| Water-soluble photo-polymerization initiator IRGACURE 2959 (manufactured by BASF SE) | 0.00 | 0.00 | 0.00 | 0.00 | 0.00 | 0.00 | 0.00 | 0.00 | 0.00 | 0.00 | 0.00 |
| Ion exchange water | 78.42 | 78.42 | 27.17 | 6.98 | 81.69 | 69.72 | 68.83 | 66.53 | 65.33 | 70.58 | 69.47 |
| Methanol | 16.59 | 16.59 | 60.00 | 80.00 | 5.10 | 16.59 | 16.59 | 16.59 | 16.59 | 16.59 | 16.59 |
| Total (parts by mass) | 100 | 100 | 100 | 100 | 100 | 100 | 100 | 100 | 100 | 100 | 100 |
| pH at 25° C. | 7.2 | 7.1 | 7.3 | 7.6 | 7.8 | 7.9 | 9.5 | 11.6 | 12.1 | 7.2 | 7.9 |

In the tables shown above, $ZrO_2$ is in the form of particles having a refractive index of 2.2 and an average particle size of about 12 nm. The unit "wt %" in the tables has the same meaning as "mass %".

The polymerizable compound represented by structural formula 1 in the tables has the following structure.

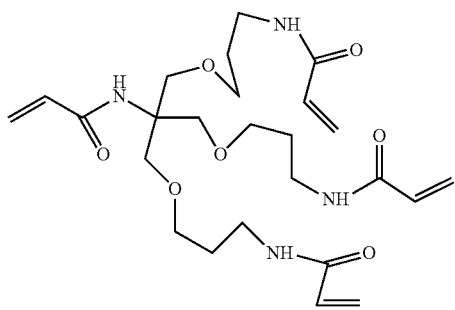

Structural Formula 1

Examples 2 to 9 and Comparative Examples 1 to 4

Laminated materials of Examples 2 to 9 and Comparative Examples 1 to 4 were produced in the same manner as in Example 1, except that the base material, and the materials for the first transparent resin layer and the second transparent resin layer described in the following Table 4 were used in connection with Example 1.

[Evaluation]
<Layer Demarcation>
During the production of the laminated material including the first and second transparent resin layer, a coating liquid for a second transparent resin layer was applied on the first transparent resin layer, and until the coating liquid dried, whether layer mixing would occur was observed. Furthermore, a cross-section of the dried laminated material was observed with an electron microscope, and whether layers could be demarcated was evaluated. Grade A or B indicates a level that is practically useful, and grade A is preferable.

<<Evaluation Criteria>>

A: During the course of application and drying of the coating liquid for a second transparent resin layer, dissolution or clouding of the first transparent resin layer was not observed. Also, a cross-section of the laminated material was observed with an electron microscope, and as a result, layers were properly demarcated, and layer demarcation was achieved at a satisfactory level. When it is said that layer demarcation is achieved at a satisfactory level, it is implied that, for example, the existence of interfaces is clearly recognized in a layer cross-section, and uniformity of the interfaces in a viewing field of observation (distribution in the film thickness direction of the positions of interfaces in a cross-section) is 30 nm or less.

B: During the course of application and drying of the coating liquid for a second transparent resin layer, the first transparent resin layer exhibited slight cloudiness; however, the cloudiness disappeared after drying. Furthermore, a cross-section of the laminated material was observed with an electron microscope, and as a result, layers were demarcated, and layer demarcation was achieved at a mediocre level. When it is said that layer demarcation is achieved at a mediocre level, it is implied that, for example, in a layer cross-section, the existence of interfaces is clearly recognized; however, a region in which the uniformity of interfaces in a viewing field of observation is more than 30 nm is partially included.

C: During the course of application and drying of the coating liquid for a second transparent resin layer, the first transparent resin layer dissolved or became slightly cloudy. Furthermore, a cross-section of the laminated material was observed with an electron microscope, and as a result, the first transparent resin layer and the second transparent resin layer were in a state of being slightly mixed or in an undulating state, with poor layer demarcation.

D: during the course of application and drying of the coating liquid for a second transparent resin layer, the first transparent resin layer dissolved or became cloudy. Furthermore, a cross-section of the laminated material was observed with an electron microscope, and as a result, complete mixing of layers occurred, and layer demarcation was achieved at a very poor level.

The results thus obtained are described in the following Table 4.

<Wet Heat Test>

A substrate thus obtained was heated for 30 minutes at 150° C., and then the substrate was left to stand for 24 hours in a constant temperature-constant humidity chamber at 85° C. and a relative humidity of 85%. Observations of the film surface of the first transparent resin layer and the second transparent resin layer on the base material before and after the test were made by visual inspection and using an optical microscope. An evaluation was performed as follows.

A: No change was observed in the film surface before and after the test.

B: Slight clouding occurred after the test.

C: The state of the film surface changed significantly before and after the test, and clouding occurred.

The results thus obtained are described in the following Table 4.

TABLE 4

| | Base material | First transparent resin layer | Second transparent resin layer | Layer demarcation | Wet heat test |
|---|---|---|---|---|---|
| Example 1 | Glass | Material-1 | Material-21 | A | A |
| Example 2 | Si wafer | Material-1 | Material-21 | A | A |
| Example 3 | PET film (75 μm thick) | Material-1 | Material-22 | A | A |
| Example 4 | Glass | Material-2 | Material-23 | A | A |
| Example 5 | Glass | Material-3 | Material-25 | A | A |
| Example 6 | Glass | Material-4 | Material-29 | A | A |
| Example 7 | Glass | Material-5 | Material-39 | A | A |
| Example 8 | Glass | Material-6 | Material-40 | B | A |
| Example 9 | Glass | Material-6 | Material-41 | B | A |
| Comparative Example 1 | Glass | Material-1 | Material-24 | A | C |
| Comparative Example 2 | Glass | Material-1 | Material-26 | A | C |
| Comparative Example 3 | Glass | Material-1 | Material-10 | D | A |
| Comparative Example 4 | Glass | Material-1 | Material-11 | D | A |

From Table 4, it was found that the laminated materials of the invention exhibited satisfactory layer demarcation, and a problem caused by moisture absorption of the transparent resin layer formed using a water-based resin composition in a case in which the laminated materials were subjected to a high temperature and high humidity environment for a period of time, could be suppressed.

On the other hand, in Comparative Examples 1 and 2, since the material for the second transparent resin layer did not have aqueous ammonia added thereto, it was found that in regard to laminated materials in which the second transparent resin layer was formed using Material-24 or Material-26, both of which did not contain an ammonium salt of a monomer having an acid group or an ammonium salt of a resin having an acid group, poor evaluation results were obtained in the wet heat test, the state of the film surface changed significantly before and after the test, and clouding occurred.

From Comparative Examples 3 and 4, it was found that in laminated materials in which the second transparent resin layer was formed using Material-10 or Material-11, both of which were materials for the second transparent resin layers and were not water-based resin compositions but organic solvent-based resin compositions, layer demarcation occurred at a poor level.

(Measurement of Double Bond Consumption Rate)

In Examples 1 to 9, at a time point at which the first transparent resin layer had been applied and dried, this first transparent resin layer was cut into slices from the surface using a microtome. To 0.1 mg of these slices, 2 mg of a KBr powder was added, and the mixture was thoroughly mixed under a yellow lamp. This was used as a measurement sample of a UV-uncured product for the measurement of the double bond consumption rate that will be described below.

The intensity of a peak at 810 $cm^{-1}$ derived from the C=C bond was determined by making measurement in the wavelength range of 400 $cm^{-1}$ to 4,000 $cm^{-1}$, using an FT-TR apparatus (manufactured by Thermo Nicolet Japan, Co., Ltd., NICOLET 710). The peak intensity (=residual amount of double bonds) A of a UV-uncured product that had been coated and dried only, and the peak intensity B of various film slices that had been coated, dried, and cured were determined. For the first curable transparent resin layer formed in each Example, the double bond consumption rate was calculated by the following expression:

$$\text{Double bond consumption rate} = \{1-(B/A)\} \times 100\% \quad \text{Expression:}$$

As a result, it was confirmed that for the laminated materials of Examples 1 to 9, the double bond consumption rates were 10% or less.

Comparative Example 5

A water-based resin composition including a resin having an acid group that was not dissolved in aqueous ammonia (not neutralized with aqueous ammonia) was produced using, instead of Material-21 described in Examples 1 and 2, a material having the same composition as that of Material-21 except that aqueous ammonia was not added. However, the resin having an acid group that was not dissolved in aqueous ammonia (not neutralized with aqueous ammonia) did not dissolve in a water-based solvent.

Examples 101 to 124 and Comparative Examples 101 to 103

The first transparent resin layer and the second transparent resin layer were provided in the same manner as in Example 1, except that in connection with Example 1, the base material, and the materials for the first transparent resin layer and the second transparent resin layer described in the following Table 5 were used.

<Pressure Bonding of Protective Film>

After the first transparent resin layer and the second transparent resin layer that provided the dried film thicknesses in the following Table 5 were provided on a base material as described above, a protective film (polypropylene film having a thickness of 12 μm) was pressure-bonded thereon at the end.

<Evaluation of First or Second Transparent Resin Layer>
(Evaluation of Refractive Index of First or Second Transparent Resin Layer)

The average refractive index of the first or second transparent resin layer for light having a wavelength of 400 to 750 nm was determined. The values are described in the following Table 5.

Thus, laminated materials in which a base material, a first transparent resin layer, a second transparent resin layer, and a protective film were integrated, were produced. The laminated materials (transfer materials) thus obtained were designated as the laminated materials (transfer materials) of Examples 101 to 124 and Comparative Examples 101 to 103.

<Evaluation of Laminated Materials>
(Layer Demarcation and Wet Heat Test)

The laminated materials of Examples 101 to 124 and Comparative Examples 101 to 103 were subjected to layer demarcation and a wet heat test in the same manner as in Example 1. The results thus obtained are described in the following Table 5.

[Production of Transparent Laminates]

Transparent laminates were produced by the following method, using the laminated materials (transfer materials) of Examples 101 to 124 and Comparative Examples 101 to 103 obtained as described above.

<1. Formation of Transparent Film>

A transparent film having a refractive index of 1.60 and a film thickness of 80 nm was formed on a glass transparent substrate (glass substrate) having a refractive index of 1.51 by the following method, using a coating liquid for a transparent film T1.

(Production of Transfer Material for Forming a Transparent Film)

On a polyethylene terephthalate film (temporary support) having a thickness of 75 μm, a coating liquid for a thermoplastic resin layer based on the following formulation H1 was applied using a slit-like nozzle, and the coating liquid was dried to form a thermoplastic resin layer. Subsequently, a coating liquid for an intermediate layer based on the following formulation P1 was applied on the thermoplastic resin layer, and the coating liquid was dried to form an intermediate layer.

Furthermore, the coating liquid for a transparent film T1 was applied thereon and dried to form a transparent resin layer. In this manner, a thermoplastic resin layer having a dried film thickness of 15.1 μm, an intermediate layer having a dried film thickness of 1.6 μm, and a transparent resin layer having a dried film thickness of 80 nm were provided on the temporary support. Lastly, a protective film (polypropylene film having a thickness of 12 μm) was pressure-bonded on the transparent resin layer. Thus, a transfer material in which a temporary support, a thermoplastic resin layer, an intermediate layer, a transparent resin layer, and a protective film were integrated was produced.

(Coating Liquid for Thermoplastic Resin Layer: Formulation H1)

| | |
|---|---|
| Methanol: | 11.1 parts by mass |
| Propylene glycol monomethyl ether acetate: | 6.36 parts by mass |
| Methyl ethyl ketone: | 52.4 parts by mass |
| Methyl methacrylate/2-ethylhexyl acrylate/benzyl methacrylate/methacrylic acid copolymer (copolymerization composition ratio (molar ratio) = 55/11.7/4.5/28.8, weight average molecular weight = 100,000, Tg (glass transition temperature) ≈ 70° C.): | 5.83 parts by mass |
| Styrene/acrylic acid copolymer (copolymerization composition ratio (molar ratio) = 63/37, weight average molecular weight = 10,000, Tg ≈ 100° C.): | 13.6 parts by mass |
| Monomer 1 (trade name: BPE-500, manufactured by Shin-Nakamura Chemical Co., Ltd.): | 9.1 parts by mass |
| Fluorine-based polymer: | 0.54 parts by mass |

The above-mentioned fluorine-based polymer was a copolymer of 40 parts of $C_6F_{13}CH_2CH_2OCOCH{=}CH_2$, 55 parts of $H(OCH(CH_3)CH_2)_7OCOCH{=}CH_2$, and 5 parts of $H(OCHCH_2)_7OCOCH{=}CH_2$, having a weight average molecular weight of 30,000, and was in the form of a 30 mass % solution in methyl ethyl ketone (trade name: MEGAFACE F780F, manufactured by Dainippon Ink and Chemicals, Inc.).

(Coating Liquid for Intermediate Layer: Formulation P1)

| | |
|---|---|
| Polyvinyl alcohol (trade name: PVA205, manufactured by Kuraray Co., Ltd., degree of saponification = 88%, degree of polymerization = 550): | 32.2 parts by mass |
| Polyvinylpyrrolidone (trade name: K-30, manufactured by ISP Japan, Ltd.): | 14.9 parts by mass |
| Distilled water: | 524 parts by mass |
| Methanol: | 429 parts by mass |

(Coating Liquid for Transparent Film: Formulation T1)

| | |
|---|---|
| $ZrO_2$: ZR-010 manufactured by Solar Co., Ltd.: | 2.08 parts by mass |
| DPHA liquid (dipentaerythritol hexaacrylate: 38%, dipentaerythritol pentaacrylate: 38%, 1-methoxy-2-propyl acetate: 24%): | 0.29 parts by mass |
| Monomer mixture (polymerizable compound (b2-1) described in paragraph [0111] of JP2012-78528A, n = 1: tripentaerythritol octaacrylate percentage content 85%, sum of n = 2 and n = 3 as impurities is 15%): | 0.36 parts by mass |
| Urethane-based monomer: UK OLIGO UA-32P manufactured by Shin-Nakamura Chemical Co., Ltd.: non-volatile fraction 75%, 1-methoxy-2-propyl acetate: 25%: | 0.14 parts by mass |
| Polymer solution 1 (1-methoxy-2-propanol, methyl ethyl ketone solution (solid content: 45%) of structural formula P-25 described in paragraph [0061] of JP2008-146018A; a glycidyl methacrylate adduct (d) of a cyclohexyl methacrylate (a)/methyl methacrylate (b)/methacrylic acid copolymer (c) (composition (mol %): a/b/c/d = 46/2/20/32, weight average molecular weight: 36,000, acid value 66 mg KOH/g)): | 1.89 parts by mass |
| Photoradical polymerization initiator: 2-benzyl-2-dimethylamino-1-(4-morpholinophenyl)butanone (Irgacure 379, manufactured by BASF SE): | 0.03 parts by mass |

| | |
|---|---|
| Photopolymerization initiator: KAYACURE-DETX-S (alkylthioxanthone manufactured by Nippon Kayaku Co., Ltd): | 0.03 parts by mass |
| Surfactant (trade name: MEGAFACE F-784F, manufactured by Dainippon Ink and Chemicals, Inc.): | 0.010 parts by mass |
| 1-Methoxy-2-propyl acetate: | 38.73 parts by mass |
| Methyl ethyl ketone: | 56.8 parts by mass |

(Formation of Transparent Film)

Onto a glass transparent substrate, a transparent resin layer was transferred together with a thermoplastic resin, an intermediate layer, and a PET temporary support, using the transfer film for forming a transparent film described above, from which the protective film had been peeled off, and then the PET temporary support was peeled off. Subsequently, the laminate was exposed over the entire surface to i-line at a dose of 40 mJ/cm$^2$ through the thermoplastic resin layer side, using a proximity type exposure machine (manufactured by Hitachi High-Tech Electronics Engineering Co., Ltd.) having an ultrahigh pressure mercury lamp. Subsequently, the laminate was developed by showering with a triethanolamine-based developer (containing 30% of triethanolamine, liquid obtained by diluting trade name: T-PD2 (manufactured by Fujifilm Corporation) in pure water to 10 times (mixed at a proportion of 1 part of T-PD2 and 9 parts of pure water)) at 30° C. for 60 seconds, at a flat nozzle pressure of 0.04 MPa, and thus the thermoplastic resin and the intermediate layer were removed. Subsequently, the top surface (transparent resin layer side) of this glass transparent substrate was subjected to liquid draining by blowing air, and then pure water was sprayed by showering thereon for 10 seconds to clean the surface by showering with pure water. Then, the liquid reservoir on the glass transparent substrate was reduced by blowing air. Subsequently, the glass transparent substrate was subjected to a heating treatment (post-bake) for 60 minutes at 230° C., the transparent resin layer was heated and cured thereby to obtain a transparent film, and thus a substrate having a transparent film laminated on a glass transparent substrate was obtained.

<2. Formation of Transparent Electrode Pattern>

The substrate having a transparent film laminated on a glass transparent substrate, which was obtained as described above, was introduced into a vacuum chamber, and an ITO thin film having a thickness of 40 nm and a refractive index of 1.82 was formed by DC MAGNETRON sputtering (conditions: temperature of base material 250° C., argon pressure 0.13 Pa, and oxygen pressure 0.01 Pa) using an ITO target (indium:tin=95:5 (molar ratio)) having a percentage content of SnO$_2$ of 10% by mass. Thus, a front face plate having a transparent electrode layer formed thereon was obtained. The surface resistance of the ITO thin film was 80Ω/□ (Ω per square).

(Production of Photosensitive Film for Etching E1)

On a polyethylene terephthalate film (temporary support) having a thickness of 75 µm, the coating liquid for a thermoplastic resin layer based on the above-described formulation H1 was applied using a slit-like nozzle, and the coating liquid was dried to form a thermoplastic resin layer. Subsequently, a coating liquid for an intermediate layer based on the above-described formulation P1 was applied on the thermoplastic resin layer, and the coating liquid was dried to form an intermediate layer.

Furthermore, a coating liquid for a photocurable resin layer for etching: Formulation E1 was applied thereon and dried to form a photocurable resin layer for etching. In this manner, a laminate including a thermoplastic resin layer having a dried film thickness of 15.1 µm, an intermediate layer having a dried film thickness of 1.6 µm, and a photocurable resin layer for etching having a film thickness of 2.0 µm on a temporary support was obtained. Lastly, a protective film (polypropylene film having a thickness of 12 µm) was pressure-bonded onto the photocurable resin layer for etching. Thus, a transfer material in which a temporary support, a thermoplastic resin layer, an intermediate layer (oxygen blocking film), and a photocurable resin layer for etching were integrated was produced.

(Coating Liquid for Photocurable Resin Layer for Etching: Formulation E1)

| | |
|---|---|
| Methyl methacrylate/styrene/methacrylic acid copolymer (copolymer composition (mass %): 31/40/29, weight average molecular weight 60,000, acid value 163 mg KOH/g): | 16 parts by mass |
| Monomer-1 (trade name: BPE-500, manufactured by Shin-Nakamura Chemical Co., Ltd.): | 5.6 parts by mass |
| Tetraethylene oxide monomethacrylate 0.5 mol adduct of hexamethylene diisocyanate: | 7 parts by mass |
| Cyclohexane dimethanol monoacrylate as a compound having one polymerizable group in the molecule: | 2.8 parts by mass |
| 2-Chloro-N-butylacridone: | 0.42 parts by mass |
| 2,2-Bis(ortho-chlorophenyl)-4,4',5,5'-tetraphenylbiimidazole: | 2.17 parts by mass |
| Malachite Green oxalate: | 0.02 parts by mass |
| Leuco Crystal Violet: | 0.26 parts by mass |
| Phenothiazine: | 0.013 parts by mass |
| Surfactant (trade name: MEGAFACE F-780F, manufactured by Dainippon Ink and Chemicals, Inc.): | 0.03 parts by mass |
| Methyl ethyl ketone: | 40 parts by mass |
| 1-Methoxy-2-propanol: | 20 parts by mass |

The viscosity at 100° C. after solvent removal from the coating liquid for a photocurable resin layer for etching: Formulation E1, was 2,500 Pa-sec.

(Formation of Transparent Electrode Pattern)

The front face plate having a transparent electrode layer formed thereon was washed, and the photosensitive film for etching E1 from which the protective film had been removed was laminated thereon (base material temperature: 130° C., rubber roller temperature 120° C., linear pressure 100 N/cm, conveyance speed 2.2 m/min). After the temporary support was peeled off, the distance between the exposure mask (quartz exposure mask having a transparent electrode pattern) surface and the photocurable resin layer for etching was set to 200 µm, and patternwise exposure was performed at an amount of exposure of 50 mJ/cm$^2$ (i-line).

Subsequently, the front face plate was subjected to a developing treatment for 100 seconds at 25° C. using a triethanolamine-based developer (containing 30% by mass of triethanolamine, liquid obtained by diluting trade name: T-PD2 (manufactured by Fujifilm Corporation) 10 times with pure water), and was subjected to a washing treatment for 20 seconds at 33° C. using a surfactant-containing washing liquid (liquid obtained by diluting trade name:

T-SD3 (manufactured by Fujifilm Corporation) 10 times with pure water). Residue was removed by rubbing the front face plate obtained after the washing treatment with a rotating brush and spraying ultrapure water through an ultrahigh pressure washing nozzle. Subsequently, a post-bake treatment was performed for 30 minutes at 130° C., and a front face plate having a transparent electrode layer and a photocurable resin layer pattern for etching formed thereon was obtained.

The front face plate having a transparent electrode layer and a photocurable resin layer pattern for etching formed thereon was immersed in an etching tank containing an ITO etchant (aqueous solution of hydrochloric acid and potassium chloride, liquid temperature: 30° C.), and the front face plate was treated (etching treatment) for 100 seconds. The transparent electrode layer in an exposed region that was not covered with the photocurable resin layer for etching was dissolved and removed, and thus a front face plate having a photocurable resin layer pattern for etching-attached transparent electrode layer was obtained.

Subsequently, the front face plate having a photocurable resin layer pattern for etching-attached transparent electrode layer was immersed in a resist peeling tank containing a resist peeling solution (N-methyl-2-pyrrolidone, monoethanolamine, and a surfactant (trade name: SURFYNOL 465, manufactured by Air Products and Chemicals, Inc.), liquid temperature: 45° C.) and was treated (peeling treatment) for 200 seconds. The photocurable resin layer for etching was removed, and a substrate having a transparent film and a transparent electrode pattern formed on a glass transparent substrate was obtained.

Edges of the transparent electrode pattern was subjected to conductivity impartation and surface protection by means of Pt coating (about 20 nm thick), and then an observation of the shape of the edges of the transparent electrode pattern (secondary electron image, accelerating voltage 20 kV) was made using Nova 200 type FIB/SEM multi-function machine manufactured by FEI Company.

The ITO pattern thus formed had a tapered shape as shown in FIG. 10, and the taper angle α was about 3°.

<3. Formation of First Transparent Resin Layer and Second Transparent Resin Layer>

On the substrate having a transparent film and a transparent electrode pattern formed on a glass transparent substrate obtained as described above, each of the laminated materials (transfer materials) of Examples 101 to 124 and Comparative Examples 101 to 103, from which the protective film had been removed, was laminated (rubber roller temperature 110° C., linear pressure 100 N/cm, conveyance speed 2.0 m/min). The distance between the exposure mask (quartz exposure mask having a pattern for forming an overcoat) surface and the temporary support (base material of the laminated material) was set to 125 μm, and pattern-wise exposure was performed at an amount of exposure of 100 mJ/cm² (i-line) through the temporary support. After the temporary support was peeled off, the substrate was subjected to a washing treatment for 60 seconds at 32° C. with a 2% aqueous solution of sodium carbonate. Residue was removed by rubbing the front face plate obtained after the washing treatment with a rotating brush and spraying ultrapure water through an ultrahigh pressure washing nozzle. Subsequently, moisture on the base material was removed by blowing air, a post-bake treatment was performed for 30 minutes at 145° C., and a transparent laminate in which a transparent film, a transparent electrode pattern, a second transparent resin layer, and a first transparent resin layer were continuously formed in this order on a glass transparent substrate, was formed.

In this manner, a transparent laminate in which a transparent film, a transparent electrode pattern, a second transparent resin layer, and a first transparent resin layer were laminated in this order on a glass transparent substrate, was obtained. The transparent laminates thus obtained were designated as transparent laminates of Examples 101 to 124 and Comparative Examples 101 to 103.

[Evaluation of Transparent Laminate]

<Evaluation of Visibility of Transparent Electrode Pattern>

The glass surface of a transparent laminate in which a transparent film, a transparent electrode pattern, a second transparent resin layer and a first transparent resin layer were laminated in this order on a glass plate was adhered to a black PET material, with a transparent adhesive tape (manufactured by 3M Company, trade name: OCA TAPE 8171CL) interposed therebetween, and the entire substrate was shielded from light.

The average reflectivity for light having a wavelength of 400 to 650 nm in a region in the substrate where the transparent electrode pattern was formed was measured using an ultraviolet/visible spectrophotometer (V-570 manufactured by JASCO Corporation). The measurement results were classified as follows.

A: The reflectivity was less than 8.5%.

B: The reflectivity was 8.5% or more and less than 9.0%.

C: The reflectivity was 9.0% or more.

The evaluation results are described in the following Table 5.

(Evaluation of Adhesiveness)

In a transparent laminate produced by laminating a mask layer, a transparent film, a transparent electrode pattern, a second transparent resin layer, and a first transparent resin layer in this order on a glass plate according to JIS K 5600-5-6: ISO2409 (cross-cut method), incisions were inserted at a width of 1 mm to form film pieces, and it was observed whether peeling with CELLOPHANE tape occurred. Grade A, B, or C is preferable, grade A or B is more preferable, and grade A is particularly preferable.

<Evaluation Criteria>

A: Close adhesion occurred at a highly satisfactory level, without any peeling of the first and second transparent resin layer components.

B: Slight peeling occurred only at the edges of the incisions in the first and second transparent resin layers; however, peeling did not occur in the film piece parts, and adhesion occurred at a satisfactory level.

C: Peeling of the film pieces of the first and second transparent resin layer components occurred at a proportion of 0% or more and less than 2%, and adhesion occurred at a practical, mediocre level.

D: Peeling of the film pieces of the first and second transparent resin layer components was recognized at a proportion of 2% or more and less than 5%, and adhesion was poor.

E: Peeling of the film pieces of the first and second transparent resin layer components was recognized at a proportion of 5% or more, and adhesion was very poor.

The evaluation results are described in the following Table 5.

TABLE 5

| | Base material | First transparent resin layer | | | Second transparent resin layer | | | Evaluation of laminated material | | Evaluation of transparent laminate | |
| --- | --- | --- | --- | --- | --- | --- | --- | --- | --- | --- | --- |
| | | Material | Thickness | Refractive index | Material | Thickness | Refractive index | Layer demarcation | Wet heat test | Adhesiveness | Visibility of transparent electrode pattern |
| Example 101 | PET film (75 μm) | Material-1 | 5 μm | 1.51 | Material-27 | 98 nm | 1.65 | A | A | A | A |
| Example 102 | PET film (50 μm) | Material-2 | 5 μm | 1.52 | Material-28 | 83 nm | 1.66 | A | A | A | A |
| Example 103 | PET film (35 μm) | Material-3 | 5 μm | 1.51 | Material-29 | 87 nm | 1.61 | A | A | A | B |
| Example 104 | PET film (28 μm) | Material-4 | 5 μm | 1.53 | Material-30 | 103 nm | 1.65 | A | A | A | A |
| Example 105 | PET film (25 μm) | Material-5 | 6 μm | 1.51 | Material-31 | 96 nm | 1.63 | A | A | A | A |
| Example 106 | PET film (20 μm) | Material-6 | 7 μm | 1.51 | Material-32 | 110 nm | 1.65 | A | A | A | A |
| Example 107 | PET film (28 μm) | Material-7 | 8 μm | 1.51 | Material-35 | 95 nm | 1.65 | A | A | A | A |
| Example 108 | PET film (16 μm) | Material-8 | 9 μm | 1.51 | Material-36 | 103 nm | 1.67 | A | A | A | A |
| Example 109 | PET film (25 μm) | Material-9 | 4 μm | 1.51 | Material-37 | 85 nm | 1.69 | A | A | A | A |
| Example 110 | PET film (25 μm) | Material-1 | 3 μm | 1.52 | Material-38 | 89 nm | 1.71 | A | A | A | A |
| Example 111 | PET film (35 μm) | Material-2 | 2 μm | 1.52 | Material-39 | 91 nm | 1.65 | A | A | A | A |
| Example 112 | PET film (50 μm) | Material-3 | 5 μm | 1.52 | Material-40 | 95 nm | 1.65 | A | A | A | A |
| Example 113 | PET film (50 μm) | Material-4 | 6 μm | 1.52 | Material-41 | 99 nm | 1.65 | B | A | A | A |
| Example 114 | PET film (50 μm) | Material-5 | 7 μm | 1.51 | Material-35 | 51 nm | 1.66 | A | A | A | B |
| Example 115 | PET film (50 μm) | Material-6 | 5 μm | 1.51 | Material-35 | 38 nm | 1.66 | A | A | A | B |
| Example 116 | PET film (50 μm) | Material-7 | 6 μm | 1.51 | Material-35 | 130 nm | 1.64 | A | A | A | B |
| Example 117 | PET film (50 μm) | Material-8 | 7 μm | 1.51 | Material-35 | 230 nm | 1.65 | A | A | A | C |
| Example 118 | PET film (50 μm) | Material-9 | 8 μm | 1.51 | Material-35 | 480 nm | 1.65 | A | A | A | C |
| Example 119 | PET film (50 μm) | Material-3 | 5 μm | 1.51 | Material-35 | 95 nm | 1.66 | A | A | A | A |
| Example 120 | PET film (50 μm) | Material-5 | 11 μm | 1.51 | Material-35 | 99 nm | 1.64 | A | A | B | A |
| Example 121 | PET film (50 μm) | Material-5 | 13 μm | 1.51 | Material-35 | 83 nm | 1.64 | A | A | C | A |
| Example 122 | PET film (50 μm) | Material-5 | 15 μm | 1.51 | Material-35 | 78 nm | 1.65 | A | A | C | A |
| Example 123 | PET film (50 μm) | Material-5 | 16 μm | 1.51 | Material-35 | 109 nm | 1.65 | A | A | C | A |
| Example 124 | PET film (50 μm) | Material-5 | 16 μm | 1.51 | Material-43 | 98 nm | 1.73 | A | A | C | B |
| Comparative Example 101 | PET film (50 μm) | Material-1 | 8 μm | 1.51 | Material-33 | 89 nm | 1.65 | A | C | E | Evaluation impossible |
| Comparative Example 102 | PET film (50 μm) | Material-2 | 5 μm | 1.51 | Material-34 | 92 nm | 1.64 | A | C | E | Evaluation impossible |
| Comparative Example 103 | PET film (50 μm) | Material-3 | 5 μm | 1.51 | Material-42 | 90 nm | 1.65 | A | C | E | Evaluation impossible |

From Table 5, it was found that the laminated materials (transfer materials) of the invention exhibited satisfactory layer demarcation, and a problem caused by moisture absorption of the transparent resin layer formed using a water-based resin composition in a case in which the laminated material was subjected to a high temperature and high humidity environment for a period of time, could be suppressed. Furthermore, it was found that the transparent laminates of the invention produced using the laminated materials of the invention exhibited satisfactory adhesiveness, and there was no problem of the transparent electrode patterns being visually recognized.

On the other hand, from Comparative Examples 101 and 102, it was found that since aqueous ammonia was not added as a material of the second transparent resin layer, the laminated materials in which the second transparent resin layer was formed using Material-33 or Material-34 that did not contain an ammonium salt of a monomer having an acid group or an ammonium salt of a resin having an acid group, gave poor results for the evaluation by a wet heat test, the state of film surface changed significantly before and after the test, and clouding occurred. Furthermore, the transparent laminates of Comparative Examples 101 and 102 produced using the laminated materials of Comparative Examples 101 and 102 exhibited poor adhesiveness, and had a problem that the transparent electrode patterns were visually recognized.

From Comparative Example 103, since a monomer having an acid group or a resin having an acid group was not added as a material for the second transparent resin layer, the laminated material in which the second transparent resin layer was formed using Material-42 that did not contain an ammonium salt of a monomer having an acid group or an ammonium salt of a resin having an acid group, gave poor results for the evaluation by a wet heat test, the state of film surface changed significantly before and after the test, and clouding occurred. Furthermore, the transparent laminate of Comparative Example 103 produced using the laminated material of Comparative Example 103 exhibited poor adhesiveness, and had a problem that the transparent electrode pattern was visually recognized.

(Measurement of Double Bond Consumption Rate)

In regard to Examples 101 to 124, at a time point at which the first transparent resin layer had been applied and dried, this first transparent resin layer was cut into slices from the surface using a microtome. To 0.1 mg of these slices, 2 mg of a KBr powder was added, and the mixture was thoroughly mixed under a yellow lamp. This was used as a measurement sample of a UV-uncured product for the measurement of the double bond consumption rate that will be described below.

The intensity of a peak at 810 $cm^{-1}$ derived from the C=C bond was determined by making measurement in the wavelength range of 400 $cm^{-1}$ to 4,000 $cm^{-1}$, using an FT-IR apparatus (manufactured by Thermo Nicolet Japan, Co., Ltd., NICOLET 710). The peak intensity (=residual amount of double bonds) A of a UV-uncured product that had been coated and dried only, and the peak intensity B of various film slices that had been coated, dried and cured were determined. For the first curable transparent resin layer formed in each Example, the double bond consumption rate was calculated by the following expression:

Double bond consumption rate=$\{1-(B/A)\}\times 100\%$   Expression:

As a result, it was confirmed that for the laminated materials of Examples 101 to 124, the double bond consumption rates were 10% or less.

Examples 150 to 155

Laminated materials and transparent laminates of Examples 150 to 155 were produced in the same manner as in Example 101, except that in connection with Example 101, the base material, and the materials for the first transparent resin layer and the second transparent resin layer described in the following Table 6 and Table 7 were used, and an evaluation was performed. The results are described in the following Table 7.

NANOUSE: NANOUSE OZ-S30M; manufactured by Nissan Chemical Industries, Ltd., zirconium oxide/tin oxide-containing inorganic particles, a methanol dispersion liquid having a particle size of 7 nm, solid content 30.5%

Polymer-A: Copolymerized resin of methacrylic acid/methyl methacrylate (Mw: 15,000, composition ratio=40/60)

Polymer-C: Aqueous ammonia solution (pH=9.0) of copolymerized resin of methacrylic acid/methyl methacrylate (Mw: 15,000, composition ratio=40/60, non-volatile fraction 5%)

Polymer-D: Aqueous ammonia solution (pH 10.0) of copolymerized resin of methacrylic acid/methyl methacrylate (Mw: 15,000, composition ratio=40/60, non-volatile fraction 5%)

Benzotriazole: Metal Oxidation Inhibitor

I-1: Water-soluble photopolymerization initiator (IRGACURE 2959, BASF JAPAN, Ltd.)

A-1: Polymerizable compound KAYARAD RP-1040 (manufactured by Nippon Kayaku Co., Ltd.)

A-2: Polymerizable compound ARONIX TO-2349 (manufactured by Toagosei Co., Ltd.)

From Table 6 and Table 7, it was found that the laminated materials (transfer materials) of the invention exhibited satisfactory layer demarcation, and a problem caused by moisture absorption of the transparent resin layer formed using a water-based resin composition in a case in which the laminated material was subjected to a high temperature and high humidity environment for a period of time, could be suppressed. Furthermore, it was found that the transparent laminates of the invention produced using the laminated materials of the invention exhibited satisfactory adhesiveness, and did not have a problem that the transparent electrode pattern was visually recognized.

Also, measurement of the double bond consumption rates was performed in the same manner as in the case of the laminated material of Example 101, and as a result, it was confirmed that in the laminated materials of Examples 150 to 155, the double bond consumption rates were 10% or less.

Examples 201 to 224: Production of Capacitance-Type Input Devices

[Formation of Mask Layer]
<Production of Photosensitive Film K1 for Forming Mask Layer>

On a polyethylene terephthalate film (temporary support) having a thickness of 75 μm, the coating liquid for a thermoplastic resin layer based on the above-described formulation H1 was applied using a slit-like nozzle, and the coating liquid was dried to form a thermoplastic resin layer. Subsequently, a coating liquid for an intermediate layer based on the above-described formulation P1 was applied on

TABLE 6

| | Dispersion liquid | | Resin | | Solvent | | | Additive-1 | | Additive-2 | | | Solid content | ZrO$_2$ |
| | | | | | Distilled water | Methanol | 1% aqueous ammonia | | | | | | | |
| | Type | Parts by mass | Type | Parts by mass | (parts by mass) | (parts by mass) | (parts by mass) | Type | Parts by mass | Type | Parts by mass | Total | concentration (%) | concentration (%) |
|---|---|---|---|---|---|---|---|---|---|---|---|---|---|---|
| Material-53 | NANOUSE | 4.25 | Polymer-D | 8.51 | 40.00 | 47.19 | | I-1 | 0.003 | A-1 | 0.05 | 100 | 1.77 | 73.0 |
| Material-54 | NANOUSE | 3.95 | Polymer-C | 8.46 | 60.00 | 27.49 | | I-1 | 0.003 | A-2 | 0.10 | 100 | 1.73 | 69.6 |
| Material-55 | NANOUSE | 3.70 | Polymer-C | 8.46 | 40.00 | 47.84 | | | 0.00 | | 0.00 | 100 | 1.55 | 72.7 |
| Material-56 | NANOUSE | 5.20 | Polymer-C | 8.20 | 40.00 | 46.50 | | Benzotriazole | 0.05 | A-2 | 0.05 | 100 | 2.10 | 75.7 |
| Material-62 | NANOUSE | 4.25 | Polymer-A | 0.62 | | 55.08 | 40.00 | Benzotriazole | 0.05 | | 0.00 | 100 | 1.97 | 65.9 |
| Material-63 | NANOUSE | 4.25 | Polymer-A | 0.62 | 10.00 | 55.08 | 30.00 | Benzotriazole | 0.05 | | 0.00 | 100 | 1.97 | 65.9 |

TABLE 7

| | | First transparent resin layer | | | Second transparent resin layer | | | Evaluation of laminated material | | | Evaluation of transparent laminate |
| | Base material | Material | Thickness | Refractive index | Material | Thickness | Refractive index | Layer demarcation | Wet heat test | Adhesiveness | Visibility of transparent electrode pattern |
|---|---|---|---|---|---|---|---|---|---|---|---|
| Example 150 | PET film (16 μm) | Material-1 | 7 μm | 1.51 | Material-53 | 91 nm | 1.64 | A | A | A | A |
| Example 151 | PET film (25 μm) | Material-2 | 8 μm | 1.52 | Material-54 | 85 nm | 1.67 | A | A | A | A |
| Example 152 | PET film (25 μm) | Material-3 | 9 μm | 1.51 | Material-55 | 93 nm | 1.65 | A | A | A | A |
| Example 153 | PET film (16 μm) | Material-4 | 10 μm | 1.53 | Material-56 | 76 nm | 1.66 | A | A | A | A |
| Example 154 | PET film (16 μm) | Material-5 | 8 μm | 1.51 | Material-62 | 86 nm | 1.66 | A | A | A | A |
| Example 155 | PET film (16 μm) | Material-4 | 8 μm | 1.53 | Material-63 | 89 nm | 1.66 | A | A | A | A | the thermoplastic resin layer, and the coating liquid was dried to form an intermediate layer. Furthermore, a coating liquid for a black photocurable resin layer based on the following formulation K1 was applied thereon, and the coating liquid was dried to form a black photocurable resin layer. In this manner, a thermoplastic resin layer having a dried film thickness of 15.1 μm, an intermediate layer having a dried film thickness of 1.6 μm, and a black photocurable resin layer having a dried film thickness of 2.2 μm so as to obtain an optical density of 4.0 were provided on the temporary support, and a protective film (polypropylene film having a thickness of 12 μm) was pressure-bonded thereon at the end. Thus, a transfer material in which a temporary support, a thermoplastic resin layer, an intermediate layer (oxygen blocking film), and a black photocurable resin layer were integrated was produced, and the sample name was designated as photosensitive film K1 for forming a mask layer.

| | |
|---|---|
| K pigment dispersion 1: | 31.2 parts by mass |
| R pigment dispersion 1 (composition described below): | 3.3 parts by mass |
| MMPGAc (propylene glycol monomethyl ether acetate, manufactured by Daicel Corporation): | 6.2 parts by mass |
| Methyl ethyl ketone (manufactured by Tonen Chemical Corporation): | 34.0 parts by mass |
| Cyclohexanone (manufactured by Kanto Denka Kogyo Co., Ltd.): | 8.5 parts by mass |
| Binder-2 (random copolymerization product of benzyl methacrylate/methacrylic acid at a molar ratio of 78/22, weight average molecular weight 38,000): | 10.8 parts by mass |
| Phenothiazine (manufactured by Tokyo Chemical Industry Co., Ltd.): | 0.01 parts by mass |
| Propylene glycol monomethyl ether acetate solution (76% by mass) of dipentaerythritol hexaacrylate (DPHA, manufactured by Nippon Kayaku Co., Ltd.): | 5.5 parts by mass |
| 2,4-Bis(trichloromethyl-6-[4'-(N,N-bis(ethoxycarbonylmethyl)amino-3'-bromophenyl)-s-triazine: | 0.4 parts by mass |
| Surfactant (trade name: MEGAFACE F-780F, manufactured by Dainippon Ink and Chemicals, Inc.): | 0.1 parts by mass |

(Coating Liquid for Black Photocurable Resin Layer: Formulation K1)

The viscosity at 100° C. after removal of the solvent of the coating liquid for a black photocurable resin layer based on the formulation K1 was 10,000 Pa-sec.

(Composition of K Pigment Dispersion 1)

| | |
|---|---|
| Carbon black (trade name: Nipex 35, manufactured by Degussa AG): | 13.1% by mass |
| Dispersant 1 described below: | 0.65% by mass |
| Binder I (random copolymerization product of benzyl methacrylate/methacrylic acid at a molar ratio of 72/28, weight average molecular weight 37,000): | 6.72% by mass |
| Propylene glycol monomethyl ether acetate: | 79.53% by mass |

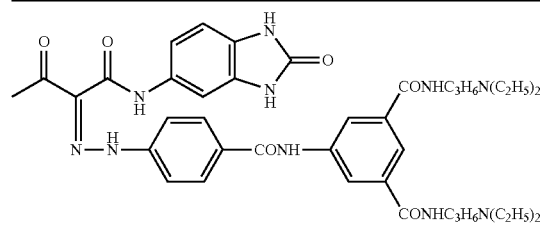

Dispersant 1

—Composition of R Pigment Dispersion 1—

| | |
|---|---|
| Pigment (C.I. Pigment Red 177. C.I. is the abbreviation for Colour Index International): | 18% by mass |
| Binder 1 (random copolymerization product of benzyl methacrylate/methacrylic acid at a molar ratio = 72/28, weight average molecular weight 37,000): | 12% by mass |
| Propylene glycol monomethyl ether acetate: | 70% by mass |

<Formation of Mask Layer>

Subsequently, while a glass detergent liquid adjusted to 25° C. was sprayed by showering for 20 seconds onto a reinforced glass plate (300 mm×400 mm×0.7 mm) having an opening (diameter 15 mm) formed thereon, the reinforced glass plate was washed with a rotating brush having nylon hair. The reinforced glass plate was washed with pure water by showering, and then a silane coupling liquid (0.3 mass % aqueous solution of N-β(aminoethyl)-γ-aminopropylt-rimethoxysilane, trade name: KBM603, manufactured by Shin-Etsu Chemical Co., Ltd.) was sprayed thereon by showering for 20 seconds. The reinforced glass plate was washed with pure water by showering. This base material was heated at 140° C. for 2 minutes with a base material preliminary heating apparatus.

The silane coupling-treated glass base material thus obtained was superposed with the photosensitive film K1 for forming a mask layer obtained as described above, from which the protective film had been removed, such that the surface of the black photocurable resin layer exposed after the removal and the surface of the silane coupling-treated glass base material would be brought into contact, and the photosensitive film K1 for forming a mask layer was laminated on the base material that had been heated to 140° C., using a laminator (manufactured by Hitachi Industries Co., Ltd. (Lamic II type)), at a rubber roller temperature of 130° C., a linear pressure of 100 N/cm, and a conveyance speed of 2.2 m/min. Subsequently, the temporary support of polyethylene terephthalate was peeled off from the interface with the thermoplastic resin layer, and the temporary support was removed. After the temporary support was peeled off, while the base material and the exposure mask (quartz exposure mask having a frame pattern) were positioned in a vertically standing state, the distance between the exposure mask surface and the black photocurable resin layer was set to 200 μm, and patternwise exposure was performed at an amount of exposure of 70 mJ/cm² (i-line) using proximity type exposure machine (manufactured by Hitachi High-Tech Electronics Engineering Co., Ltd.) having an ultrahigh pressure mercury lamp.

Next, the resultant was developed by showering using a triethanolamine-based developer (containing 30% by mass of triethanolamine, liquid obtained by diluting trade name: T-PD2 (manufactured by Fujifilm Corporation) 10 times with pure water) at 33° C. for 60 seconds at a flat nozzle pressure of 0.1 MPa, and the thermoplastic resin layer and the intermediate layer were removed. Subsequently, this glass base material was subjected to liquid draining by blowing air on the top surface, and then pure water was sprayed thereon by showering for 10 seconds to clean the surface by showering with pure water. Then, the liquid reservoir on the base material was reduced by blowing air.

Subsequently, the assembly was subjected to developing for 45 seconds at 32° C. using a sodium carbonate/sodium hydrogen carbonate-based developer (liquid obtained by diluting trade name: T-CD1 (manufactured by Fujifilm Corporation) 5 times with pure water), by setting the shower pressure at 0.1 MPa, and then the assembly was washed with pure water.

Subsequently, a surfactant-containing washing liquid (liquid obtained by diluting trade name: T-SD3 (manufactured by Fujifilm Corporation) 10 times with pure water) was used and sprayed by showering at 33° C. for 20 seconds at a cone type nozzle pressure of 0.1 MPa. Then, the pattern image thus formed was rubbed with a rotating brush having soft nylon hair, and thus residue was removed. Removal of residue was further performed by spraying ultrapure water thereon through an ultrahigh pressure washing nozzle at a pressure of 9.8 MPa.

Subsequently, the resultant was subjected to post-exposure in air at an amount of exposure of 1,300 mJ/cm$^2$, and was subjected to a post-bake treatment at 240° C. for 80 minutes. Thus, a front face plate having a mask layer having an optical density of 4.0 and a film thickness of 2.0 μm formed thereon was obtained.

[Transparent Film]

On the front face plate having a mask layer formed thereon, a transparent film was formed in the same manner as in the formation of a transparent film on a glass transparent substrate with regard to the formation of a laminate as described above.

[Formation of First Transparent Electrode Pattern]

<Formation of Transparent Electrode Layer>

The front face plate having a mask layer and a transparent film formed thereon was introduced into a vacuum chamber, and an ITO thin film having a thickness of 40 nm was formed thereon by DC MAGNETRON sputtering (conditions: temperature of base material 250° C., argon pressure 0.13 Pa, and oxygen pressure 0.01 Pa) using an ITO target (indium:tin=95:5 (molar ratio)) having a percentage content of SnO$_2$ of 10% by mass. Thus, a front face plate having a transparent electrode layer formed thereon was obtained. The surface resistance of the ITO thin film was 80 Ω/□.

<Production of Photosensitive Film for Etching E1>

A photosensitive film for etching E1 was obtained (film thickness of the photocurable resin layer for etching was 2.0 μm) in the same manner as in the production of the photosensitive film K1 for forming a mask layer, except that in connection with the production of the photosensitive film K1 for forming a mask layer, the coating liquid for a black photocurable resin layer was replaced with a coating liquid for a photocurable resin layer for etching based on the following formulation E1.

(Coating Liquid for Photocurable Resin Layer for Etching: Formulation E1)

| | |
|---|---|
| Methyl methacrylate/styrene/methacrylic acid copolymer (copolymer composition (mass %): 31/40/29, weight average molecular weight 60,000, acid value 163 mg KOH/g): | 16 parts by mass |
| Monomer 1 (trade name: BPE-500, manufactured by Shin-Nakamura Chemical Co., Ltd.): | 5.6 parts by mass |
| Tetraethylene oxide monomethacrylate 0.5 mol adduct of hexamethylene diisocyanate: | 7 parts by mass |
| Cyclohexane dimethanol monoacrylate as a compound having one polymerizable group in the molecule: | 2.8 parts by mass |
| 2-Chloro-N-butylacridone: | 0.42 parts by mass |
| 2,2-Bis(ortho-chlorophenyl)-4,4',5,5'-tetraphenylbiimidazole: | 2.17 parts by mass |
| Malachite Green oxalate: | 0.02 parts by mass |
| Leuco Crystal Violet: | 0.26 parts by mass |
| Phenothiazine: | 0.013 parts by mass |
| Surfactant (trade name: MEGAFACE F-780F, manufactured by Dainippon Ink and Chemicals, Inc.): | 0.03 parts by mass |
| Methyl ethyl ketone: | 40 parts by mass |
| 1-Methoxy-2-propanol: | 20 parts by mass |

The viscosity at 100° C. after removal of the solvent of the coating liquid for a photocurable resin layer for etching based on the formulation E1 was 2,500 Pa·sec.

<Formation of First Transparent Electrode Pattern>

Similarly to the formation of a mask layer, a front face plate having a mask layer, a transparent film, and a transparent electrode layer formed thereon was washed, and then the photosensitive film for etching E1, from which the protective film had been removed, was laminated thereon (base material temperature: 130° C., rubber roller temperature 120° C., linear pressure 100 N/cm, and conveyance speed 2.2 m/min). After the temporary support was peeled off, the distance between the exposure mask (quartz exposure mask having a transparent electrode pattern) surface and the photocurable resin layer for etching was set to 200 μm, and patternwise exposure was performed at an amount of exposure of 50 mJ/cm$^2$ (i-line).

Next, the resultant was subjected to a developing treatment for 100 seconds at 25° C. using a triethanolamine-based developer (containing 30% by mass of triethanolamine, liquid obtained by diluting trade name: T-PD2 (manufactured by Fujifilm Corporation) 10 times with pure water), and was subjected to a washing treatment for 20 seconds at 33° C. using a surfactant-containing washing liquid (liquid obtained by diluting trade name: T-SD3 (manufactured by Fujifilm Corporation) 10 times with pure water). The front face plate obtained after the washing treatment was rubbed with a rotating brush, and ultrapure water was sprayed thereon through a ultrahigh pressure washing nozzle. Thus, residue was removed. Subsequently, the front face plate was subjected to a post-bake treatment at 130° C. for 30 minutes, and thus a front face plate having a transparent electrode layer and a photocurable resin layer pattern for etching formed thereon was obtained.

The front face plate having a transparent electrode layer and a photocurable resin layer pattern for etching formed thereon was immersed in an etching tank containing an ITO etchant (aqueous solution of hydrochloric acid and potassium chloride, liquid temperature: 30° C.), and the front face plate was treated (etching treatment) for 100 seconds. The transparent electrode layer in an exposed region that was not covered with the photocurable resin layer for etching was dissolved and removed, and thus a front face plate having a photocurable resin layer pattern for etching-attached transparent electrode layer was obtained.

Next, the front face plate having a photocurable resin layer pattern for etching-attached transparent electrode layer was immersed in a resist peeling tank containing a resist peeling solution (N-methyl-2-pyrrolidone, monoethanolamine, and a surfactant (trade name: SURFYNOL 465, manufactured by Air Products and Chemicals, Inc.), liquid temperature: 45° C.) and was treated for 200 seconds. The photocurable resin layer for etching was removed, and a front face plate having a mask layer, a transparent film and a first transparent electrode pattern formed thereon was obtained.

[Formation of Insulating Layer]
<Production of Photosensitive Film W1 for Forming Insulating Layer>

A photosensitive film W1 for forming an insulating layer was obtained (film thickness of the insulating layer was 1.4 µm) in the same manner as in the production of the photosensitive film K1 for forming a mask layer, except that in connection with the production of the photosensitive film K1 for forming a mask layer, the coating liquid for a black photocurable resin layer was replaced with a coating liquid for an insulating layer based on the following formulation W1.

(Coating Liquid for Insulating Layer: Formulation W1)

| | |
|---|---|
| Binder 3 (1-methoxy-2-propanol, methyl ethyl ketone solution (solid content: 45%) of a glycidyl methacrylate adduct (d) of a cyclohexyl methacrylate (a)/methyl methacrylate (b)/methacrylic acid copolymer (c) (composition (mass %): a/b/c/d = 46/1/10/43, weight average molecular weight: 36,000, acid value 66 mg KOH/g)): | 12.5 parts by mass |
| Propylene glycol monomethyl ether acetate solution (76% by mass) of dipentaerythritol hexaacrylate (DPHA, manufactured by Nippon Kayaku Co., Ltd.): | 1.4 parts by mass |
| Urethane-based monomer (trade name: NK OLIGO UA-32P, manufactured by Shin-Nakamura Chemical Co., Ltd.; non-volatile fraction 75%, propylene glycol monomethyl ether acetate: 25%): | 0.68 parts by mass |
| Tripentaerythritol octaacrylate (trade name: V#802, manufactured by Osaka Organic Chemical Industry, Ltd.): | 1.8 parts by mass |
| Diethylthioxanthone: | 0.17 parts by mass |
| 2-(Dimethylamino)-2-[(4-methylphenyl)methyl]-1-[4-(4-morpholinyl)phenyl]-1-butanone (trade name: Irgacure 379, manufactured by BASF SE): | 0.17 parts by mass |
| Dispersant (trade name: SOLSPERSE 20000, manufactured by Avecia, Inc.): | 0.19 parts by mass |
| Surfactant (trade name: MEGAFACE F-780F, manufactured by Danippon Ink and Chemicals, Inc.): | 0.05 parts by mass |
| Methyl ethyl ketone: | 23.3 parts by mass |
| MMPGAc (propylene glycol monomethyl ether acetate, manufactured by Daicel Corporation): | 59.8 parts by mass |

The viscosity at 100° C. after removal of the solvent from the coating liquid for forming an insulating layer based on the formulation W1 was 4,000 Pa-sec.

Similarly to the formation of a mask layer, the front face plate having a mask layer, a transparent film and a first transparent electrode pattern attached thereto was washed and was subjected to a silane coupling treatment. Subsequently, the photosensitive film W1 for forming an insulating layer, from which the protective film had been removed, was laminated thereon (base material temperature: 100° C., rubber roller temperature 120° C., linear pressure 100 N/cm, conveyance speed 2.3 m/min). After the temporary support was peeled off, the distance between the exposure mask (quartz exposure mask having a pattern for an insulating layer) surface and the insulating layer was set to 100 µm, and patternwise exposure was performed at an amount of exposure of 30 mJ/cm² (i-line).

Next, the resultant was subjected to a developing treatment for 60 seconds at 33° C. using a triethanolamine-based developer (containing 30% by mass of triethanolamine, liquid obtained by diluting trade name: T-PD2 (manufactured by Fujifilm Corporation) 10 times with pure water), and then to a developing treatment for 50 seconds at 25° C. using a sodium carbonate/sodium hydrogen carbonate-based developer (liquid obtained by diluting trade name: T-CD1 (manufactured by Fujifilm Corporation) 5 times with pure water). Subsequently, the resultant was subjected to a washing treatment for 20 seconds at 33° C. using a surfactant-containing washing liquid (liquid obtained by diluting trade name: T-SD3 (manufactured by Fujifilm Corporation) 10 times with pure water). The front face plate obtained after the washing treatment was rubbed with a rotating brush, and ultrapure water was sprayed through an ultrahigh pressure washing nozzle. Thus, residue was removed. Subsequently, the resultant was subjected to a post-bake treatment for 60 minutes at 230° C., and thus a front face plate having a mask layer, a transparent film, a first transparent electrode pattern, and an insulating layer pattern formed thereon was obtained.

[Formation of Second Transparent Electrode Pattern]
<Formation of Transparent Electrode Layer>

Similarly to the formation of the first transparent electrode pattern, the front face plate having a mask layer, a transparent film, a first transparent electrode pattern, and an insulating layer pattern formed thereon was subjected to a DC MAGNETRON sputtering treatment (conditions: base material temperature 50° C., argon pressure 0.13 Pa, and oxygen pressure 0.01 Pa), and an ITO thin film having a thickness of 80 nm was formed. Thus, a front face plate having a transparent electrode layer formed thereon was obtained. The surface resistance of the ITO thin film was 110Ω/□.

A photosensitive film for etching E1 was used in the same manner as in the formation of the first transparent electrode pattern, and a front face plate having a mask layer, a transparent film, a first transparent electrode pattern, an insulating layer pattern, a transparent electrode layer, and a photocurable resin layer pattern for etching formed thereon was obtained (post-bake treatment: 130° C. for 30 minutes).

Furthermore, the front face plate was etched (30° C. for 50 seconds) in the same manner as in the formation of the first transparent electrode pattern, and then the photocurable resin layer for etching was removed (45° C. for 200 seconds). Thus, a front face plate having a mask layer, a transparent film, a first transparent electrode pattern, an insulating layer pattern, and a second transparent electrode pattern formed thereon was obtained.

[Formation of Conductive Element Different from First and Second Transparent Electrode Patterns]

A front face plate having a mask layer, a transparent film, a first transparent electrode pattern, an insulating layer pattern, and a second transparent electrode pattern formed thereon was subjected to DC MAGNETRON sputtering in the same manner as in the formation of the first and second transparent electrode patterns, and thus a front face plate having an aluminum (Al) thin film having a thickness of 200 nm formed thereon was obtained.

The photosensitive film for etching E1 was used in the same manner as in the formation of the first and second transparent electrode patterns, and a front face plate having a mask layer, a transparent film, a first transparent electrode pattern, an insulating layer pattern, a second transparent electrode pattern, and a photocurable resin layer pattern for etching formed thereon was obtained (post-bake treatment: 130° C. for 30 minutes).

Furthermore, the front face plate was etched (30° C. for 50 seconds) in the same manner as in the formation of the first transparent electrode pattern, and then the photocurable resin layer for etching was removed (45° C. for 200 seconds). Thus, a front face plate on which a mask layer, a transparent film, a first transparent electrode pattern, an insulating layer pattern, a second transparent electrode pattern, and a conductive element different from the first and second transparent electrode patterns were formed, was obtained.

[First Transparent Resin Layer and Second Transparent Resin Layer]

In regard to the production of the transparent laminates of various Examples, the first transparent resin layer and the second transparent resin layer were formed by transferring from the laminated material (transfer material) of each Example, in the same manner as in the production of the transparent laminates of the various Examples, except that a front face plate in which a mask layer, a transparent film, a first transparent electrode pattern, an insulating layer pattern, a second transparent electrode pattern, and a conductive element different from the first and second transparent electrode patterns were formed, was used instead of the substrate having a transparent film and a transparent electrode pattern formed on a glass transparent substrate. Thus, a capacitance-type input device (front face plate) of each Example in which a mask layer, a transparent film, a first transparent electrode pattern, an insulating layer pattern, a second transparent electrode pattern, a conductive element different from first and second transparent electrode patterns, a second transparent resin layer, and a first transparent resin layer were formed in this order on a glass transparent substrate, was obtained. The second transparent resin layer and the first transparent resin layer were subjected to patternwise exposure and developing and were thereby patterned, such that transparent resin layers would not be formed above the part where the mask layer was formed and the terminal of the lead wiring.

[Production of Image Display Device (Touch Panel)]

The capacitance-type input device (front face plate) of each Example produced previously was bonded to a liquid crystal display element produced by the method described in JP2009-47936A, and an image display device of each Example including the capacitance-type input device as a constituent element was produced by a known method.

<<Evaluation of Front Face Plate and Image Display Device>>

The capacitance-type input devices and image display devices of the various Examples did not have a problem that the transparent electrode patterns were visually recognized.

In the various steps described above, the front face plates in which a mask layer, a transparent film, a first transparent electrode pattern, an insulating layer pattern, a second transparent electrode pattern, a conductive element different from the first and second transparent electrode patterns, a second transparent resin layer, and a first transparent resin layer were formed, did not have contamination in the opening and the back face (non-contact surface), could be easily washed, and did not have a problem of contamination of other members.

Furthermore, the mask layer did not have pinholes, and had excellent light-shielding properties.

The first transparent electrode pattern, the second transparent electrode pattern, and the conductive element different from these did not have any problem with conductivity, and insulation properties were available between the first transparent electrode pattern and the second transparent electrode pattern.

Furthermore, the first transparent resin layer did not have defects such as air bubbles, and image display devices having excellent display characteristics were obtained.

EXPLANATION OF REFERENCES

1: transparent substrate (front face plate)
2: mask layer
3: transparent electrode pattern (first transparent electrode pattern)
3a: pad portion
3b: connection part
4: transparent electrode pattern (second transparent electrode pattern)
5: insulating layer
6: other conductive element
7: first transparent resin layer (preferably having a function as an overcoat layer or a transparent protective layer)
8: opening
10: capacitance-type input device
11: transparent film
12: second transparent resin layer (a refractive index-adjusting layer, may have a function as a transparent insulating layer)
13: transparent laminate
21: region in which transparent electrode patterns, a second transparent resin layer, and a first transparent resin layer are laminated in this order
22: non-patterned region
α: taper angle
26: base material (temporary support)
29: protective release layer (protective film)
30: laminated material
31: terminal of lead wiring
33: cured part of first transparent resin layer and second transparent resin layer
34: opening corresponding to terminal of lead wiring (uncured portion of first transparent resin layer and second transparent resin layer)
C: first direction
D: second direction

What is claimed is:

1. A method for producing a laminated material, the method comprising:
   forming a first transparent resin layer on a base material; and
   forming a second transparent resin layer directly on the first transparent resin layer,
   wherein the forming a first transparent resin layer is applying an organic solvent-based resin composition on the base material, and the forming a second transparent resin layer is applying a water-based resin composition including an ammonium salt of a monomer having an acid group or an ammonium salt of a resin having an acid group,
   said method further comprising producing an acid group by volatilizing ammonia from the ammonium salt of the monomer having an acid group or the ammonium salt of the resin having an acid group, by heating the applied water-based resin composition.

2. The method for producing a laminated material according to claim 1, further comprising dissolving a monomer having an acid group or a resin having an acid group in an aqueous ammonia solution, and producing a water-based resin composition including a monomer or a resin, in which at least a portion of the acid groups have been converted to an ammonium salt.

3. The method for producing a laminated material according to claim 1, wherein the base material is a film.

4. The method for producing a laminated material according to claim 1, wherein the acid group is a carboxyl group.

5. The method for producing a laminated material according to claim 1, wherein the pH at 25° C. of the water-based resin composition is from 7.0 to 12.0.

6. The method for producing a laminated material according to claim 1, wherein the first transparent resin layer contains a binder polymer, a photopolymerizable compound, and a photopolymerization initiator.

7. The method for producing a laminated material according to claim 6, wherein the binder polymer of the first transparent resin layer includes an acrylic resin.

8. The method for producing a laminated material according to claim 1, wherein the first transparent resin layer has a film thickness of 1 to 15 µm.

9. The method for producing a laminated material according to claim 1, wherein the ammonium salt of a monomer having an acid group or the ammonium salt of a resin having an acid group of the second transparent resin layer is an ammonium salt of an acrylic monomer or acrylic resin having an acid group.

10. The method for producing a laminated material according to claim 1, wherein the solvent of the water-based resin composition includes water and an alcohol having 1 to 3 carbon atoms.

11. The method for producing a laminated material according to claim 1, wherein the second transparent resin layer is at least one of a thermosetting resin layer or a photocurable resin layer.

12. A laminated material comprising: a base material; a first transparent resin layer; and a second transparent resin layer disposed adjacently to the first transparent resin layer, in this order,
wherein the first transparent resin layer is formed by applying an organic solvent-based resin composition on the base material,
the second transparent resin layer is formed by applying a water-based resin composition including an ammonium salt of a monomer having an acid group or an ammonium salt of a resin having an acid group, on the first transparent resin layer, and
an acid group is produced by volatilizing ammonia from the ammonium salt of the monomer having an acid group or the ammonium salt of the resin having an acid group, by heating the applied water-based resin composition.

13. A laminated material produced by the method for producing a laminated material according to claim 1.

14. The laminated material according to claim 12, being a transfer material.

15. A method for producing a transparent laminate, the method comprising laminating, on a transparent electrode pattern, the second transparent resin layer and the first transparent resin layer of the laminated material according to claim 12 in this order.

16. A transparent laminate produced by the method for producing a transparent laminate according to claim 15.

17. A capacitance-type input device produced by using the laminated material according to claim 12, and laminating the second transparent resin layer and the first transparent resin layer of the laminated material in this order on a substrate including a transparent electrode pattern.

18. A capacitance-type input device comprising the transparent laminate according to claim 16.

19. An image display device comprising the capacitance-type input device according to claim 17 as a constituent element.

20. The method for producing a laminated material according to claim 1, wherein the water-based resin composition contains an acrylic resin having a carboxyl group.

21. The laminated material according to claim 12, wherein the water-based resin composition contains an acrylic resin having a carboxyl group.

22. The method for producing a laminated material according to claim 6, wherein the acid value of the binder polymer contained in the first transparent resin layer is 50 to 150 mg KOH/g.

23. The method for producing a laminated material according to claim 10, wherein the content ratio of water/alcohol having 1 to 3 carbon atoms is in the range of 58/42 to 100/0 as a mass ratio.

24. The laminated material according to claim 12, wherein the solvent of the water-based resin composition includes water and an alcohol having 1 to 3 carbon atoms.

25. The laminated material according to claim 24, wherein the content ratio of water/alcohol having 1 to 3 carbon atoms is in the range of 58/42 to 100/0 as a mass ratio.

* * * * *